US012654719B2

(12) United States Patent
Teman

(10) Patent No.: US 12,654,719 B2
(45) Date of Patent: Jun. 16, 2026

(54) VEHICLE SENSORY FEEDBACK MANAGEMENT

(71) Applicant: Ari B. Teman, Miami Beach, FL (US)

(72) Inventor: Ari B. Teman, Miami Beach, FL (US)

( * ) Notice: Subject to any disclaimer, the term of this patent is extended or adjusted under 35 U.S.C. 154(b) by 154 days.

(21) Appl. No.: 18/604,491

(22) Filed: Mar. 13, 2024

(65) Prior Publication Data

US 2024/0326837 A1      Oct. 3, 2024

Related U.S. Application Data

(60) Provisional application No. 63/451,808, filed on Mar. 13, 2023.

(51) Int. Cl.
*B60W 50/00* (2006.01)
*B60W 50/16* (2020.01)
*B60W 50/14* (2020.01)

(52) U.S. Cl.
CPC ........ *B60W 50/0098* (2013.01); *B60W 50/16* (2013.01); *B60W 2050/0083* (2013.01); *B60W 2050/143* (2013.01); *B60W 2050/146* (2013.01)

(58) Field of Classification Search
CPC ............. B60W 50/0098; B60W 50/16; B60W 2050/0083; B60W 2050/143; B60W 2050/146
See application file for complete search history.

(56) References Cited

U.S. PATENT DOCUMENTS

| | | | |
|---|---|---|---|
| 6,111,501 A * | 8/2000 | Honeyager | ........ A61B 5/02055 340/521 |
| 6,373,465 B2 * | 4/2002 | Jolly | ..................... G06F 3/0338 434/45 |
| 6,941,193 B2 * | 9/2005 | Frecska | .................... F24F 11/54 700/277 |
| 7,484,716 B2 | 2/2009 | Ford Morie et al. | |
| 8,413,533 B2 * | 4/2013 | Rake | .................. F16C 11/0614 74/473.12 |
| 9,827,904 B2 * | 11/2017 | Modarres | ............... B60Q 9/008 |
| 10,215,429 B2 * | 2/2019 | Blackley | ................. A24F 40/51 |
| 11,295,628 B2 * | 4/2022 | Bortolon | ................. G09B 9/02 |
| 11,691,632 B1 * | 7/2023 | Chen | ..................... B60W 40/09 701/22 |
| 2007/0138660 A1 * | 6/2007 | Guo | ........................ G03B 21/14 261/26 |
| 2007/0244641 A1 * | 10/2007 | Altan | .................... B60W 50/16 701/2 |

(Continued)

FOREIGN PATENT DOCUMENTS

| | | |
|---|---|---|
| CN | 104307020 A | 1/2015 |
| DE | 2020004012869 U1 | 10/2004 |

(Continued)

*Primary Examiner* — Sihar A Karwan
(74) *Attorney, Agent, or Firm* — Van Court & Aldridge LLP

(57) ABSTRACT

Systems, methods, and computer-readable media for managing vehicle sensory feedback are provided. For example, an electric vehicle can be configured to replicate the feeling and response of a combustion engine powered supercar, adjusting for its real feedback and adjusting the suspension, and adding or countering vibrations in different areas and components of the vehicle in real time so the driver and/or passenger can have the feeling of any car they wish, with each passenger choosing their own feel.

21 Claims, 18 Drawing Sheets

(56)         References Cited

U.S. PATENT DOCUMENTS

| | | | | |
|---|---|---|---|---|
| 2018/0178808 A1* | 6/2018 | Zhao | ......................... | B60N 2/20 |
| 2020/0324011 A1* | 10/2020 | Jin | ............................ | A61L 9/14 |
| 2022/0203996 A1* | 6/2022 | Katz | .................... | B60W 50/14 |

FOREIGN PATENT DOCUMENTS

| | | | |
|---|---|---|---|
| DE | 102009060213 B4 | 6/2011 |
| DE | 102015002957 A1 | 9/2016 |
| JP | 2004355500 A | 12/2004 |
| JP | 2013162378 A | 8/2013 |

* cited by examiner 695-1

295pk

295pk

295pk 296-5

295pk 695-1

295pk

295pk

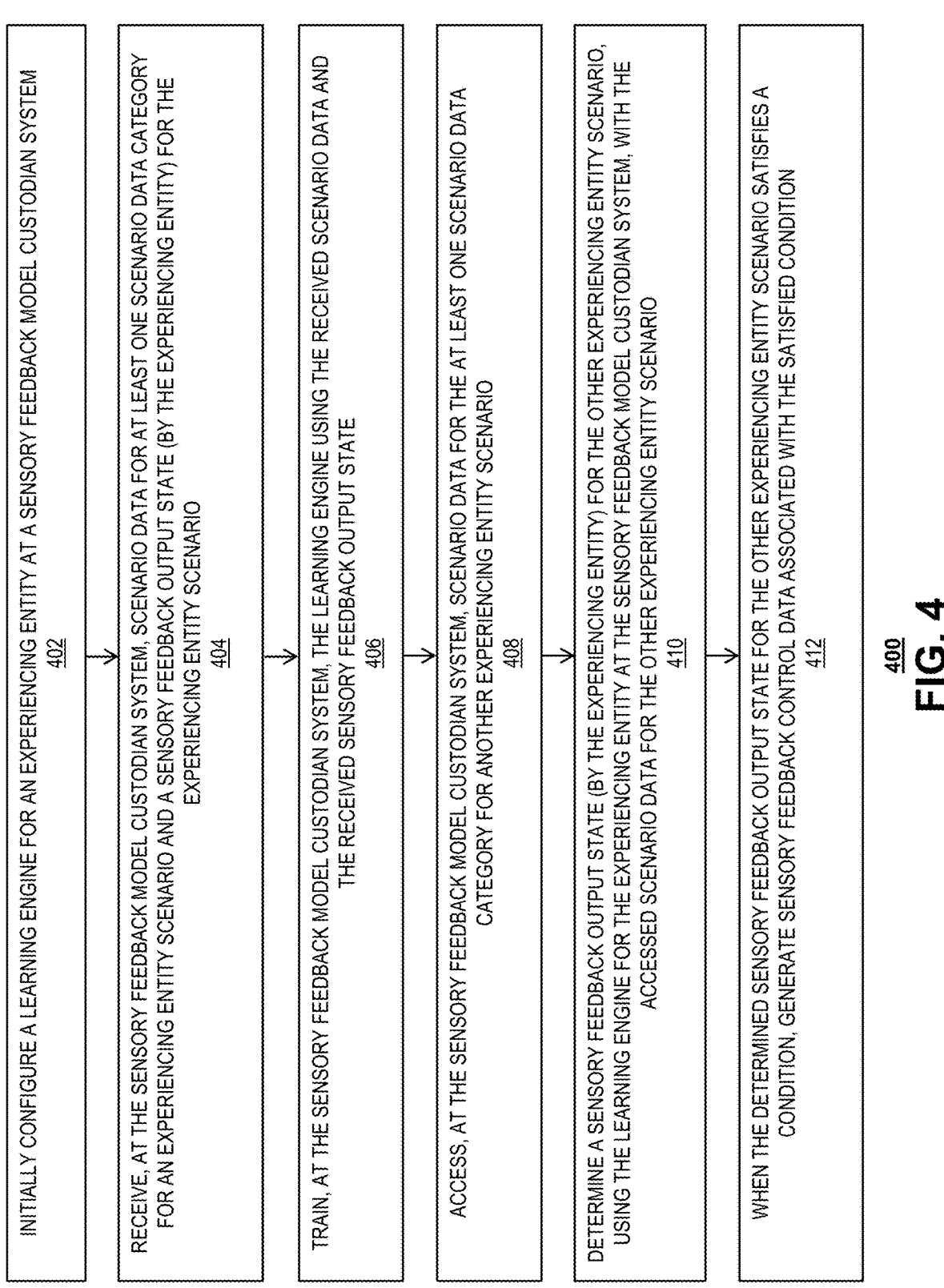

INITIALLY CONFIGURE A LEARNING ENGINE FOR AN EXPERIENCING ENTITY AT A SENSORY FEEDBACK MODEL CUSTODIAN SYSTEM
402

RECEIVE, AT THE SENSORY FEEDBACK MODEL CUSTODIAN SYSTEM, SCENARIO DATA FOR AT LEAST ONE SCENARIO DATA CATEGORY FOR AN EXPERIENCING ENTITY SCENARIO AND A SENSORY FEEDBACK OUTPUT STATE (BY THE EXPERIENCING ENTITY) FOR THE EXPERIENCING ENTITY SCENARIO
404

TRAIN, AT THE SENSORY FEEDBACK MODEL CUSTODIAN SYSTEM, THE LEARNING ENGINE USING THE RECEIVED SCENARIO DATA AND THE RECEIVED SENSORY FEEDBACK OUTPUT STATE
406

ACCESS, AT THE SENSORY FEEDBACK MODEL CUSTODIAN SYSTEM, SCENARIO DATA FOR THE AT LEAST ONE SCENARIO DATA CATEGORY FOR ANOTHER EXPERIENCING ENTITY SCENARIO
408

DETERMINE A SENSORY FEEDBACK OUTPUT STATE (BY THE EXPERIENCING ENTITY) FOR THE OTHER EXPERIENCING ENTITY SCENARIO, USING THE LEARNING ENGINE FOR THE EXPERIENCING ENTITY AT THE SENSORY FEEDBACK MODEL CUSTODIAN SYSTEM, WITH THE ACCESSED SCENARIO DATA FOR THE OTHER EXPERIENCING ENTITY SCENARIO
410

WHEN THE DETERMINED SENSORY FEEDBACK OUTPUT STATE FOR THE OTHER EXPERIENCING ENTITY SCENARIO SATISFIES A CONDITION, GENERATE SENSORY FEEDBACK CONTROL DATA ASSOCIATED WITH THE SATISFIED CONDITION
412

VEHICLE SENSORY FEEDBACK MANAGEMENT

CROSS-REFERENCE TO RELATED APPLICATION(S)

This application claims the benefit of prior filed U.S. Provisional Patent Application No. 63/451,808, filed Mar. 13, 2023, which is hereby incorporated by reference herein in its entirety.

COPYRIGHT NOTICE

TECHNICAL FIELD

This disclosure relates to sensory feedback management and, more particularly, but without limitation, to haptic (e.g., tactile, kinesthetic), olfactory, auditory, and/or visual sensory feedback management systems of a vehicle and methods for using the same.

BACKGROUND OF THE DISCLOSURE

Electric vehicles are increasingly popular. However, many drivers of electric vehicles lament the lack of feel, sound, smell, and other sensory feedback they would normally get from a combustion vehicle.

SUMMARY OF THE DISCLOSURE

This document describes systems, methods, and computer-readable media for managing vehicle sensory feedback.

For example, a method for managing sensory feedback using a sensory feedback model custodian system is provided that may include initially configuring, at the sensory feedback model custodian system, a learning engine for an experiencing entity, receiving, at the sensory feedback model custodian system, scenario data for at least one scenario data category for an experiencing entity scenario and a sensory output state for the experiencing entity scenario, training, at the sensory feedback model custodian system, the learning engine using the received scenario data and the received sensory feedback output state, accessing, at the sensory feedback model custodian system, scenario data for the at least one scenario data category for another experiencing entity scenario, determining a sensory feedback output state for the other experiencing entity scenario, using the learning engine for the experiencing entity at the sensory feedback model custodian system, with the accessed scenario data for the other experiencing entity scenario, and, when the determined sensory feedback output state for the other experiencing entity scenario satisfies a condition, generating sensory feedback control data associated with the satisfied condition. In some embodiments, the sensory feedback control data is operative to provide a recommendation to adjust a control variable of the experiencing entity. In some embodiments, the sensory feedback control data is operative to automatically adjust a control variable of the experiencing entity. In some embodiments, the sensory feedback control data is operative to automatically adjust a haptic sensory feedback actuator of the experiencing entity. In some embodiments, the sensory feedback control data is operative to automatically adjust an olfactory sensory feedback actuator of the experiencing entity. In some embodiments, the sensory feedback control data is operative to automatically adjust an auditory sensory feedback actuator of the experiencing entity. In some embodiments, the sensory feedback control data is operative to automatically adjust a visual sensory feedback actuator of the experiencing entity. In some embodiments, the at least one scenario data category includes one of the following: type of tires of the experiencing entity, type of fuel used by the experiencing entity, status of each seat of the experiencing entity, status of occupancy of each seat of the experiencing entity, status of each window and/or sunroof and/or convertible roof of the experiencing entity, status of a heating, ventilation, and air conditioning ("HVAC") system of the experiencing entity, status of a media system of the experiencing entity, status of weather of the environment of the experiencing entity, status of smell of the environment of the experiencing entity, status of sound of the environment of the experiencing entity, status of light of the environment of the experiencing entity, status of the driving surface of the experiencing entity, or status of the driving operation of the experiencing entity.

As another example, a sensory feedback model custodian system is provided that may include a communications component and a processor operative to initially configure a learning engine for an experiencing entity, receive scenario data for at least one scenario data category for an experiencing entity scenario and a sensory output state for the experiencing entity scenario, train the learning engine using the received scenario data and the received sensory feedback output state, access scenario data for the at least one scenario data category for another experiencing entity scenario, determine a sensory feedback output state for the other experiencing entity scenario, using the learning engine for the experiencing entity, with the accessed scenario data for the other experiencing entity scenario, and, when the determined sensory feedback output state for the other experiencing entity scenario satisfies a condition, generate sensory feedback control data associated with the satisfied condition.

As yet another example, a non-transitory computer-readable storage medium storing at least one program comprising instructions is provided, which, when executed, may initially configure a learning engine for an experiencing entity, receive scenario data for at least one scenario data category for an experiencing entity scenario and a sensory output state for the experiencing entity scenario, train the learning engine using the received scenario data and the received sensory feedback output state, access scenario data for the at least one scenario data category for another experiencing entity scenario, determine a sensory feedback output state for the other experiencing entity scenario, using the learning engine for the experiencing entity, with the accessed scenario data for the other experiencing entity scenario, and, when the determined sensory feedback output state for the other experiencing entity scenario satisfies a condition, generate sensory feedback control data associated with the satisfied condition.

As yet another example, a method is provided for using scenario data of a scenario of interest with only model(s) for a target vehicle to determine expected feedback of the target vehicle during the scenario of interest and then applying that expected feedback to a replicating vehicle during the scenario of interest (e.g., blind to any expected feedback of the replicating vehicle during the scenario of interest), with or without any auxiliary factor data.

As yet another example, a method is provided for using scenario data of a scenario of interest with only model(s) for a replicating vehicle to determine expected feedback of the replicating vehicle during the scenario of interest and then applying that expected feedback to the replicating vehicle during the scenario of interest (e.g., blind to any expected feedback of any target vehicle during the scenario of interest), with or without any auxiliary factor data.

As yet another example, a method is provided for using scenario data of a scenario of interest not only with model(s) for a target vehicle to determine expected feedback of the target vehicle during the scenario of interest but also with model(s) for a replicating vehicle to determine expected feedback of the replicating vehicle during the scenario of interest, and then applying that expected feedback (e.g., a delta between the expected feedback of the target vehicle and the expected feedback of the replicating vehicle) to the replicating vehicle during the scenario of interest, with or without any auxiliary factor data.

This Summary is provided to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which:

FIG. 4 is a flowchart of an illustrative process for managing sensory feedback, in accordance with some embodiments of the disclosure.

DETAILED DESCRIPTION OF THE DISCLOSURE

Figure 1:
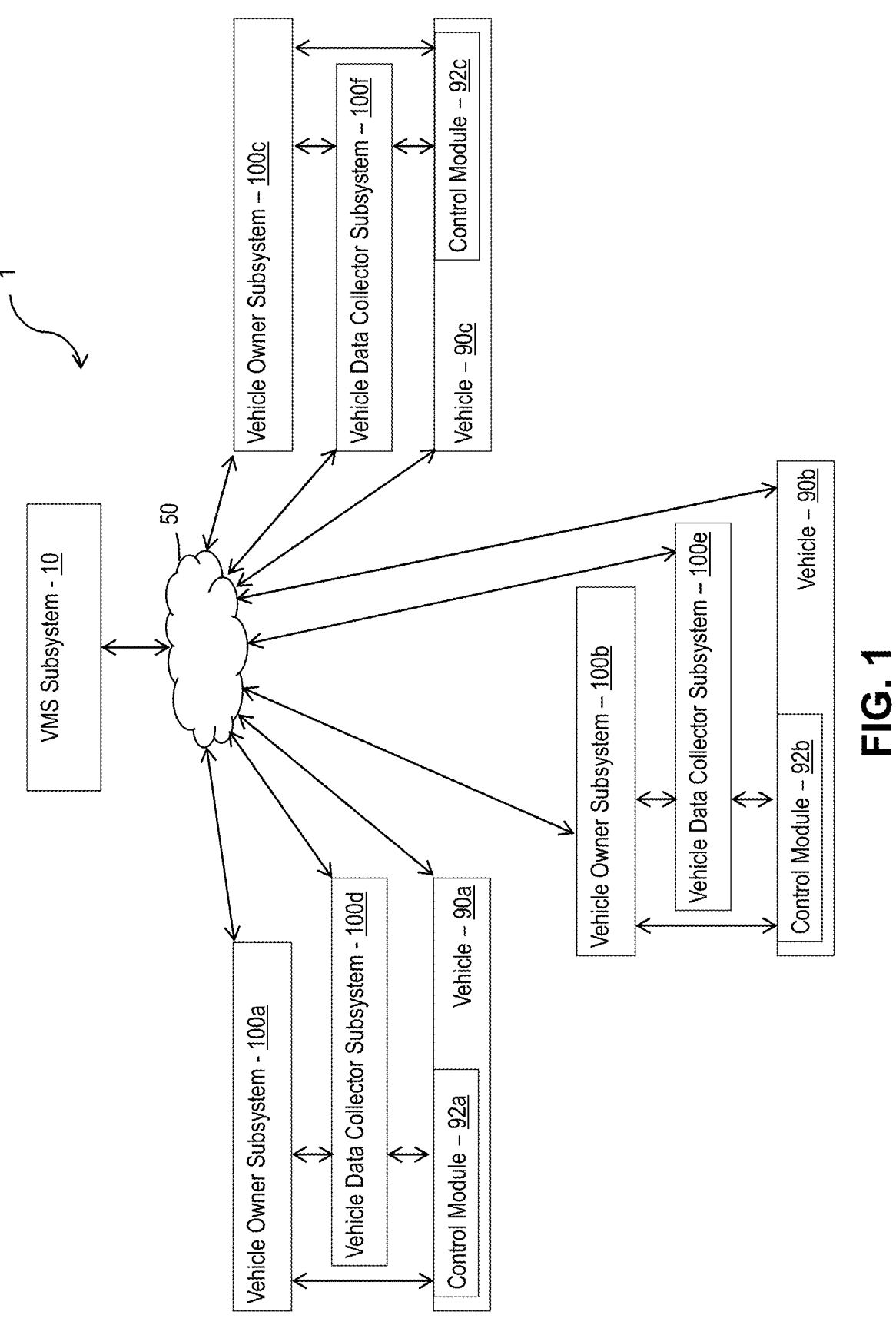
FIG. 1 is a schematic view of an illustrative system that may provide a vehicle management service in accordance with some embodiments of the disclosure.

Systems, methods, and computer-readable media for managing vehicle sensory feedback are provided.

Systems, methods, and computer-readable media may be provided to manage sensory feedback of a vehicle. Any suitable sensory feedback model (e.g., neural network and/ or learning engine) may be trained by and utilized in conjunction with any suitable vehicle scenario data that may be indicative of any suitable vehicle scenario characteristics of a particular vehicle scenario of a particular vehicle (e.g., type of vehicle (e.g., make and model), type of tires of vehicle, type of fuel used by vehicle (if applicable), status of each seat of vehicle (e.g., position and/or orientation of each seat's base, backrest, headrest, and/or the like), status of occupant of each seat of vehicle (e.g., height, weight, age, etc.), status of each window and/or sunroof and/or convertible roof of vehicle (e.g., fully closed, fully opened, partially opened, etc.), status of heating, ventilation, and air conditioning ("HVAC") system of vehicle (e.g., temperature setting, fan setting, fan direction, vent orientation, vent closed/ opened amount, etc.), status of media system of vehicle (e.g., volume of any media playback, fade/balance and/or active distribution of speakers, etc.), status of weather of environment of vehicle (e.g., temperature, precipitation, wind, etc.), status of smell of environment of vehicle, status of sound of environment of vehicle, status of light of environment of vehicle, status of driving surface of vehicle (e.g., material (e.g., concrete, dirt, ice, etc.), gradient (e.g., degree of incline, decline, lateral angle, bumps, potholes, curvature, straightness, etc.), location (e.g., altitude, latitude, longitude, etc.), and/or the like), status of driving operation of vehicle (e.g., off, parked but idling, forward or reverse speed, acceleration, deceleration, steering wheel orientation and/or movement, brake pedal position and/or movement, acceleration pedal position and/or movement, gear of gear shift (if applicable), and/or the like), and/or the like) in order to predict or otherwise determine any suitable sensory feedback state(s) that may be indicative of any suitable vehicle sensory feedback data that may be indicative of any suitable vehicle sensory feedback characteristics of the particular vehicle during the particular vehicle scenario (e.g., haptic sensory feedback (e.g., vibration, responsiveness, resistance, airflow (e.g., speed and/or direction) and/or the like) of or at any suitable component(s) of the vehicle (e.g., seat(s), steering wheel, gear shift (if applicable), brake pedal, acceleration pedal, arm rest(s), door panel(s), floor, floor well(s), wheel well(s), handlebars, dashboard, engine, tire(s), brake(s), brake pad(s), suspension arm(s), HVAC vent(s), and/or the like), olfactory sensory feedback (e.g., smell) at any suitable location(s) with respect to the vehicle (e.g., at any external exhaust(s) of the vehicle, at any headrest(s) of the vehicle, etc.), auditory sensory feedback (e.g., sounds) at any suitable location(s) with respect to the vehicle (e.g., at any headrest(s) of the vehicle, at any engine(s) of the vehicle, etc.), visual sensory feedback (e.g., direction and/or vibrancy and/or color make up of any suitable light) at any suitable location(s) with respect to the vehicle (e.g., at any headrest(s) of the vehicle, at any window(s) of the vehicle, etc.), and/or the like). Certain target vehicle scenario data and certain target sensory feedback data may be sensed from a target vehicle during a target vehicle scenario of the target vehicle and used to train a target vehicle sensory feedback model that may be later used for predicting further vehicle sensory feedback data for a further sensory feedback state in response to further vehicle scenario data that may be sensed during a further vehicle scenario. In some embodiments, a trained target vehicle sensory feedback model (e.g., a model trained on scenario data and sensory feedback data of a target vehicle during one or more target vehicle scenarios) may be used to predict vehicle sensory feedback data for a sensory feedback state based on vehicle scenario data that may be sensed from a replicating vehicle during a replicating vehicle scenario. Such a predicted sensory feedback state may be analyzed with respect to one or more particular conditions or regulations or thresholds in order to generate any suitable sensory feedback control data for controlling any suitable functionality of any suitable output assembly of the replicating vehicle for generating sensory feedback with the replicating vehicle for the replicating vehicle scenario that may mimic predicted sensory feedback by the target vehicle for the replicating vehicle scenario. In some embodiments, certain replicating vehicle scenario data and certain replicating sensory feedback data may be sensed from a replicating vehicle during a replicating vehicle scenario of the replicating vehicle and used to train a replicating vehicle sensory feedback model for later predicting further vehicle sensory feedback data for a further sensory feedback state in response to further vehicle scenario data that may be sensed during a further vehicle scenario. In some embodiments, a trained replicating vehicle sensory feedback model may be used to predict vehicle sensory feedback data for a sensory feedback state in response to vehicle scenario data that may be sensed from the replicating vehicle during a replicating vehicle scenario. Then, such a sensory feedback state predicted by the replicating vehicle sensory feedback model for the replicating vehicle scenario (e.g., based on vehicle scenario data sensed from the replicating vehicle during the replicating vehicle scenario) and a sensory feedback state predicted by the target vehicle sensory feedback model for the replicating vehicle scenario (e.g., based on vehicle scenario data sensed from the replicating vehicle during the replicating vehicle scenario) may be processed together in order to generate any suitable sensory feedback control data for controlling any suitable functionality of any suitable output assembly of the replicating vehicle for generating sensory feedback with the replicating vehicle for the replicating vehicle scenario that may mimic predicted sensory feedback by the target vehicle for the replicating vehicle scenario. Any suitable auxiliary factors may be monitored or otherwise determined and then used to modify such sensory feedback control data for controlling any suitable functionality of any suitable output assembly of the replicating vehicle, including, but not limited to, replicating vehicle user profile data (e.g., age of a user of the replicating vehicle, weight of the user, haptic sensory sensitivity of the user, olfactory sensory sensitivity of the user, auditory sensory sensitivity of the user, visual sensory sensitivity of the user, etc.), replicating vehicle user active data (e.g., heart rate of the user, breathing rate of the user, blood pressure of the user, facial expression(s) of the user, audible output of the user, etc.), replicating vehicle preference data (e.g., maximum speed preference of the user, maximum rate of acceleration preference of the user, etc.), and/or the like. In some embodiments, a method may include (1) training a plurality of target vehicle sensory feedback models, where each target vehicle sensory feedback model may be associated with a respective target vehicle (e.g., a first target vehicle sensory feedback model for a 1969 Corvette Stingray, a second target vehicle sensory feedback model for a Ferrari 812 Superfast, etc.), and where each target vehicle sensory feedback model may be trained using target vehicle scenario data and respective target vehicle sensory feedback data as sensed by the model's associated target vehicle during various vehicle scenarios, (2) training a plurality of replicating vehicle sensory feedback models, where each replicating vehicle sensory feedback model may be associated with a respective replicating vehicle (e.g., a first replicating vehicle sensory feedback model for a Tesla Model 3, a second replicating vehicle sensory feedback model for a Rivian R1S, etc.), and where each replicating vehicle sensory feedback model may be trained using replicating vehicle scenario data and respective replicating vehicle sensory feedback data as sensed by the model's associated replicating vehicle during various vehicle scenarios, (3) receiving from a first replicating vehicle user of a first replicating vehicle a selection of a first target vehicle to be replicated by the first replicating vehicle for the first replicating vehicle user, (4) obtaining first replicating vehicle scenario data with the first replicating vehicle during a first replicating vehicle scenario, (5) using the target vehicle sensory feedback model of the selected first target vehicle (e.g., as selected at (3) and as trained at (1)) to predict any suitable target vehicle sensory feedback data for a sensory feedback state of the first target vehicle during the first replicating vehicle scenario based on the obtained first replicating vehicle scenario data (e.g., as obtained at (4)), (6) using the replicating vehicle sensory feedback model of the selected first replicating vehicle (e.g., as selected at (3) and as trained at (2)) to predict any suitable replicating vehicle sensory feedback data for a sensory feedback state of the first replicating vehicle during the first replicating vehicle scenario based on the obtained first replicating vehicle scenario data (e.g., as obtained at (4)), (7) combining the sensory feedback data predicted for the first target vehicle (e.g., as predicted at (5)) with the sensory feedback data predicted for the first replicating vehicle (e.g., as predicted at (6)) to generate any suitable sensory feedback control data for adjusting the functionality of any output component(s) of the first replicating vehicle such that the first replicating vehicle may replicate the sensory feedback of the first target vehicle for the first replicating vehicle user of the first replicating vehicle during the first replicating vehicle scenario, (8) optionally adjusting the generated sensory feedback control data (e.g., as generated at (7)) with any suitable auxiliary factors (e.g., related to the user), and (9) applying the sensory feedback control data to the output component(s) of the first replicating vehicle, where different iterations of operations (3)-(9) may be carried out (e.g., in parallel) for different replicating vehicle users of the first replicating vehicle that may select the same target vehicle or different target vehicles. Therefore, a system may include software and/or hardware components that can be configured to learn the "feel", or haptic feedback, mechanical, olfactory, auditory, visual, and/or other sensory-inducing responses, of vehicles through a series of sensors and artificial-intelligence processing computer(s), and then reproduce that feel through a series of components and sensors in another vehicle. For example, so an electric vehicle can replicate the feeling and response of a combustion engine powered supercar, adjusting for its real feedback and adjusting the suspension, and adding or countering vibrations in different areas and components of the vehicle in real time so the driver and/or passenger can have the feeling of any car they wish, with each passenger choosing their Own feel. In some embodiments, a system of chambers and pipes and valves may be built-into a vehicle and may be configured to move air fed through intakes and optionally pumped at higher speed via fans (e.g., turbines, jets, or the like) so as to create real sound and feedback similar to air and exhaust fumes moving through a combustion engine, but without the need for fuel, and with the ability to adjust the sound and vibrations or turn them off entirely by adjusting valves and other components via the computers and/or chips. Therefore, artificial intelligence-driven generation and regeneration of vehicle haptic, auditory, olfactory, and multisensory feedback may be provided.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

FIG. 1 is a schematic view of an illustrative system 1 in which a vehicle management service, including, but not limited to, vehicle object repositioning management (e.g., vehicle door repositioning management, vehicle rack repositioning management, vehicle roof repositioning management, etc.), vehicle sensory feedback management, and/or the like, may be facilitated amongst one or more various entities. For example, as shown in FIG. 1, system 1 may include a vehicle management service ("VMS") subsystem 10, various subsystems 100 (e.g., one or more vehicle owner ("VO") subsystems 100a-100c, one or more vehicle data collector ("VDC") subsystems 100d-100f, each of which may be communicatively coupled to one or more control modules ("CMs") or subsystems 92 of a respective vehicle 90 (e.g., CMs 92a-92c of respective vehicles 90a-90c that may be owned or operated or managed or controlled by passengers or owners of respective vehicle owner subsystems 100a-100c), and at least one communications network 50 through which any two or more of the subsystems 10, 92, and 100 may communicate. VMS subsystem 10 may be operative to interact with any of the various subsystems 92 and 100, and/or any two or more subsystems 92 and 100 may be operative to interact with each other, to provide a vehicle management service platform ("VMSP") that may facilitate various vehicle management services, including, but not limited to, managing and enhancing the vehicle utilization process for vehicle owners, users, buyers, sellers, and/or the like for enabling effective, efficient, safe, and enjoyable vehicle utilization (e.g., vehicle door repositioning management, vehicle rack repositioning management, vehicle roof repositioning management, vehicle sensory feedback management, etc.).

Figure 1A:
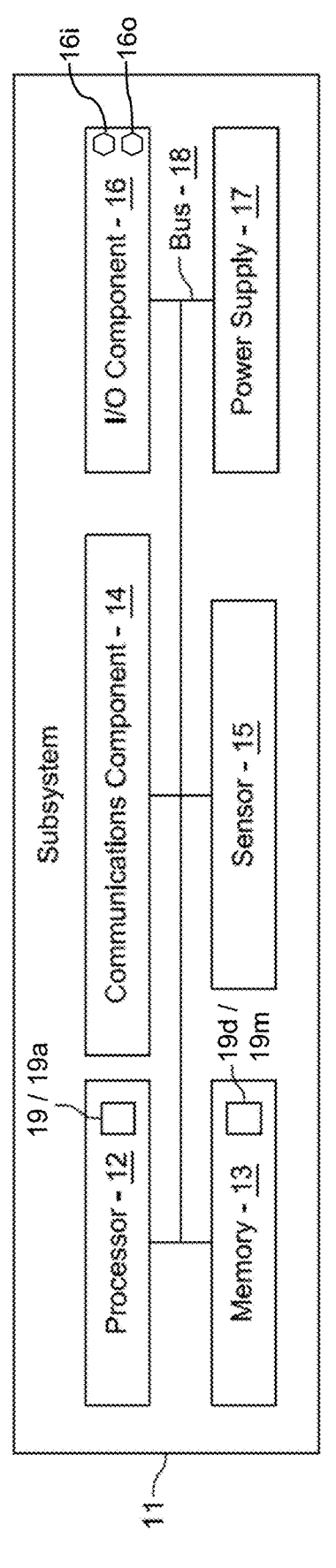
FIG. 1A is a more detailed schematic view of a subsystem of the system of FIG. 1, in accordance with some embodiments of the disclosure.

As shown in FIG. 1A, and as described in more detail below, a subsystem 120, which may be exemplary of any one, some, or each of subsystem 10, subsystem 92a-92c, and/or subsystem 100a-100f, may include a processor component 12, a memory component 13, a communications component 14, a sensor component 15, an input/output ("I/O") component 16, a power supply component 17, and/or a bus 18 that may provide one or more wired or wireless communication links or paths for transferring data and/or power to, from, or between various other components of subsystem 120. In some embodiments, one or more components of subsystem 120 may be combined or omitted. Moreover, subsystem 120 may include other components not combined or included in FIG. 1A and/or several instances of the components shown in FIG. 1A. For the sake of simplicity, only one of each of the components of subsystem 120 is shown in FIG. 1A.

I/O component 16 may include at least one input component 16i (e.g., button, mouse, keyboard, etc.) to receive information from a user or other device or power therefrom and/or at least one output component 16o (e.g., audio output component or speaker, video output component or display, haptic output component (e.g., rumbler, vibrator, etc.), lighting output component, olfactory output component, movement actuator, etc.) to provide information or power or any other suitable support to a user or other device, such as a touch screen that may receive input information through a user's touch of a display screen and that may also provide visual information to a user via that same display screen, a vehicle door repositioning management system that may be used to control and/or carry out the movement of one or more vehicle doors or other components (e.g., actuators, controllers, gears, etc.), a vehicle rack repositioning management system that may be used to control and/or carry out the movement of one or more vehicle racks or other components (e.g., actuators, controllers, gears, etc.), a vehicle roof repositioning management system that may be used to control and/or carry out the movement of one or more vehicle roofs or other components (e.g., actuators, controllers, gears, etc.), a vehicle sensory feedback management system that may be used to control and/or carry out the haptic sensory feedback and/or olfactory sensory feedback and/or auditory sensory feedback and/or visual sensory feedback of one or more output components (e.g., actuators, controllers, gears, lights, speakers, smell generators, etc.) of a vehicle, and/or the like. In some embodiments, an I/O component 16 may be any suitable data and/or power connector (e.g., a Universal Serial Bus ("USB") connector or any other suitable connector type, a wireless charger (e.g., an inductive charging pad or the like), etc.) that may be utilized in any suitable manner by any suitable portable media device or the like.

Memory 13 may include one or more storage mediums or media, including for example, a hard-drive, flash memory, permanent memory such as read-only memory ("ROM"), semi-permanent memory such as random access memory ("RAM"), any other suitable type of storage component, or any combination thereof (e.g., for storing any suitable data (e.g., data 19*d* (e.g., a sensory feedback management model 19*m* (e.g., that may be used by any suitable application 19*a*)))). Memory 13 may include suitable logic, circuitry, and/or code that may enable storage of various types of information, such as received data, generated data, code, and/or configuration information.

Communications component 14 may be provided to allow subsystem 120 to communicate with one or more other subsystems 120 (e.g., any communication to/from/between subsystem(s) 10, 92, and 100 of system 1) using any suitable communications protocol(s). Communications component 14 can be operative to create or connect to a communication network or link of a network. Communications component 14 can provide wireless communications using any suitable short-range or long-range communications protocol, such as Wi-Fi (e.g., an 802.11 protocol), ZigBee™ (e.g., an 802.15.4 protocol), WiDi™, Ethernet, Bluetooth™ Low Energy ("BLE"), ultra-wideband, radio frequency systems (e.g., 1200 MHz, 2.4 GHz, and 5.6 GHz communication systems), high frequency systems (e.g., 900 MHz, 2.4 GHz, and 5.6 GHz communication systems), near field communication ("NFC"), infrared, protocols used by wireless and cellular telephones and personal e-mail devices, transmission control protocol/internet protocol ("TCP/IP") (e.g., any of the protocols used in each of the TCP/IP layers), Stream Control Transmission Protocol ("SCTP"), Dynamic Host Configuration Protocol ("DHCP"), hypertext transfer protocol ("HTTP"), BitTorrent™, file transfer protocol ("FTP"), real-time transport protocol ("RTP"), real-time streaming protocol ("RTSP"), real-time control protocol ("RTCP"), Remote Audio Output Protocol ("RAOP"), Real Data Transport Protocol™ ("RDTP"), User Datagram Protocol ("UDP"), secure shell protocol ("SSH"), wireless distribution system ("WDS") bridging, any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multi-band, etc.), any communications protocol that may be used by a low power Wireless Personal Area Network ("6LoWPAN") module, any other communications protocol, or any combination thereof. Communications component 14 can also be operative to connect to a wired communications link or directly to another data source wirelessly or via one or more wired connections or other suitable connection type(s). Communications component 14 may be a network interface that may include the mechanical, electrical, and/or signaling circuitry for communicating data over physical links that may be coupled to other devices of a network. Such network interface(s) may be configured to transmit and/or receive any suitable data using a variety of different communication protocols, including, but not limited to, TCP/IP, UDP, ATM, synchronous optical networks ("SONET"), any suitable wired protocols or wireless protocols now known or to be discovered, Frame Relay, Ethernet, Fiber Distributed Data Interface ("FDDI"), and/or the like. In some embodiments, one, some, or each of such network interfaces may be configured to implement one or more virtual network interfaces, such as for Virtual Private Network ("VPN") access. Communications component 14 may also include or may be electrically coupled to any suitable transceiver circuitry that can enable subsystem 120 to be communicatively coupled to another subsystem and communicate data with that other device wirelessly or via a wired connection (e.g., using a connector port). Communications component 14 (and/or sensor assembly 15) may be configured to determine a geographical position of subsystem 120 and/or any suitable data that may be associated with that position. For example, communications component 14 may utilize a global positioning system ("GPS") or a regional or site-wide positioning system that may use cell tower positioning technology or Wi-Fi™ technology, or any suitable location-based service or real-time locating system, which may use a geo-fence for providing any suitable location-based data to subsystem 120 (e.g., to determine a current geo-location of subsystem 120 and/or any other suitable associated data.

Sensor 15 may be any suitable sensor that may be configured to sense any suitable data for subsystem 120 (e.g., location-based data via a GPS ("Global Positioning System") sensor system, motion data, environmental data, biometric data, etc.). Sensor 15 may be a sensor assembly that may include any suitable sensor or any suitable combination of sensors operative to detect movements of subsystem 120 and/or of any user thereof and/or any other characteristics of subsystem 120 and/or of its environment (e.g., physical activity or other characteristics of a user of subsystem 120, light content of the environment of subsystem 120, gas content of the environment of subsystem 120, noise content of the environment of subsystem 120, altitude of subsystem 120, speed of subsystem 120, etc.). Sensor 15 may include any suitable sensor(s), including, but not limited to, one or more of a GPS sensor, wireless communication sensor, image sensor, inertial sensor (e.g., inertial measurement unit ("IMU")), accelerometer, directional sensor (e.g., compass), gyroscope, motion sensor, pedometer, passive infrared sensor, ultrasonic sensor, microwave sensor, a tomographic motion detector, a camera, a biometric sensor, a light sensor, a timer, or the like. Sensor 15 may include any suitable sensor components or subassemblies for detecting any suitable movement of subsystem 120 and/or of a user thereof. For example, sensor 15 may include one or more three-axis acceleration motion sensors (e.g., an accelerometer) that may be operative to detect linear acceleration in three directions (i.e., the Y- or left/right direction, the Z- or up/down direction, and the X- or forward/backward direction). As another example, sensor 15 may include one or more single-axis or two-axis acceleration motion sensors that may be operative to detect linear acceleration only along each of the Y- or left/right direction and the Z- or up/down direction, or along any other pair of directions. In some embodiments, sensor 15 may include an electrostatic capacitance (e.g., capacitance-coupling) accelerometer that may be based on silicon micro-machined micro electro-mechanical systems ("MEMS") technology, including a heat-based MEMS type accelerometer, a piezoelectric type accelerometer, a piezo-resistance type accelerometer, and/or any other suitable accelerometer (e.g., which may provide a pedometer or other suitable function). Sensor 15 may be operative to directly or indirectly detect rotation, rotational movement, angular displacement, tilt, position, orientation, motion along a non-linear (e.g., arcuate) path, or any other non-linear motions. Additionally or alternatively, sensor 15 may include one or more angular rate, inertial, and/or gyro-motion sensors or gyroscopes for detecting rotational movement. For example, sensor 15 may include one or more rotating or vibrating elements, optical gyroscopes, vibrating gyroscopes, gas rate gyroscopes, ring gyroscopes, magnetometers (e.g., scalar or vector magnetometers), compasses, and/or the like. Any other suitable sensors may also or alternatively be provided by sensor 15 for detecting motion on subsystem 120, such as any suitable pressure sensors, altimeters, or the like. Using sensor 15, subsystem 120 may be configured to determine a velocity, acceleration, orientation, and/or any other suitable motion attribute of subsystem 120 (e.g., a direction and/or strength of an impact (e.g., a crash involving a vehicle 90)). One or more biometric sensors may be multi-modal biometric sensors and/or operative to detect long-lived biometrics, modern liveness (e.g., active, passive, etc.) biometric detection, and/or the like. Sensor 15 may include any suitable sensor components or subassemblies for detecting any suitable biometric data and/or health data and/or the like of a user of user subsystem 120. For example, sensor 15 may include any suitable biometric sensor that may include, but is not limited to, one or more facial recognition sensors, fingerprint scanners, iris scanners, retinal scanners, voice recognition sensors, gait sensors, hair sensors, hand geometry sensors, signature scanners, keystroke dynamics sensors, vein matching sensors, heart beat sensors, body temperature sensors, odor or scent sensors, behavioral biometric sensors (e.g., behavioral modeling of movement, orientation, gesture, pausality, etc.), DNA sensors, sensors for any unclonable or extremely difficult to replicate personal function, and/or any other suitable sensors for detecting any suitable metrics related to any suitable characteristics of a user, which may also include health-related optical sensors, capacitive sensors, thermal sensors, electric field ("eField") sensors, and/or ultrasound sensors, such as photoplethysmogram ("PPG") sensors, electrocardiography ("ECG") sensors, galvanic skin response ("GSR") sensors, posture sensors, stress sensors, photoplethysmogram sensors, and/or the like. These sensors can generate data providing health-related information associated with the user. For example, PPG sensors can provide information regarding a user's respiratory rate, blood pressure, and/or oxygen saturation. ECG sensors can provide information regarding a user's heartbeats. GSR sensors can provide information regarding a user's skin moisture, which may be indicative of sweating and can prioritize a thermostat application to determine a user's body temperature. In some examples, each sensor can be a separate device, while, in other examples, any combination of two or more of the sensors can be included within a single device. Sensor 15 may include a microphone, camera, scanner (e.g., a barcode scanner or any other suitable scanner that may obtain product identifying information from a code, such as a linear barcode, a matrix barcode (e.g., a quick response ("QR") code), or the like), proximity sensor, light detector, temperature sensor, motion sensor, biometric sensor (e.g., a fingerprint reader or other feature (e.g., facial or gait) recognition sensor, which may operate in conjunction with a feature-processing application that may be accessible to subsystem 120 for attempting to authenticate a user and/or determine their current mood or other suitable health factor(s)), line-in connector for data and/or power, and/or combinations thereof. In some examples, each sensor can be a separate device, while, in other examples, any combination of two or more of the sensors can be included within a single subsystem or device. For example, a gyroscope, accelerometer, photoplethysmogram, galvanic skin response sensor, and temperature sensor can be included within a wearable electronic device, such as a smart watch, while a scale, blood pressure cuff, blood glucose monitor, SpO2 sensor, respiration sensor, posture sensor, stress sensor, and asthma inhaler can each be separate devices. While specific examples are provided, it should be appreciated that other sensors can be used and other combinations of sensors can be combined into a single subsystem or device. Motion sensor(s) may be used to facilitate movement and orientation related functions of subsystem 10 and/or associated apparatus, for example, to detect movement, direction, and/or orientation of subsystem 120. While specific examples are provided, it should be appreciated that other sensors can be used and other combinations of sensors can be combined into a single subsystem 120. Subsystem 120 can further include a timer that can be used, for example, to add time dimensions to various attributes of any detected element(s). Sensor 15 may include any suitable sensor components or subassemblies for detecting any suitable characteristics of any suitable condition of the lighting of the environment of subsystem 120. For example, sensor 15 may include any suitable light sensor that may include, but is not limited to, one or more ambient visible light color sensors, illuminance ambient light level sensors, ultraviolet ("UV") index and/or UV radiation ambient light sensors, and/or the like. Any suitable light sensor or combination of light sensors may be provided for determining the illuminance or light level of ambient light in the environment of subsystem 120 (e.g., in lux or lumens per square meter, etc.) and/or for determining the ambient color or white point chromaticity of ambient light in the environment of subsystem 120 (e.g., in hue and colorfulness or in x/y parameters with respect to an x-y chromaticity space, etc.) and/or for determining the UV index or UV radiation in the environment of subsystem 120 (e.g., in UV index units, etc.). Sensor 15 may include any suitable sensor components or subassemblies for detecting any suitable characteristics of any suitable condition of the lighting of the environment or otherwise of subsystem 120. For example, sensor 15 may include any suitable light sensor that may include, but is not limited to, one or more ambient visible light color sensors, illuminance ambient light level sensors, ultraviolet ("UV") index and/or UV radiation ambient light sensors, and/or the like. Any suitable light sensor or combination of light sensors may be provided for determining the illuminance or light level of ambient light in the environment of subsystem 120 (e.g., in lux or lumens per square meter, etc.) and/or for determining the ambient color or white point chromaticity of ambient light in the environment of subsystem 120 (e.g., in hue and colorfulness or in x/y parameters with respect to an x-y chromaticity space, etc.) and/or for determining the UV index or UV radiation in the environment of subsystem 120 (e.g., in UV index units, etc.). A suitable light sensor may include, for example, a photodiode, a phototransistor, an integrated photodiode and amplifier, or any other suitable photo-sensitive device. In some embodiments, more than one light sensor may be integrated into subsystem 120. For example, multiple narrowband light sensors may be integrated into subsystem 120 and each light sensor may be sensitive in a different portion of the light spectrum (e.g., three narrowband light sensors may be integrated into a single sensor package: a first light sensor may be sensitive to light in the red region of the electromagnetic spectrum; a second light sensor may be sensitive in a blue region of the electromagnetic spectrum; and a third light sensor may be sensitive in the green portion of the electromagnetic spectrum). Additionally or alternatively, one or more broadband light sensors may be integrated into subsystem 120. The sensing frequencies of each narrowband sensor may also partially overlap, or nearly overlap, that of another narrowband sensor. Each of the broadband light sensors may be sensitive to light throughout the spectrum of visible light and the various ranges of visible light (e.g., red, green, and blue ranges) may be filtered out so that a determination may be made as to the color of the ambient light. As used herein, "white point" may refer to coordinates in a chromaticity curve that may define the color "white." For example, a plot of a chromaticity curve from the Commission International de l'Eclairage ("CIE") may be accessible to the system, wherein the circumference of the chromaticity curve may represent a range of wavelengths in nanometers of visible light and, hence, may represent true colors, whereas points contained within the area defined by the chromaticity curve may represent a mixture of colors. A Planckian curve may be defined within the area defined by the chromaticity curve and may correspond to colors of a black body when heated. The Planckian curve passes through a white region (i.e., the region that includes a combination of all the colors) and, as such, the term "white point" is sometimes generalized as a point along the Planckian curve resulting in either a bluish white point or a yellowish white point. However, "white point" may also include points that are not on the Planckian curve. For example, in some cases the white point may have a reddish hue, a greenish hue, or a hue resulting from any combination of colors. The perceived white point of light sources may vary depending on the ambient lighting conditions in which the lights source is operating. Such a chromaticity curve plot may be used in coordination with any sensed light characteristics to determine the ambient color (e.g., true color) and/or white point chromaticity of the environment of subsystem 120 in any suitable manner. Any suitable UV index sensors and/or ambient color sensors and/or illuminance sensors may be provided by sensor 15 in order to determine the current UV index and/or chromaticity and/or illuminance of the ambient environment of subsystem 120. Sensor 15 may include any suitable sensor components or subassemblies for detecting any suitable characteristics of any suitable condition of the air quality of the environment of subsystem 120. For example, sensor 15 may include any suitable air quality sensor that may include, but is not limited to, one or more ambient air flow or air velocity meters, ambient oxygen level sensors, volatile organic compound ("VOC") sensors, ambient humidity sensors, ambient temperature sensors, and/or the like. Any suitable ambient air sensor or combination of ambient air sensors may be provided for determining the oxygen level of the ambient air in the environment of subsystem 120 (e.g., in $O_2\%$ per liter, etc.) and/or for determining the air velocity of the ambient air in the environment of subsystem 120 (e.g., in kilograms per second, etc.) and/or for determining the level of any suitable gas or potentially harmful substance (e.g., VOC (e.g., any suitable gasses, scents, odors, etc.) or particulate or dust or pollen or mold or the like) of the ambient air in the environment of subsystem 120 (e.g., in HG % per liter, etc.) and/or for determining the humidity of the ambient air in the environment of subsystem 120 (e.g., in grams of water per cubic meter, etc. (e.g., using a hygrometer)) and/or for determining the temperature of the ambient air in the environment of subsystem 120 (e.g., in degrees Celsius, etc. (e.g., using a thermometer)). Sensor 15 may include any suitable sensor components or subassemblies for detecting any suitable characteristics of any suitable condition of the sound quality of the environment of subsystem 120. For example, sensor 15 may include any suitable sound quality sensor that may include, but is not limited to, one or more microphones or the like that may determine the level of sound pollution or noise in the environment of subsystem 120 (e.g., in decibels, etc.). Sensor 15 may also include any other suitable sensor for determining any other suitable characteristics about a user of subsystem 120 and/or the environment of subsystem 120 and/or any situation or scenario within which subsystem 120 may exist. For example, any suitable clock and/or position sensor(s) may be provided to determine the current time and/or time zone within which subsystem 120 may be located. Sensor 15 may be embedded in a body (e.g., housing 11) of subsystem 120, such as along a bottom surface that may be operative to contact a user, or can be positioned at any other desirable location. In some examples, different sensors can be placed in different locations inside or on the surfaces of subsystem 120 (e.g., some located inside housing 11 (e.g., any suitable component of a vehicle (e.g., along an interior and/or exterior surface of a vehicle door, roof, rack and/or the like)), some coupled to or otherwise provided by an attachment mechanism (e.g., a wrist band coupled to a housing of a wearable device), and/or the like). In other examples, one or more sensors can be worn by a user separately as different parts of a single subsystem 120 or as different subsystems or devices. In such cases, the sensors can be configured to communicate with subsystem 120 using a wired and/or wireless technology (e.g., via communications component 14). In some examples, sensors can be configured to communicate with each other and/or share data collected from one or more sensors. While specific examples are provided, it should be appreciated that other sensors can be used and other combinations of sensors can be combined into a single device. Using one or more of these sensors, physiological characteristics of a user may be detected during different scenarios, such as a heart rate of a user during a scenario, average body temperature of a user during a scenario, any normal or abnormal physical conditions associated with the user during a scenario, or the like. In some examples, a GPS sensor or any other suitable location detection component(s) can be used to determine a vehicle's and/or user's location (e.g., geo-location and/or address and/or location). An accelerometer, directional sensor, and/or gyroscope can further generate activity data that can be used to determine whether a user of a vehicle is engaging in an activity, is inactive, or is performing a gesture (e.g., sleeping, eating, talking, reading, etc.). Any suitable activity of a user may be tracked by sensor(s) 15, including, but not limited to, sleeping, reading, talking, eating, and/or the like and may be used as any suitable auxiliary data. The subsystem can further include a timer that can be used, for example, to add time dimensions to various attributes of the detected scenario.

Power supply 17 can include any suitable circuitry for receiving and/or generating power, and for providing such power to one or more of the other components of subsystem 120. For example, power supply assembly 17 can be coupled to a power grid (e.g., when subsystem 120 is not acting as a portable device or when a battery of the device is being charged at an electrical outlet with power generated by an electrical power plant). As another example, power supply assembly 17 may be configured to generate power from a natural source (e.g., solar power using solar cells). As another example, power supply assembly 17 can include one or more batteries for providing power (e.g., when subsystem 120 is acting as a portable device). Subsystem 120 may also be provided with a housing 11 that may at least partially enclose one or more of the components of subsystem 120 for protection from debris and other degrading forces external to subsystem 120. Each component of subsystem 120 may be included in the same housing 11 (e.g., as a single unitary device, such as a portable media device or server) and/or different components may be provided in different housings (e.g., a keyboard input component may be provided in a first housing that may be communicatively coupled to a processor component and a display output component that may be provided in a second housing, such as in a desktop computer set-up). In some embodiments, subsystem 120 may include other components not combined or included in those shown or several instances of the components shown.

Processor 12 may be used to run one or more applications, such as an application 19 that may be accessible from memory 13 (e.g., as a portion of data 19*d*) and/or any other suitable source (e.g., from any other device in its system). Application 19 may include, but is not limited to, one or more operating system applications, firmware applications, communication applications (e.g., for enabling communication of data between devices), third party service applications, internet browsing applications (e.g., for interacting with a website provided by a third party subsystem (e.g., subsystem 40)), application programming interfaces ("APIs"), software development kits ("SDKs"), proprietary applications (e.g., a web application or a native application) for enabling subsystem 120 to interact with an online service and/or one or more other subsystems and/or the like, which may include applications for routing protocols, SDN modules based on OpenFlow, P4, or other network data plane programming standards, machine learning algorithms, network management functions, etc., any other suitable applications, such as applications for detecting and reacting to impact on a vehicle and/or detecting and reacting to and/or adjusting the positioning of travelers and components (e.g., doors, roofs, racks, etc.) of and within a vehicle (e.g., to adjust the position of any vehicle feature (e.g., door, roof, rack, etc.)), applications for detecting and reacting to communicative coupling to/decoupling from any suitable portable media device, applications for detecting and reacting to certain vehicle conditions (e.g., safety conditions, such as an object being in the path of a door or rack or roof, occupancy conditions, such as a rack not supporting any objects (e.g., as may be determined by an occupation classification system), movement conditions, such as the vehicle not moving (e.g., as may be determined by a vehicle speedometer), and/or the like), and/or the like. For example, processor 12 may load an application 19 as an interface program to determine how instructions or data received via an input component 16*i* of I/O component 16 or other component of subsystem 120 (e.g., sensor 15 and/or communications component 14) may manipulate the way in which information may be stored (e.g., in memory 13) and/or provided via an output component 16*o* of I/O component 16 (e.g., presented to a user on a display or actuator manipulation to adjust the functionality and/or position of any suitable component (e.g., haptic actuator, olfactory actuator, lighting actuator, seat, steering wheel, etc.)) and/or communicated to another system device via communications component 14. As one example, application 19 may be firmware. As another example, application 19 may be a third party application that may be running on subsystem 120 (e.g., an application associated with the network of system 1) that may be loaded on subsystem 120 in any suitable manner, such as via an application market (e.g., using communications component 14), such as the Apple App Store or Google Play, or that may be accessed via an internet application or web browser (e.g., by Apple Safari or Google Chrome) that may be running on subsystem 120 and that may be pointed to a uniform resource locator ("URL") whose target or web resource may be managed by or otherwise affiliated with any suitable entity. Any subsystem may include any suitable special purpose hardware (e.g., hardware support of high-speed packet processing, hardware support of machine learning algorithms, etc.). Processor 12 may include suitable logic, circuitry, and/or code that may enable processing data and/or controlling operations of subsystem 120. In this regard, processor 12 may be enabled to provide control signals to various other components of subsystem 120. Processor 12 may also control transfers of data between various portions of subsystem 120. Processor 12 may further implement an operating system or may otherwise execute code to manage operations of subsystem 120.

Subsystem 120 may be any portable, mobile, wearable, implantable, or hand-held electronic device configured to operate with system 1. Alternatively, subsystem 120 may not be portable during use, but may instead be generally fixed (e.g., permanently coupled to a vehicle or in a server center or the like). Subsystem 120 can include, but is not limited to, a media player, video player, still image player, game player, other media player, music recorder, movie or video camera or recorder, still camera, other media recorder, radio, medical equipment, domestic appliance, smart appliance (e.g., smart door knob, smart door lock, etc.), transportation vehicle instrument, musical instrument, calculator, cellular telephone, other wireless communication device, personal digital assistant, remote control, pager, computer (e.g., a desktop, laptop, tablet, server, etc.), monitor, television, stereo equipment, set up box, set-top box, wearable device, boom box, modem, router, printer, kiosk, beacon, server, object (e.g., door, roof, rack) repositioning management system, sensory feedback management system, and any combinations thereof. Subsystem 120 may be configured to have any physical structure (e.g., by one or more housings 11) that may include, but is not limited to, any suitable portable, mobile, wearable, implantable, rideable, controllable, or hand-held mobile electronic device (e.g., a portable and/or handheld media player), a headset, a helmet, glasses, a wearable, a tablet computer, a laptop computer, a controller, a VR and/or AR and/or MR device, a vehicle, server, sensor system, actuator system, and/or any other machine or device or housing or structure that can be utilized to manage variables of an apparatus (e.g., vehicle 290). Alternatively, subsystem 120 may not be portable during use, but may instead be generally stationary. In one or more implementations, one or more of processor 12, memory 13, sensor(s) 15, communications interface or communications component 14, I/O component 16, and/or power supply 17, and/or one or more portions thereof, may be implemented in software (e.g., subroutines and code), may be implemented in hardware (e.g., an application specific integrated circuit ("ASIC"), a field programmable gate array ("FPGA"), a programmable logic device ("PLD"), a controller, a state machine, gated logic, discrete hardware components, or any other suitable devices), and/or a combination of both. Variations in the arrangement and type of the components may be made without departing from the spirit or scope of the claims as set forth herein. Additional components, different components, or fewer components may be provided.

In some embodiments, processor 12 may be used to run one or more applications that may be accessible from memory 13 and/or from any other suitable source (e.g., an application from VMS subsystem 10 via an active internet connection or otherwise at and for use by a subsystem 100). Such an application may include, but is not limited to, one or more operating system applications, firmware applications, communication applications, internet browsing applications (e.g., for interacting with a website provided by VMS subsystem 10 for enabling a subsystem 92 or 100 to interact with an online service of VMS subsystem 10 (e.g., a VMSP)), VMS applications (e.g., a web application or a native application or a hybrid application that may be at least partially produced by VMS subsystem 10 for enabling a subsystem 92 or 100 to interact with an online service of VMS subsystem 10 (e.g., a VMSP)), or any other suitable applications. As one example, an application of a subsystem 100 may provide a user or a communicatively coupled device (e.g., control module 92) with the ability to interact with a vehicle management service or the VMSP of VMS subsystem 10, where such an application may be a third party application that may be running on a subsystem 100 (e.g., an application (e.g., software and/or firmware) associated with VMS subsystem 10 that may be loaded on subsystem 100 from VMS subsystem 10 or via an application market) and/or that may be accessed via an internet application or web browser running on subsystem 100 (e.g., processor 12) that may be pointed to a uniform resource locator ("URL") whose target or web resource may be managed by VMS subsystem 10 or any other remote subsystem. One, some, or each subsystem 100 may be a portable media device (e.g., a smartphone), a laptop computer, a tablet computer, a desktop computer, an appliance, a wearable electronic device, a virtual reality device, a dongle device, at least one web or network server (e.g., for providing an online resource, such as a website or native online application, for presentation on one or more other subsystems) with an interface for an administrator of such a server, and/or the like.

Some or all portions of VMS subsystem 10 may be operated, managed, or otherwise at least partially controlled by an entity (e.g., administrator) responsible for providing a vehicle management service to one or more clients or other suitable entities. VMS subsystem 10 may communicate with one or more subsystems 100 via communications network 50. Network 50 may be the internet or any other suitable network, such that when intercoupled via network 50, any two subsystems of system 1 may be operative to communicate with one another (e.g., a subsystem 92 or 100 may access information (e.g., from an application 19 or data 19$d$ of VMS subsystem 10, as may be provided as a vehicle management service via processor 12 and communications component 14 of VMS subsystem 10) as if such information were stored locally at that subsystem (e.g., in its memory component 13)).

Figure 1B:
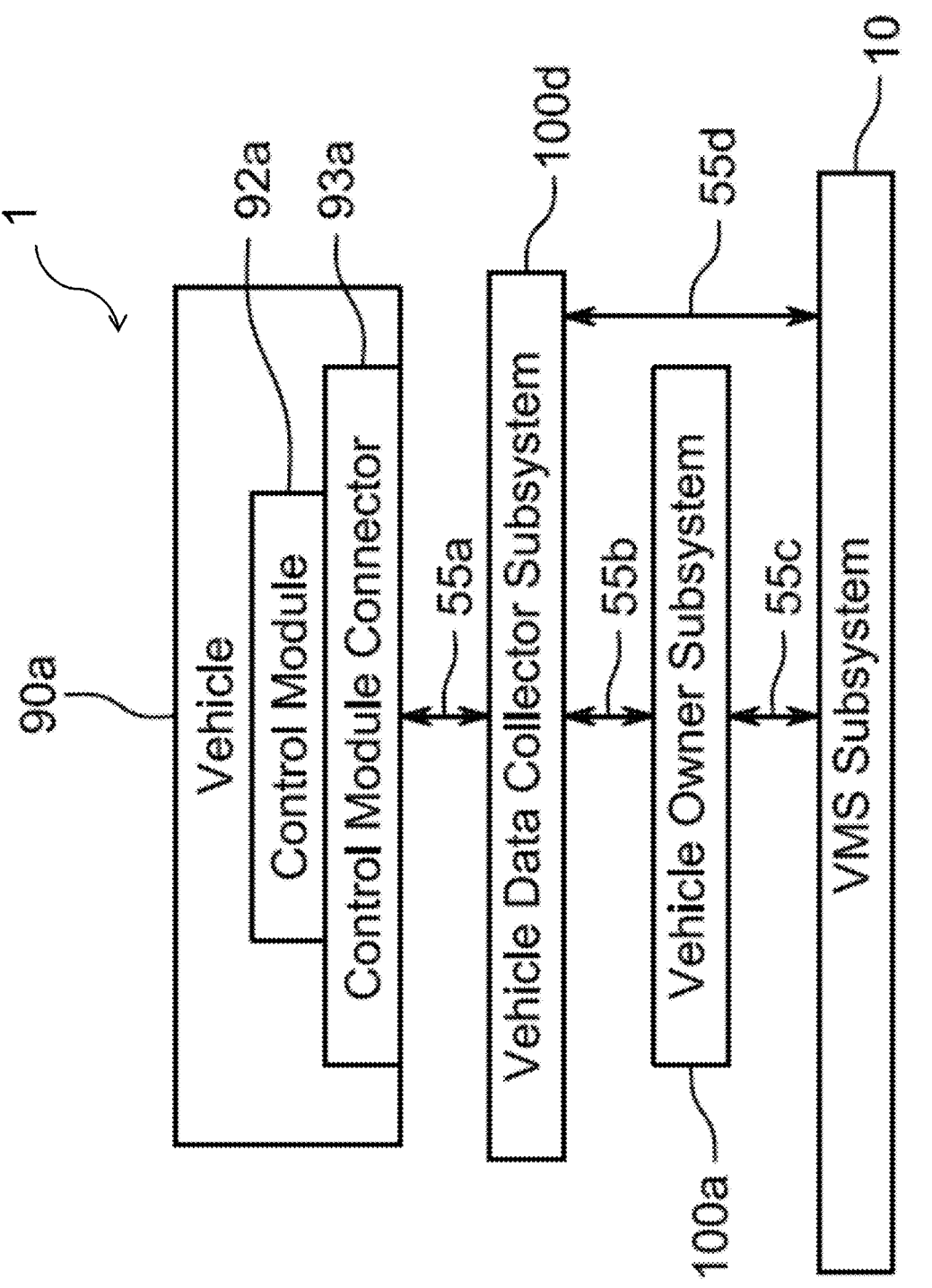
FIG. 1B is a more detailed schematic view of a portion of the system of FIG. 1, in accordance with some embodiments of the disclosure.
Figure 1C:
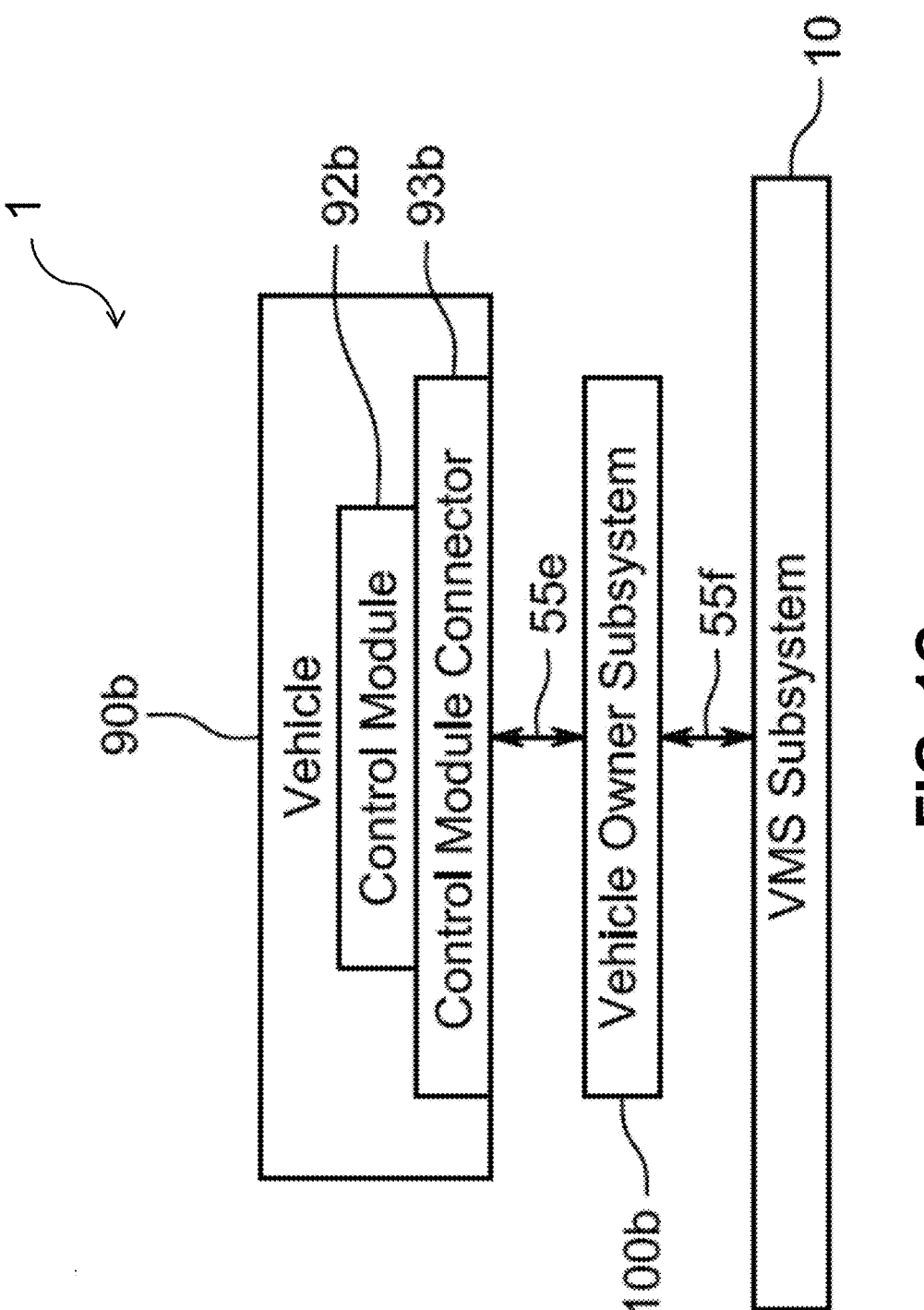
FIG. 1C is a more detailed schematic view of another portion of the system of FIG. 1, in accordance with some embodiments of the disclosure.

Various clients and/or partners may be enabled to interact with VMS subsystem 10 for enabling the vehicle management services and the VMSP. For example, at least one vehicle owner subsystem of system 1 (e.g., each one of the one or more vehicle owner subsystems 100$a$-100$c$) may be any suitable subsystem (e.g., portable computer and/or infotainment or other suitable device that may be fixed or removably coupled to a vehicle for use by its passenger(s)) operated by any suitable vehicle owner ("VO") that may own, rent, or otherwise have access to (e.g., appropriately use) a vehicle (e.g., a respective one of the one or more vehicles 90$a$-90$c$ (e.g., any suitable motor vehicle (e.g., car, truck, bus, motorcycle, etc.), railed vehicle (e.g., train, tram, etc.), watercraft (e.g., ship, boat, jet ski, etc.), aircraft (e.g., airplane, helicopter, drone, etc.), hover vehicle, spacecraft, a drone (e.g., a multirotor drone), and/or the like)). At least one vehicle data collector subsystem of system 1 (e.g., each one of the one or more vehicle data collector subsystems 100$d$-100$f$) may be any suitable subsystem (e.g., dongle device) that may be communicatively coupled to a respective vehicle owner subsystem (e.g., via a network 50) and to a respective control module (e.g., via direct installation) of a respective vehicle (e.g., VDC subsystem 100$d$ may be communicatively coupled to VO subsystem 100$a$ and to CM 92$a$ of vehicle 90$a$ that may be owned by the operator of VO subsystem 100$a$, VDC subsystem 100$e$ may be communicatively coupled to VO subsystem 100$b$ and to CM 92$b$ of vehicle 90$b$ that may be owned by the operator of VO subsystem 100$b$, and VDC subsystem 100$f$ may be communicatively coupled to VO subsystem 100$c$ and to CM 92$c$ of vehicle 90$c$ that may be owned by the operator of VO subsystem 100$c$). For example, a VDC subsystem may be any suitable on-board diagnostics ("OBD") device that may be operative to be communicatively coupled with any suitable control module of any suitable vehicle (e.g., via any suitable OBD-II data link connector of a vehicle (e.g., via a physical connection or wireless path)) that may be operative to monitor any suitable data from an engine control unit and/or electronic control unit ("ECU") of the vehicle and/or from any other data source of the vehicle that may be made available (e.g., according to the OBD protocol), such as a powertrain control module ("PCM") or otherwise. A VDC subsystem may be operative to send one or more requests to the CM of a vehicle for one or more specific parameters using one or more specific parameter identification numbers ("PIDs") (e.g., according to the Society of Automotive Engineers ("SAE") standard J1979) and then the VDC subsystem may communicate any received parameter data from the vehicle to a VO subsystem that may be communicatively coupled to the VDC subsystem (e.g., via any suitable wired or wireless communication protocol). For example, as shown in FIG. 1B, VDC subsystem 100$d$ may be communicatively coupled to any suitable control module connector 93$a$ via any suitable communications path 55$a$, which may be a direct physical connection between connector 93$a$ and a connector of VDC subsystem 100$d$ (e.g., a male connector of an I/O component 16 of VDC subsystem 100$d$ may physically mate with a female control module connector 93$a$ (e.g., any suitable OBD-II data link connector)) or any suitable wireless connection, where control module connector 93$a$ may be communicatively coupled to one, some, or all suitable control modules or data sources (e.g., control module 92$a$) of vehicle 90$a$, while VDC subsystem 100$d$ may be communicatively coupled to VO subsystem 100$a$ via any suitable communications path 55$b$ (e.g., any suitable wired or wireless communications path using any suitable communications protocol (e.g., Bluetooth between a communications component 14 of VDC subsystem 100$d$ and a communications component 14 of VO subsystem 100$a$)), while VO subsystem 100$a$ may be communicatively coupled to VMS subsystem 10 via any suitable communications path 55$c$ (e.g., any suitable wired or wireless communications path (e.g., of network 50 of FIG. 1) using any suitable communications protocol). Alternatively or additionally, as shown in FIG. 1B, VDC subsystem 100$d$ may be communicatively coupled to VMS subsystem 10 via any suitable communications path 55$d$ (e.g., any suitable wired or wireless communications path (e.g., of network 50 of FIG. 1) using any suitable communications protocol (e.g., any suitable long-range communications protocol between a communications component 14 of VDC subsystem 100$d$ and a communications component 14 of VMS subsystem 10 (e.g., using a low power communications component and/or any suitable telemetry functionality)) without VO subsystem 100$a$ as an intermediary). Additionally or alternatively, in some embodiments, a VO subsystem may be configured to communicate directly with a CM of a vehicle without the need for a distinct intermediary VDC subsystem. For example, as shown in FIG. 1C, VO subsystem 100$b$ may be communicatively coupled to any suitable control module connector 93$b$ via any suitable communications path 55$e$, which may be a direct wired connection between connector 93$b$ and a connector of VO subsystem 100$b$ (e.g., a connector of an I/O component 16 of VO subsystem 100$b$ may be communicatively coupled to a first connector of a cable of communications path 55*e* and a second connector of such a cable may be communicatively coupled with control module connector 93*b* (e.g., any suitable OBD-II data link connector)) or any suitable wireless path, where control module connector 93*b* may be communicatively coupled to one, some, or all suitable control modules or data sources (e.g., control module 92*b*) of vehicle 90*b*, while VO subsystem 100*b* may be communicatively coupled to VMS subsystem 10 via any suitable communications path 55*f* (e.g., any suitable wired or wireless communications path (e.g., of network 50 of FIG. 1) using any suitable communications protocol). In some embodiments, communications path 55*e* may be a wireless communications path between control module 92*b* and VO subsystem 100*b* (e.g., a wireless (e.g., Bluetooth) communication path between a communications component 14 of VO subsystem 100*b* and a communications component of control module 92*b* of vehicle 90*b*), such that a data connection may be facilitated directly between a user's portable electronic device and a computer of a vehicle directly through a wireless connection.

Each subsystem 92 and 100 of system 1 (e.g., each one of subsystems 92*a*-92*c* and 100*a*-100*f*) may be operated by any suitable entity for interacting in any suitable way with VMS subsystem 10 (e.g., via network 50) for deriving value from and/or adding value to a service of the VMSP of VMS subsystem 10. For example, a particular subsystem 100 may be a server operated by a client/partner entity that may receive any suitable data from VMS subsystem 10 related to any suitable vehicle management enhancement of the VMSP provided by VMS subsystem 10 (e.g., via network 50). Additionally or alternatively, a particular subsystem 100 may be a server operated by a client/partner entity that may upload or otherwise provide any suitable data to VMS subsystem 10 related to any suitable vehicle management service of the VMSP provided by VMS subsystem 10 (e.g., via network 50).

FIGS. 2 and 2A-2J show an illustrative vehicle 290 that may include at least one sensory feedback management system 250, in accordance with various embodiments of the disclosure, which may be similar to any suitable subsystem 120 and/or which may incorporate or utilize any suitable subsystem(s) of the vehicle. Vehicle 290 may be any suitable vehicle, which may be similar to any vehicle 90 (e.g., vehicles 90*a*-90*c*) described herein. In some embodiments, as shown, vehicle 290 may be any suitable automobile with at least one seat that may be used by any suitable user (e.g., user U). For example, as shown, vehicle 290 may include at least a front main seat 294*sfm* (e.g., a driver seat if the vehicle is able to be driven) for a front main passenger (not shown). Additionally, in some embodiments, as shown, vehicle 290 may also include at least one front auxiliary seat 294*sfa* for a front auxiliary passenger (not shown), and at least one rear seat for one or more rear passengers, such as a rear main seat 294*srm* for a rear main passenger (not shown) and/or a rear auxiliary seat 294*sra* for a rear auxiliary passenger (not shown). Although each seat for each passenger may be distinct in one or more ways from one another, any vehicle may be provided with a single seat that may be used simultaneously by two or more adjacent passengers (e.g., a bench type rear seat).

Vehicle 290 may include at least one door assembly (e.g., exterior door). For example, as shown, in some embodiments, vehicle 290 may include at least one passenger door for selectively providing a user access to a passenger cabin space 297*pc* provided by the vehicle, a trunk door for selectively providing access to a cargo or trunk space provided by the vehicle, a charging/fuel door for selectively providing access to a fuel tank or battery of the vehicle, and/or the like. For example, as shown, vehicle 290 may include a front main seat door assembly 294*dfm* that may be associated with providing passenger access to front main seat 294*sfm*, a front auxiliary seat door assembly 294*dfa* that may be associated with providing passenger access to front auxiliary seat 294*sfa*, a rear main seat door 294*drm* that may be associated with providing passenger access to rear main seat 294*srm*, a rear auxiliary seat door 294*dra* that may be associated with providing passenger access to rear auxiliary seat 294*sra*, a front trunk door 294*dtf* that may be associated with providing access to a front trunk or cargo space provided by the vehicle, a rear trunk door 294*dtr* that may be associated with providing access to a rear trunk or cargo space 297*trs* defined by a trunk assembly structure or trunk 294*tr* provided by the vehicle, a boost door 294*db* that may be associated with providing access to a fuel tank or battery of the vehicle (e.g., when at a gas station or charging station), and/or the like. One or more door assemblies may be provided with a window, such as a window that may be selectively lowered or raised (e.g., automatically based on certain events, in response to a user command, etc.). For example, as shown, front main seat door assembly 294*dfm* may include a front main seat door body 294*dfmb* and a front main seat door window 294*wfm* that may be selectively lowered (e.g., in the −Z direction) into a space defined by door body 294*dfmb* (e.g., an interior pocket thereof) and raised (e.g., in the +Z direction) out from such a space, and/or rear main seat door assembly 294*drm* may include a rear main seat door body 294*drmb* and a rear main seat door window 294*wrm* that may be selectively lowered (e.g., in the −Z direction) into a space defined by door body 294*drmb* (e.g., an interior pocket thereof) and raised (e.g., in the +Z direction) out from such a space.

A structural assembly 297 of vehicle 290 may include at least one front structural support, which may include apron(s) and/or a fire wall and/or A-pillar(s) or post(s), such as a front structural support or A-pillar assembly 297*ap* that may be configured to extend up from a rocker panel or sills or floorplan or chassis or any other suitable lower structural member 297*lsm* and support the lower (e.g., front), left, right, and/or upper (e.g., rear) periphery portions of a front windshield 294*wfw* (e.g., left and right A-pillars and aprons and the like about the entire periphery of the windshield) and/or support a front periphery portion of the front seat assemblies (e.g., the front side of front auxiliary seat door assembly 294*dfa* and the front side of front main seat door assembly 294*dfm* (e.g., front side 294*dfmfs* of door body 294*dfmb*)). Such an A-pillar 297*ap* may be configured to support at least a portion of a roof assembly of the vehicle (e.g., when the roof assembly is fully closed). In some embodiments, structural assembly 297 of vehicle 290 may include one or more B-pillars or posts, such as a full height B-pillar 297*bp* that may extend up between portions of adjacent doors from a rocker panel or sills or floorplan or chassis or any other suitable lower structural member 297*lsm* of the vehicle on each of the left and right sides of the vehicle and/or that may extend down from a roof rail or panel or any other suitable upper structural member 297*usm* of the vehicle on each of the left and right sides of the vehicle (e.g., a driver side B-pillar 297*bp* extending up from lower structural member 297*lsm* and between front main seat door assembly 294*dfm* and rear main seat door assembly 294*drm* to a driver side roof rail 297*usml*, and a passenger side B-pillar 297*bp* extending up from lower structural member 297*lsm* and between front auxiliary seat door assembly 294*dfa* and rear auxiliary seat door assembly 294*dra* to a passenger side roof rail 297*usmr*). In some embodiments, structural assembly 297 of vehicle 290 may include at least one rear structural support, which may include quarter panel(s) and/or a rear support and/or C-pillar(s) or post(s), such as a rear structural support or C-pillar assembly 297*cp* that may be configured to extend up from a rocker panel or sills or floorplan or chassis or any other suitable lower structural member 297*lsm* and support trunk 294*tr* and/or support a rear periphery portion of the rear seat assemblies (e.g., the rear side of rear auxiliary seat door assembly 294*dra* and the rear side of rear main seat door assembly 294*drm*). Such B-pillar and C-pillar structures may be configured to provide structural and/or security support for one or more doors (e.g., for providing structural support to and/or for latching door 294*dfm* and/or door 294*drm* when closed) and/or to provide structural support for at least a portion of a roof assembly of the vehicle (e.g., when the roof assembly is not fully open). For example, left upper structural member 297*usml* may be configured to couple a top rear left portion of A-pillar 297*ap* with a top front portion of B-pillar 297*bp* and to couple a top rear portion of B-pillar 297*bp* with a top front left portion of C-pillar 297*cp*, such that upper structural member 297*usml* and pillar structures 297*ap*, 297*bp*, and 297*cp* may provide a continuous left roof support structure 297*lrs* for the left side of the roof assembly when at least partially over passenger cabin space 297*pc*, while right upper structural member 297*usmr* may be configured to couple a top rear right portion of A-pillar 297*ap* with a top front portion of B-pillar 297*bp* and to couple a top rear portion of B-pillar 297*bp* with a top front right portion of C-pillar 297*cp*, such that upper structural member 297*usmr* and pillar structures 297*ap*, 297*bpr*, and 297*cp* may provide a continuous right roof support structure 297*rrs* for the right side of the roof assembly when at least partially over passenger cabin space 297*pc*. Alternatively, in some embodiments, a structural assembly of the vehicle may include only a half-height B-pillar that may extend up from lower structural member 297*lsm* only to a height of doors 294*dfm* and 294*drm* with their windows lowered but not the height of the doors with their windows raised up (see, e.g., a 1976 Chrysler New Yorker, where continuous left and right roof support structures may be provided between A- and C-pillars without any B-Pillars). Additionally or alternatively, in some embodiments, a structural assembly of the vehicle may include only a half-height C-pillar that may extend up from lower structural member 297*lsm* only to a height of doors 294*drm* and 294*dra* with their windows lowered but not the height of the doors with their windows raised up. For example, a structural assembly of vehicle 290 may not include any full height (or any) B-pillar structures nor any upper structural members 297*usm* and only a half-height C-pillar structure (e.g., no continuous left roof support structure and no continuous right roof support structure may be provided for the roof assembly). An A-pillar and/or any B-pillar(s) and/or any C-pillar(s) and/or upper structural members of structural assembly 297 may combine to provide any suitable structural support for any suitable door(s) and/or windows and/or roof of the vehicle. In some embodiments, a door (e.g., door 294*dfm*) may include not only a window (e.g., window 294*wfm*) that may be retractable into a main body (e.g., body 294*dfmb*) of the door, but also a window frame structure (not shown) that may permanently extend up from the main body structure of the door and about the periphery of the window (e.g., to provide support for the window when the window is in a non-retracted position and/or to engage with an A-Pillar and/or B-Pillar and/or C-Pillar and/or upper structural member of the vehicle's structural assembly (e.g., when the door is closed, but that may move with the door when the door is moved between its open and closed positions)).

Vehicle 290 may include a roof assembly, such as a roof 299*r*. The roof may be a permanent roof that is not retractable from a permanent position (e.g., a hardtop roof). Alternatively, the roof may be retractable or removable, such as a retractable or removable hardtop roof or a retractable or removable soft top roof. Alternatively, the roof may be a T-top roof, a targa top, and/or the like. In some embodiments, when roof 299*r* is configured to be retractable, roof 299*r* may be configured to be retractable into a portion of or a space adjacent to a rear trunk or cargo space 297*trs* provided by the vehicle (e.g., a space under rear trunk door 294*dtr*).

Vehicle 290 may include a rack assembly, such as a rack 298*r*, that may be selectively made accessible to a user when desired to mount any suitable cargo (e.g., a bicycle, cooler, etc. (e.g., bike cargo 291*cv*)) exterior to the housing of the vehicle, but that may be selectively retracted into (e.g., in a +X direction) a rack holding space 298*rhs* of a rack sleeve 298*rs* that may be positioned at least partially interior to and/or under the housing of the vehicle (e.g., a sleeve that may be coupled to any suitable portion of the vehicle, such as a floorboard or lower structural member 297*lsm* (e.g., underneath rear trunk or cargo space 297*trs*)). For example, rack 298*r* may be extended out from rack holding space 298*rhs* of rack sleeve 298*rs* via an exterior rack sleeve opening 298*rso* (e.g., in a −X direction) using any suitable rack repositioning actuator subsystem 296*ar* for controlling movement of rack 298*r* between fully open and closed positions.

Figure 2:
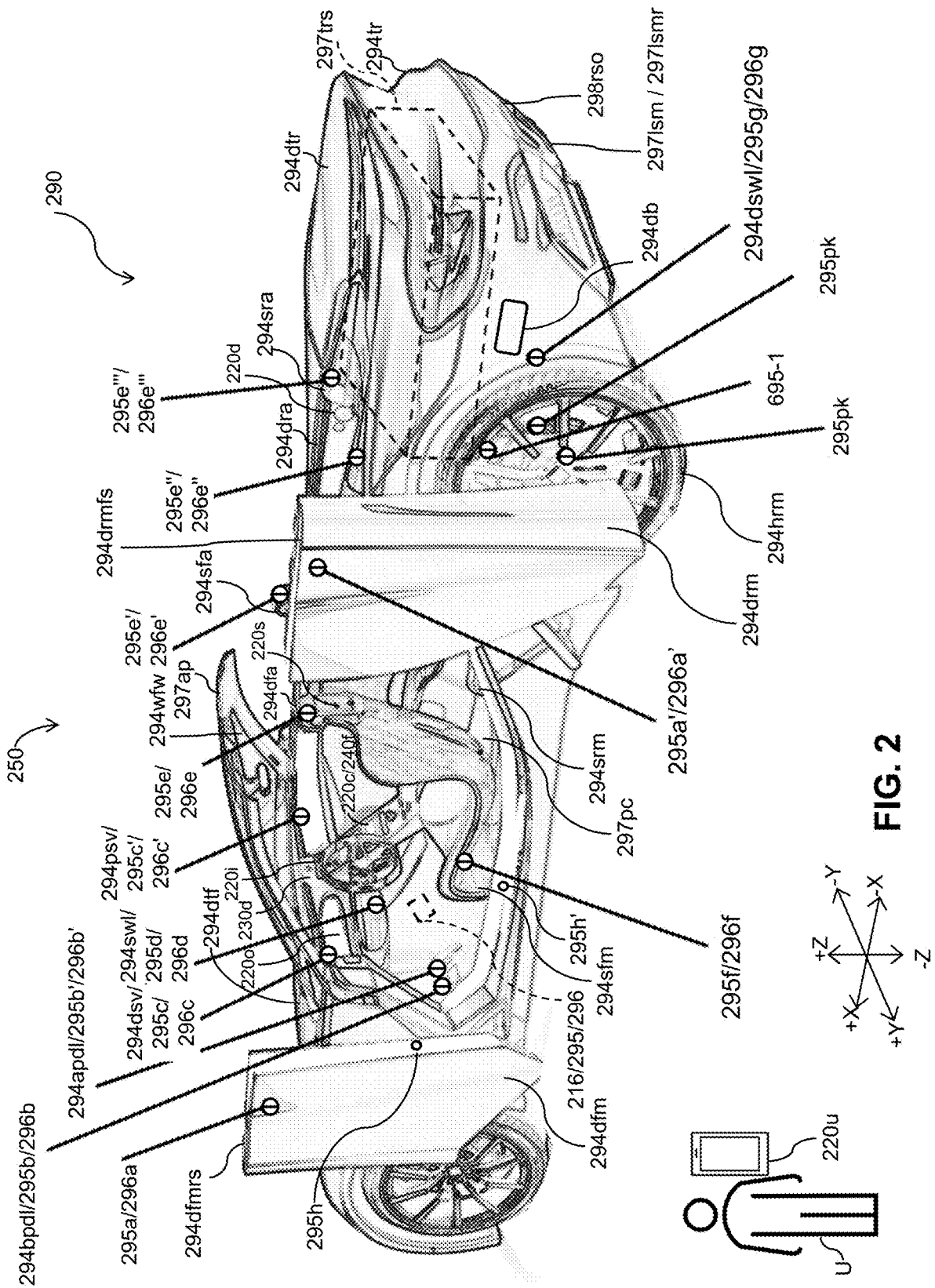
FIG. 2 is a top, left side, rear perspective view of a vehicle with a sensory feedback management system, in accordance with some embodiments of the disclosure.
Figure 2A:
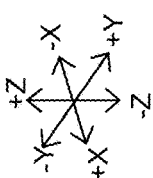
FIG. 2A is a top, left side, front perspective view of the vehicle of FIG. 2 in another configuration, in accordance with some embodiments of the disclosure.
Figure 2B:
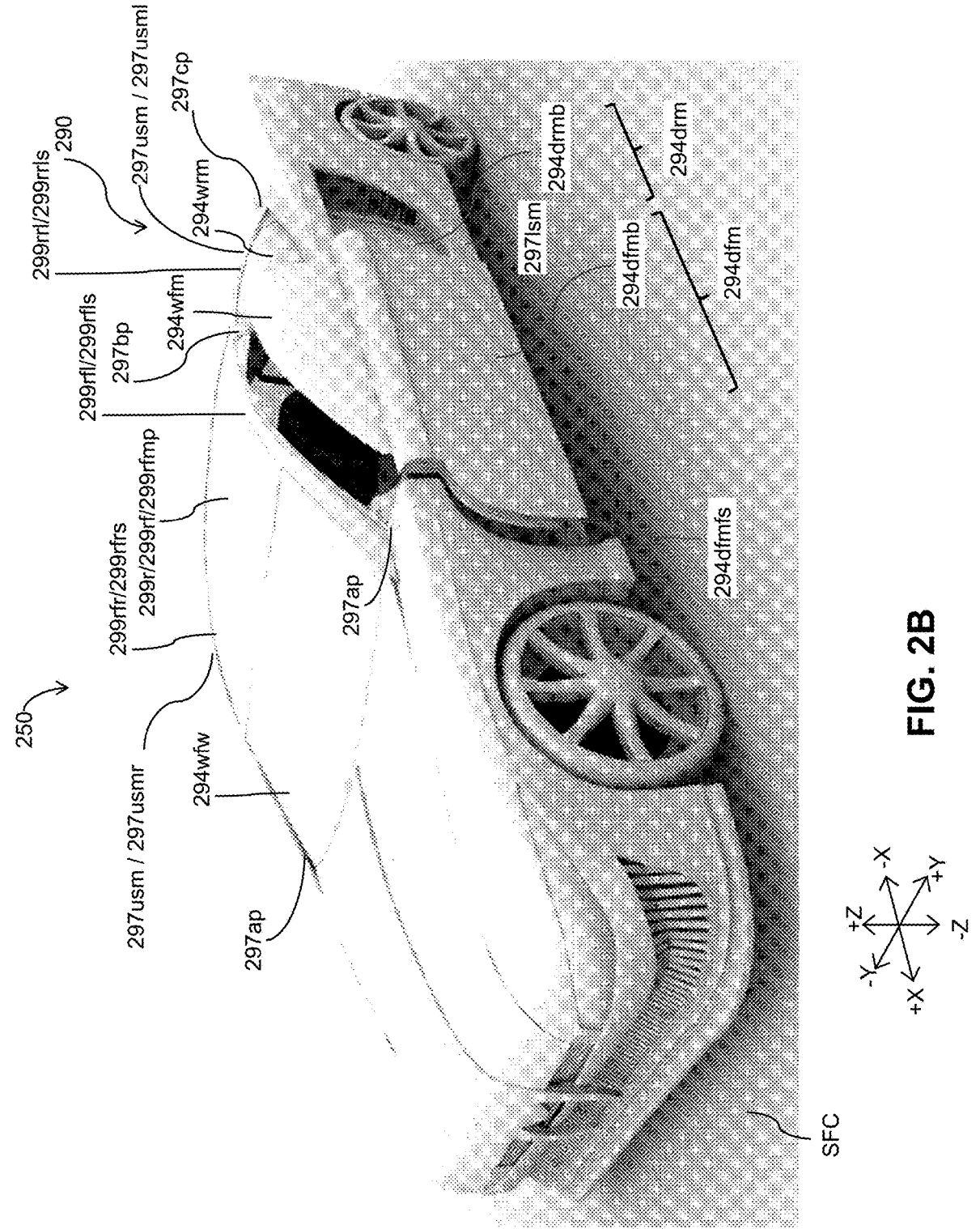
FIG. 2B is a top, left side, front perspective view of the vehicle of FIG. 2 in another configuration, in accordance with some embodiments of the disclosure.
Figure 2C:
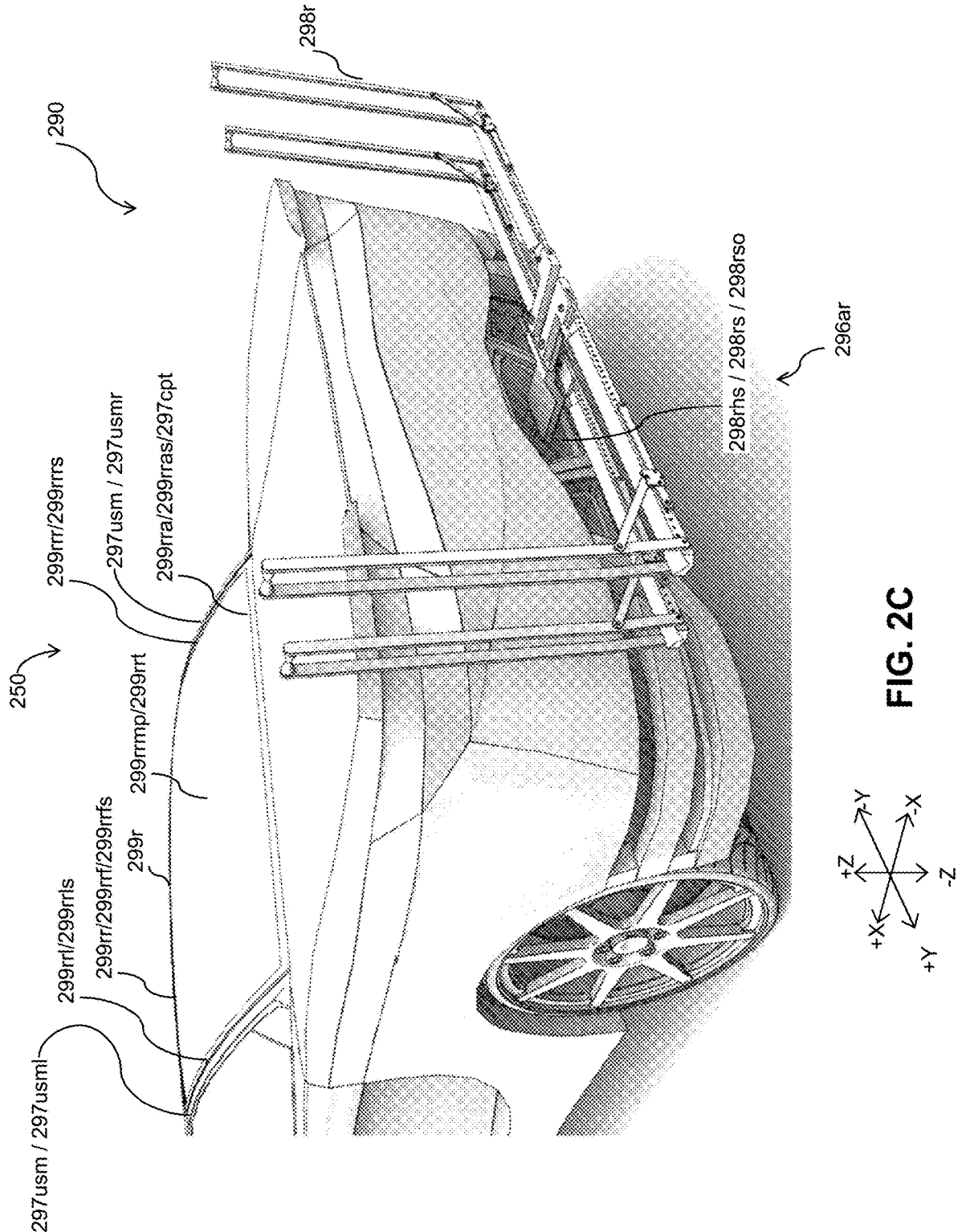
FIG. 2C is a top, left side, rear perspective view of the vehicle of FIG. 2 in another configuration, in accordance with some embodiments of the disclosure.
Figure 2D:
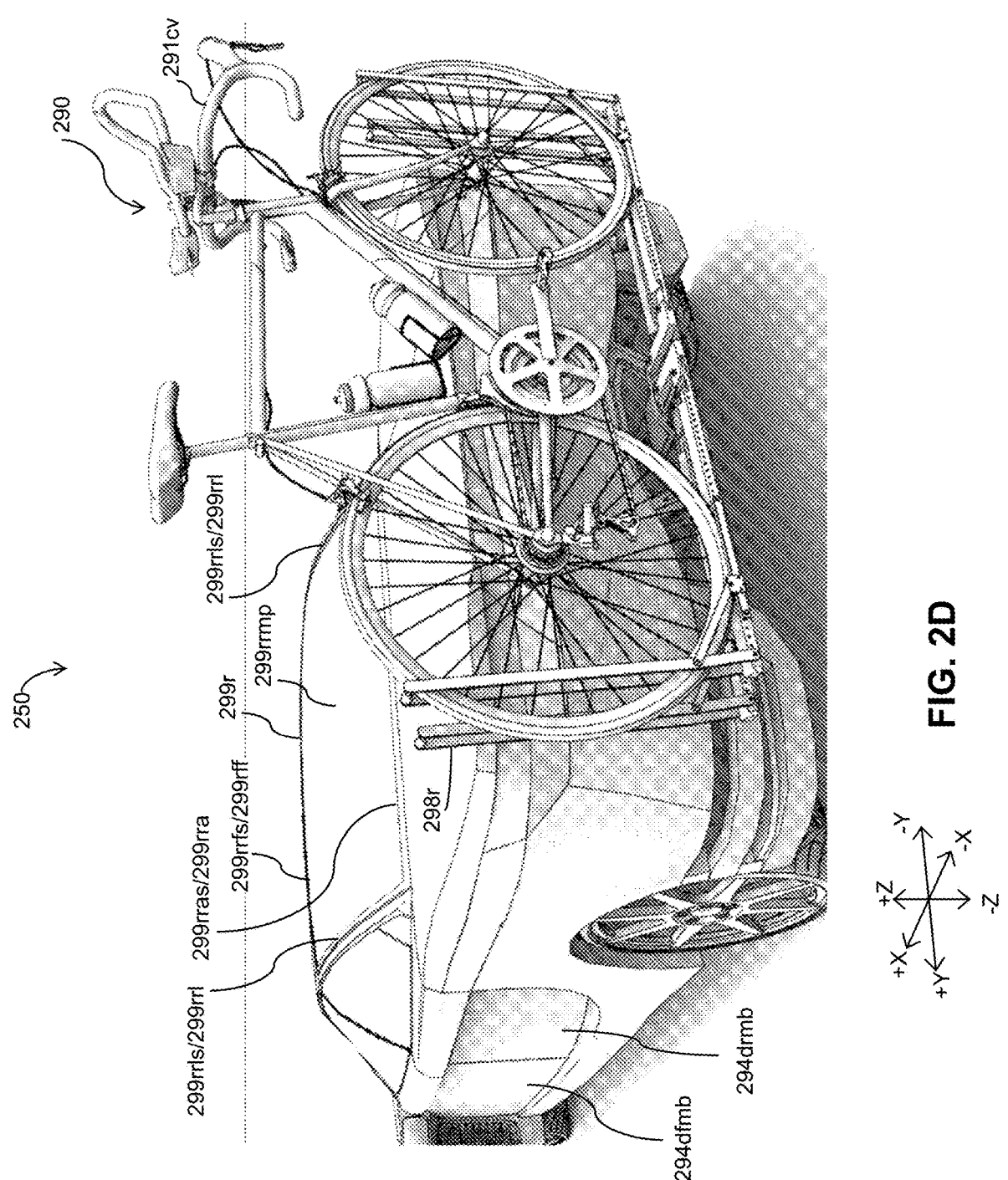
FIG. 2D is a top, left side, rear perspective view of the vehicle of FIG. 2 in another configuration, in accordance with some embodiments of the disclosure.

Vehicle 290 may include at least one vehicle information subsystem, which may be similar to any subsystem 120, that may be positioned in any suitable position with respect to the vehicle and that may be configured to provide at least one suitable type of user interface (e.g., graphic user interface ("GUI"), audible user interface, haptic user interface, etc.) for providing any suitable information to and/or receiving any suitable information from one or more passengers of the vehicle (e.g., a touch screen or any other suitable I/O component(s) that may be coupled (e.g., permanently coupled) to vehicle 290), including, but not limited to, a GUI of an odometer vehicle information subsystem 220*o*, a GUI of an infotainment vehicle information subsystem 220*i*, a GUI of a central display vehicle information subsystem 220*c*, a GUI of a seatback vehicle information subsystem 220*s*, and/or the like. For example, odometer vehicle information subsystem 220*o* may be provided by or along a portion of a dashboard 230*d* that may be in front of a front main passenger (e.g., if operating the vehicle) and may be configured to provide any suitable information (e.g., speed information (e.g., rotations per minute ("RPM") information), odometer information, battery charge level information (e.g., for electric powered vehicles), fuel level and/or fuel type information (e.g., for fossil fuel powered vehicles), etc.). As another example, infotainment vehicle information subsystem 220*i* may be provided by or along another portion of a dashboard 230*d* that may be in front of a front main passenger (e.g., if operating the vehicle) but also towards a front auxiliary passenger and may be configured to provide any suitable information (e.g., infotainment information (e.g., audio media information, etc.), map information, weather information, time information, etc.). As another example, central display vehicle information subsystem 220*c* may be provided rear of dashboard 230*d* towards a front of a front center console 240*f* that may extend in front of and/or at least partially between front seats 294*sfm* and 294*sfa*, and subsystem 220*c* may be configured to receive (e.g., from any front or (stretching) rear passenger (e.g., if touch input)) any suitable information (e.g., object (e.g., door, roof, rack) repositioning control information, movie control information, map control information, etc.) and/or to provide any suitable information (e.g., map information, object (e.g., door, roof, rack) repositioning control information, theater information or video media information, etc. (e.g., for a vehicle movie theater mode when the vehicle is stationary (e.g., for passengers positioned in the rear seat(s) for a more relaxing experience (e.g., during vehicle charging))) and/or the like) that may be directed towards or otherwise accessible not only to any passenger(s) of front seat(s) 294*sfm* and/or 294*sfa* but additionally or alternatively to any passenger(s) of rear seat(s) 294*srm* and/or 294*sra*. As yet another example, seatback vehicle information subsystem 220*s* may be provided at least partially in or on or along a back portion (e.g., rearward facing surface) of a front seat (e.g., as shown with respect to front seat 294*sfm*) and/or the like that may be facing and proximate a passenger of a rear seat (e.g., a passenger of seat 294*srm*), and subsystem 220*s* may be configured to provide any suitable information (e.g., rear media information, object (e.g., door, roof, rack) repositioning control information, etc.) and/or receive (e.g., from a rear passenger) any suitable information (e.g., object (e.g., door, roof, rack) repositioning control information, etc.). As yet another example, a door vehicle information subsystem 220*d* may be provided at least partially in or on or along a portion (e.g., inward facing surface) of a passenger door (e.g., as shown by FIG. 2 with respect to door 294*dra*) that may be facing and proximate a passenger of a rear seat (e.g., a passenger of seat 294*sra*), and subsystem 220*d* may be configured to provide any suitable information (e.g., rear media information, object (e.g., door, roof, rack) repositioning control information, etc.) and/or receive (e.g., from a passenger) any suitable information (e.g., object (e.g., door, roof, rack) repositioning control information, etc.). Additionally or alternatively, in some embodiments, vehicle 290 may be considered to temporarily include at least one vehicle information subsystem similar to any subsystem 120 that may provide at least one type of user interface (e.g., GUI) for providing any suitable information to one or more users of the vehicle (e.g., a screen or other UI that may not be permanently coupled to vehicle 290), including, but not limited to, a UI of a portable user vehicle information subsystem 220*u* (e.g., a portable media device (e.g., smart phone)) of a user (e.g., user U) that may be selectively communicatively coupled (e.g., wirelessly (e.g., via Bluetooth, RFID, NFC, Wi-Fi, etc.) or via any suitable wired connector (e.g., via USB port)) to another (e.g., permanent) subsystem of vehicle 290, where subsystem 220*u* may be configured to provide any suitable information to a user (e.g., speed information, odometer information, object (e.g., door, roof, rack) repositioning control information, etc.) and/or receive (e.g., from a user) any suitable information (e.g., object (e.g., door, roof, rack) repositioning control information, user preference information, user profile data, user active data, any suitable auxiliary factor data, etc.).

Sensory feedback management system 250 may be provided in any suitable way such that any suitable vehicle scenario data and/or any suitable vehicle sensory feedback data and/or any suitable auxiliary factor data may be sensed during any suitable vehicle scenario(s) of vehicle 290 for training any suitable vehicle sensory feedback model(s) (e.g., model 19*m*) associated with vehicle 290 and/or for enabling any suitable such model(s) to predict any suitable vehicle sensory feedback data for any suitable sensory feedback state of vehicle 290 during any suitable vehicle scenario and/or for determining any suitable sensory feedback control data that may be used to control the output of any suitable output component(s) of vehicle 290 for replicating the sensory feedback of any other suitable vehicle. Sensory feedback management system 250 may include any suitable object adjusting actuator subsystem(s) 296, each of which may include any suitable gears, motors (e.g., linear motors, rotary motors, etc.), and/or other suitable actuators (e.g., soft, hydraulic, pneumatic, thermal, magnetic, etc.) that may be configured to adjust a position or other suitable orientation of any appropriate object(s) of vehicle 290 in one or more ways (e.g., automatically, in response to any suitable (e.g., sensory feedback) control signals (e.g., from any suitable vehicle information subsystem(s) 220), etc.) for enabling any suitable power object (e.g., a power door, a power roof, a power rack, etc.) and/or any other suitable adjustable output component(s) of vehicle 290 (e.g., haptic sensory feedback output component(s), olfactory sensory feedback output component(s), auditory sensory feedback output component(s), visual sensory feedback output component(s), etc.). Additionally, sensory feedback management system 250 may include any suitable vehicle sensor subsystem(s) 295, each of which may include any suitable sensor(s) that may be configured to detect certain status information about the vehicle and/or its users and/or its environment (e.g., any suitable vehicle scenario data and/or any suitable vehicle sensory feedback data and/or any suitable auxiliary factor data (e.g., user profile data, user active data, user preference data, etc.)), and any suitable vehicle status classification subsystem(s) 216, each of which may be configured to analyze such status information and any other suitable accessible information to determine when certain conditions are satisfied (e.g., safety conditions, such as a seat being occupied (e.g., as may be determined by an occupation classification subsystem), the vehicle not moving (e.g., as may be determined by a vehicle speedometer classification subsystem), a vehicle door being closed (e.g., as may be determined by a door open/closed status classification subsystem), and/or the like). Sensory feedback management system 250 may be configured to allow or otherwise enable control of any suitable object adjusting actuator subsystem(s) 296 (e.g., automatically, in response to any suitable control signals (e.g., from any suitable vehicle information subsystem(s) 220)) for enabling any suitable power object (e.g., a power door, a power roof, a power rack, etc.) or automatically carrying out a particular adjusting of any suitable vehicle adjustable output component(s) with any suitable adjusting actuator subsystem(s) 296, for example, only when certain conditions are satisfied (e.g., as may be determined by any suitable vehicle status classification subsystem(s) 216 (e.g., based on any suitable status information from any suitable vehicle sensor subsystem(s) 295)).

FIG. 2 may show some exemplary illustrative ion-limiting examples of sensors of any suitable vehicle sensor subsystem(s) 295 and actuators of any suitable vehicle actuator subsystem(s) 296 for vehicle 290. For example, a sensor or pack of sensors 295*a* may be provided at any suitable position(s) along, on, and/or within door assembly 294*dfm* and may be configured to detect any suitable information associated with the door (e.g., any suitable sensor(s) to detect the vibration of the door panel (e.g., at any suitable location(s) thereon (e.g., internally and/or externally)) and/or the sound and/or smell and/or light at that location and/or the presence of a remote object and/or the presence of a user touch at the location and/or the like), while a similar sensor or pack of sensors 295*a'* may be provided at any suitable position(s) along, on, and/or within door assembly 294*drm*. Any suitable object adjusting actuator mechanism(s) or sensory replication mechanism(s) or an actuator or pack of actuators 296*a* may be provided at any suitable position(s) along, on, and/or within door assembly 294*dfm* and may be configured to replicate or generate any suitable vibrations, sounds, movement, lights, smells, and/or the like at or with the door (e.g., any suitable output component(s) to generate a vibration of the door panel and/or a sound at that location and/or a smell at that location and/or light at that location and/or the like), while a similar actuator or pack of actuators 296*a'* may be provided at any suitable position(s) along, on, and/or within door assembly 294*drm* and/or any other suitable door(s) of the vehicle.

Additionally or alternatively, a sensor or pack of sensors 295*b* may be provided at any suitable position(s) along, on, and/or within a brake pedal 294*bpdl* or any other suitable pedal and may be configured to detect any suitable information associated with the brake pedal (e.g., any suitable sensor(s) to detect the vibration, movement, and/or resistance of the pedal and/or the sound and/or smell and/or light at that location and/or the presence of a remote object and/or the presence of a user touch at the location and/or the like), while a similar sensor or pack of sensors 295*b'* may be provided at any suitable position(s) along, on, and/or within an acceleration pedal 294*apdl*. Any suitable object adjusting actuator mechanism(s) or sensory replication mechanism(s) or an actuator or pack of actuators 296*b* may be provided at any suitable position(s) along, on, and/or within brake pedal 294*bpdl* that may be configured to replicate or control any suitable vibrations, movement, resistance, sounds, lights, smells, and/or the like at or with or of brake pedal 294*bpdl* (e.g., any suitable output component(s) to generate a vibration or movement or resistance or sound or smell or light at that location and/or the like), while similar object adjusting actuator mechanism(s) or actuator or pack of actuators 296*b'* may be provided at any suitable position(s) along, on, and/or within acceleration pedal 294*apdl*.

Additionally or alternatively, a sensor or pack of sensors 295*c* may be provided at any suitable position(s) along, adjacent, on, and/or within a driver side heating, ventilation, and air conditioning ("HVAC") system vent 294*dsv* or any other suitable vehicle vent and may be configured to detect any suitable information associated with the vent (e.g., any suitable sensor(s) to detect the temperature, fluid speed, fluid direction, fluid content, smell, sound, light, and/or the like of the environment at the vent location and/or the like), while a similar sensor or pack of sensors 295*c'* may be provided at any suitable position(s) along, on, and/or within a passenger side HVAC system vent 294*psv*. Any suitable object adjusting actuator mechanism(s) or sensory replication mechanism(s) or an actuator or pack of actuators 296*c* may be provided at any suitable position(s) along, adjacent, on, and/or within vent 294*dsv* that may be configured to replicate or control any suitable vibrations, movement, resistance, sounds, lights, smells, and/or the like at or within or adjacent the vent (e.g., any suitable output component(s) to generate a vibration, movement, resistance, sound, smell, light, and/or the like at that location), while similar object adjusting actuator mechanism(s) or actuator or pack of actuators 296*c'* may be provided at any suitable position(s) along, on, and/or within vent 294*psv*.

Additionally or alternatively, a sensor or pack of sensors 295*d* may be provided at any suitable position(s) along, on, adjacent, and/or within a steering wheel 294*swl* and may be configured to detect any suitable information associated with the steering wheel (e.g., any suitable sensor(s) to detect the speed and rate of turn, vibrations, resistance and/or the like of the wheel and/or the user's touch of the wheel and/or the smell, sound, light, and/or the like of the environment at the wheel and/or the like). Any suitable object adjusting actuator mechanism(s) or sensory replication mechanism(s) or an actuator or pack of actuators 296*d* may be provided at any suitable position(s) along, on, adjacent, and/or within steering wheel 294*swl* that may be configured to replicate or control any suitable vibrations, movement, resistance, sounds, lights, smells, and/or the like at or within or of the vent (e.g., any suitable output component(s) to control the feel and response and vibration of the wheel and/or the sound or smell at that location and/or the like).

Additionally or alternatively, a sensor or pack of sensors 295*e* may be provided at any suitable position(s) along, on, adjacent, and/or within a headrest of seat 294*sfm* and may be configured to detect any suitable information associated with the seat headrest (e.g., any suitable sensor(s) to detect the vibration, smell, sound, light, and/or the like of or at the headrest and/or the like), while a similar sensor or pack of sensors 295*e'* may be provided at any suitable position(s) along, on, adjacent, and/or within a headrest of seat 294*sfa*, while a similar sensor or pack of sensors 295*e''* may be provided at any suitable position(s) along, on, adjacent, and/or within a headrest of seat 294*srm*, while a similar sensor or pack of sensors 295*e'''* may be provided at any suitable position(s) along, on, adjacent, and/or within a headrest of seat 294*sra*. Any suitable object adjusting actuator mechanism(s) or sensory replication mechanism(s) or an actuator or pack of actuators 296*e* may be provided at any suitable position(s) along, on, adjacent, and/or within a headrest of seat 294*sfm* that may be configured to replicate or control any suitable vibrations, sounds, lights, smells, and/or the like at or within or of the headrest (e.g., any suitable output component(s) to generate a vibration, sound, smell, light, and/or the like at that location), while similar object adjusting actuator mechanism(s) or actuator or pack of actuators 296*e'* may be provided at any suitable position(s) along, on, adjacent, and/or within a headrest of seat 294*sfa*, while similar object adjusting actuator mechanism(s) or actuator or pack of actuators 296*e''* may be provided at any suitable position(s) along, on, adjacent, and/or within a headrest of seat 294*srm*, while similar object adjusting actuator mechanism(s) or actuator or pack of actuators 296*e'''* may be provided at any suitable position(s) along, on, adjacent, and/or within a headrest of seat 294*sra*.

Additionally or alternatively, a sensor or pack of sensors 295*f* may be provided at any suitable position(s) along, on, adjacent, and/or within a seat base of seat 294*sfm* and may be configured to detect any suitable information associated with the seat base (e.g., any suitable sensor(s) to detect the vibration, smell, sound, light, and/or the like of or at the seat base and/or the like), while a similar sensor or pack of sensors may be provided at any suitable position(s) along, on, adjacent, and/or within a seat base of seat 294*sfa*, seat 294*srm*, and/or seat 294*sra*. Any suitable object adjusting actuator mechanism(s) or sensory replication mechanism(s) or an actuator or pack of actuators 296*f* may be provided at any suitable position(s) along, on, adjacent, and/or within a seat base of seat 294*sfm* that may be configured to replicate or control any suitable vibrations, sounds, lights, smells, and/or the like at or within or of the seat base (e.g., any suitable output component(s) to generate a vibration, sound, smell, light, and/or the like at that location), while similar object adjusting actuator mechanism(s) or actuator or pack of actuators may be provided at any suitable position(s) along, on, adjacent, and/or within a headrest of seat 294*sfa*, while similar object adjusting actuator mechanism(s) or actuator or pack of actuators 296*e″* may be provided at any suitable position(s) along, on, adjacent, and/or within a seat base of seat 294*sfa*, seat 294*srm*, and/or seat 294*sra*.

Additionally or alternatively, a sensor or pack of sensors 295*g* may be provided at any suitable position(s) along an exterior of the vehicle (e.g., adjacent a rear driver side wheel 294*dswl* and/or any other suitable position(s) (e.g., adjacent a tailpipe, engine, battery, suspension, etc.)) and may be configured to detect any suitable information associated with the exterior location (e.g., any suitable sensor(s) to detect the vibrations, temperature, fluid speed, fluid direction, fluid content, smell, sound, light, and/or the like of the environment at the location). Any suitable object adjusting actuator mechanism(s) or sensory replication mechanism(s) or an actuator or pack of actuators 296*g* may be provided at any suitable position(s) along the exterior of the vehicle (e.g., adjacent rear driver side wheel 294*dswl* and/or any other suitable position(s) (e.g., adjacent a tailpipe, engine, battery, suspension, etc.)) that may be configured to replicate or control any suitable vibrations, movement, sounds, lights, smells, and/or the like at that location (e.g., any suitable output component(s) to generate a vibration, movement, sound, smell, light, and/or the like at that location).

Additionally or alternatively, any suitable sensor(s) and/or sensor pack(s) may be provided at any suitable positions with respect to a wheel of the vehicle (e.g., sensors 695-1, 695-3, and 695-5 at a wheel 294*hrm*), for any suitable purpose, including, but not limited to monitoring the behavior of the vehicle's suspension, brakes, and/or wheels. Such sensor packs may include one or a multitude of sensors, such as gyroscopes, accelerometers, barometers, microphones, laser emitters/laser readers, light sensors, vibration sensors, cameras, and/or the like. Such camera(s) may be placed in one or multiple locations and may include one or multiple cameras and lenses, and may be configured to monitor the movement of one or multiple components, including, but not limited to, the wheels, tires, tire deflection and/or distortion, brakes, bMake pads, suspension arms, control arms, actuators, hydraulic pistons and/or actuators, actuators, fasteners, and/or the like, which may be capable of monitoring and/or determining and/or providing information on any suitable characteristics, including, but not limited to, vibration, spin, rates of acceleration and/or deceleration, wear-and-tear, distortion, lateral movement, vertical movement, foreign objects, dirt, dust, water, debris, and/or other behaviors.

Vehicle 290 may include any suitable system layout of pipes and chambers for moving fluid through a system 296*asl* (e.g., for generating certain sound and/or movement with the vehicle), where system 296*asl* may be provided along any suitable portions of the vehicle (e.g., along (e.g., adjacent, just above, just below, or within) lower structural member 297*lsm*, etc.). For example, as shown, vehicle 290 may include any suitable air intakes 296*aif* at the front of the vehicle, any suitable air intakes 296*aisf* towards the front of the sides of the vehicle, and/or any suitable air intakes 296*aisr* towards the rear of the sides of the vehicle that may be fluidly communicatively coupled with each other and that may be configured to allow fluid (e.g., air) from the vehicle's environment to enter system 296*asl*, be passed through any suitable pipes 296*ap* and/or any suitable chambers 296*ac*, and/or being directed by any suitable valves 296*avf* and 296*avr*. At or near or along a center console (e.g., center console 240*f* of vehicle 290), one or more portals 296*als* may be provided to add specific sound and/or vibration options to the vehicle. Turbo fans and/or any other suitable fluid (e.g., air) propulsion devices (e.g., jets 296*aj*, turbines 296*at*, fans 296*af*, etc.) may be provided and configured to move fluid (e.g., air) through system 296*asl* via blowing and/or suction or otherwise. It should be noted that this is just one example of a layout of the pipes and chambers and they might be laid-out differently depending on the shape and purposes of the vehicle into which such a system is installed.

As shown, for example, an exemplary illustrative non-limiting example of a pack of sensors 295*pk* may include any suitable number of sensors and can be coupled to any suitable component(s) of a vehicle at any suitable location(s). As just one example, pack of sensors 295*pk* may include a laser sensor 295-1, a camera 295-2, an accelerometer 295-3, and a gyroscope 295-4. However, it should be noted that different packs for placement on different components of the vehicles may contain different selections of components. In this example, such a sensor pack may be placed on a suspension arm of a vehicle and monitor the change in distance between the arm and wheel well to detect accurate movement by measuring the distance of the laser (e.g., time to reflect), as well as measuring vibrations via the camera, accelerometer, and gyroscope. Additionally, as shown, an exemplary illustrative non-limiting example of a pack of object adjusting actuator mechanism(s) or actuators 296*pk* may include any suitable number of object adjusting actuator mechanism(s) or actuators and/or output components and can be coupled to any suitable component(s) of a vehicle at any suitable location(s). As just one example, pack of actuators 296*pk* may include a light output component 296-1, a smell output component 296-2, a sound output component 296-3, and a movement output component 296-4. However, it should be noted that different packs for placement on different components of the vehicles may contain different selections of components.

As just one example, seat 294*sfm* may be repositioned or moved in any suitable manner(s) by any suitable object adjusting actuator mechanism(s) or sensory replication mechanism(s) of any suitable seat adjusting actuator subsystem(s) 296 that may be associated with seat 294*sfm*, including, but not limited to, actuator(s) 296*e* and/or actuator(s) 296*f*. At least one actuator 296*f* may be any suitable actuator that may be configured to move seat 294*sfm* (e.g., a seat base and/or seat backrest and/or seat headrest) in any suitable side to side or front to back or top to bottom or rotation motion and/or the like (e.g., with respect to lower structural member 297*lsm* of the vehicle), such as towards the left side of the vehicle in the +Y direction, towards the right side of the vehicle in the −Y direction, towards the front of the vehicle in the +X direction, towards the rear of the vehicle in the −X direction, towards the top of the vehicle in the +Z direction, towards the bottom of the vehicle in the −Z direction, about the Z-axis (e.g., with the seat base in an X-Y plane (e.g., such that the seat back rest may be rotated to extend along an interior side wall (e.g., door) of the vehicle)), and/or the like (e.g., the Z-axis may be perpendicular to a surface SFC (e.g., road) supporting the vehicle)). Additionally or alternatively, at least one actuator 296*e* may be any suitable actuator that may be configured to move a headrest of seat 294*sfm* in any suitable side to side or front to back or top to bottom motion or rotation motion about the Y-axis with respect to the seat backrest of seat 294*sfm* (e.g., towards the left side of the vehicle in the +Y direction, towards the right side of the vehicle in the −Y direction, towards the front of the vehicle in the +X direction, towards the rear of the vehicle in the −X direction, towards the top of the vehicle in the +Z direction, towards the bottom of the vehicle in the −Z direction, about the Y-axis so a rear surface of the seat headrest may be positioned parallel or substantially parallel to the ground, about the Z-axis so a rear surface of the seat headrest may be positioned parallel or substantially parallel to a sidewall of the vehicle, and/or the like).

In addition to any suitable object adjusting actuator mechanism(s) or sensory replication mechanism(s) of any suitable object repositioning actuator subsystem(s) 296, system 250 may include any suitable vehicle information subsystem(s) 220, one, some, or each of which may be communicatively coupled to any object repositioning actuator subsystem(s) 296 and operative to receive any suitable input instructions from a user or otherwise (e.g., via any suitable input component and/or sensor) and, in response, generate any suitable output control instruction(s), and then communicate such output control instruction(s) to any suitable object adjusting actuator mechanism(s) or sensory replication mechanism(s) 296 for adjusting a functionality of any suitable output component(s) of vehicle 290 in one or more ways (e.g., automatically, in response to any suitable output control instruction(s)). For example, front seat 294sfm may be repositioned in any suitable manner(s) by any suitable actuator(s) of any suitable seat repositioning actuator subsystem(s) 296 in response to receiving any suitable output control instruction(s) generated by and transmitted from any suitable vehicle information subsystem(s) 220.

In some embodiments, system 250 may be configured to allow or otherwise enable such control of any suitable actuator subsystem(s) 296 by any suitable vehicle information subsystem(s) 220 and/or to control automatically any suitable actuator subsystem(s) 296 only when certain conditions are satisfied (e.g., safety conditions, such as a seat not being occupied (e.g., as may be determined by a vehicle occupation status classification subsystem), the vehicle not moving (e.g., as may be determined by a vehicle movement status classification subsystem), a vehicle door being closed (e.g., as may be determined by a vehicle door open/closed status classification subsystem), and/or the like). For example, system 250 may include any suitable vehicle status classification subsystem(s) 216 (e.g., a passenger presence detection subsystem, a vehicle speed classification subsystem, a door open/closed status classification subsystem, etc.), one, some, or each of which may be communicatively coupled to one or more vehicle sensor subsystems 295 (e.g., for receiving sensor data to be analyzed for making a determination of any suitable status classification), as well as one or more actuator subsystem(s) 296 and/or one or more vehicle information subsystem(s) 220 of system 250, and a subsystem 216 may be operative to detect (e.g., automatically) a vehicle status classification (e.g., an occupancy state of a particular seat of vehicle 290 (e.g., an occupancy state or a vacancy state, such as whether or not a passenger is currently sitting in a particular seat of vehicle 290 (e.g., via any suitable input component and/or sensor (e.g., weight sensor, camera sensor, etc.) and/or processing (e.g., occupant classification application processing, etc.))) and, in response, may be operative to generate (e.g., automatically) any suitable output control instruction(s), and then may be operative to communicate (e.g., automatically) such output control instruction(s) for selectively enabling an actuator subsystem 296 to be controlled by a vehicle information subsystem 220 of system 250 (e.g., allow or disallow user control via subsystem 220 based on whether or not a status classification is determined (e.g., when a door is detected to be soon opened)) and/or for automatically controlling an actuator subsystem 296 (e.g., based on any suitable programmed settings (e.g., of an application 19), such as move a front seat as far away from its associated door when the door is about to be opened, whereby no active user control via a subsystem 220 may be utilized for such a repositioning).

System 250 may be configured (e.g., using any suitable application(s) and/or any suitable processor(s) of any suitable subsystem(s) (e.g., subsystem(s) 216, 295, 296, and/or 220)) to allow (e.g., automatically or via user control (e.g., via user interaction with one or more subsystem(s) 220) any suitable object adjusting only if one or more conditions (e.g., status classifications) have been determined.

A vehicle information subsystem 220 of system 250 that may be used to receive instructions (e.g., user instructions) for adjusting an object (e.g., for selecting a target vehicle to be replicated, etc.) may include any suitable user interface (e.g., I/O component(s)) operative to receive such instructions (e.g., touch screen, physical button(s), physical slider(s), microphone(s) for detecting audible voice activated commands, motion sensors and/or light sensors and/or the like for detecting waving or other suitable physical gestures in space, and/or the like). One specific example of a subsystem 220 may be an electronic device, such as a smart phone type device, which may include a touch screen I/O component (e.g., an output component may be a display that can be used to display a visual or graphic user interface ("GUI"), which may allow a user to interact with subsystem 220). A screen of the GUI of such an I/O component may include various layers, windows, screens, templates, elements, menus, and/or other components of a currently running application (e.g., a sensory feedback management application) that may be displayed in all or some of the areas of the display output component. One or more of any suitable user input components of the subsystem may be used to navigate through the GUI (e.g., a scroll wheel that may allow a user to select one or more graphical elements or icons of the GUI, and/or icons of the GUI may be selected via a touch screen I/O component, where such a touch screen I/O component may employ any suitable type of touch screen input technology, such as, but not limited to, resistive, capacitive, infrared, surface acoustic wave, electromagnetic, or near field imaging, and/or may employ single point or multi-point (e.g., multi-touch) input sensing).

The GUI icons may represent various applications, layers, windows, screens, templates, elements, and/or other components that may be displayed in some or all of the areas of a display component of the subsystem upon selection by the user. Furthermore, selection of a specific icon may lead to a hierarchical navigation process. For example, selection of a specific icon may lead from one screen to screen to a new screen of the GUI that may include one or more additional icons or other GUI elements of the same application or of a new application associated with that icon. Textual indicators may be displayed on or near one, some, or each icon to facilitate user interpretation of the graphical element icon. It is to be appreciated that a GUI may include various components arranged in hierarchical and/or non-hierarchical structures. When a specific icon is selected, the subsystem may be configured to open a new application associated with that icon and display a corresponding screen of the GUI associated with that application. For each application, screens may be displayed on a display output component of the subsystem and may include various user interface elements. Additionally or alternatively, for each application, various other types of non-visual information may be provided to a user via various other output components of the subsystem (e.g., audible, tactile, etc.).

Although many aspects of sensory feedback management systems may be described with respect to predicting sensory feedback of certain vehicles during certain vehicle scenarios and/or generating sensory feedback control signals based on any suitable predictions for carrying out certain sensory feedback with any suitable output components (e.g., any suitable haptic, auditory, olfactory, and/or visual sensory feedback with any suitable output components) of an actual replicating vehicle, it is to be understood that these systems may be used with respect to any suitable vehicle, including a virtual gaming vehicle or simulator or the like, or any other suitable experiencing entities or carriers that may be replicated or used to replicate.

Figure 1D:
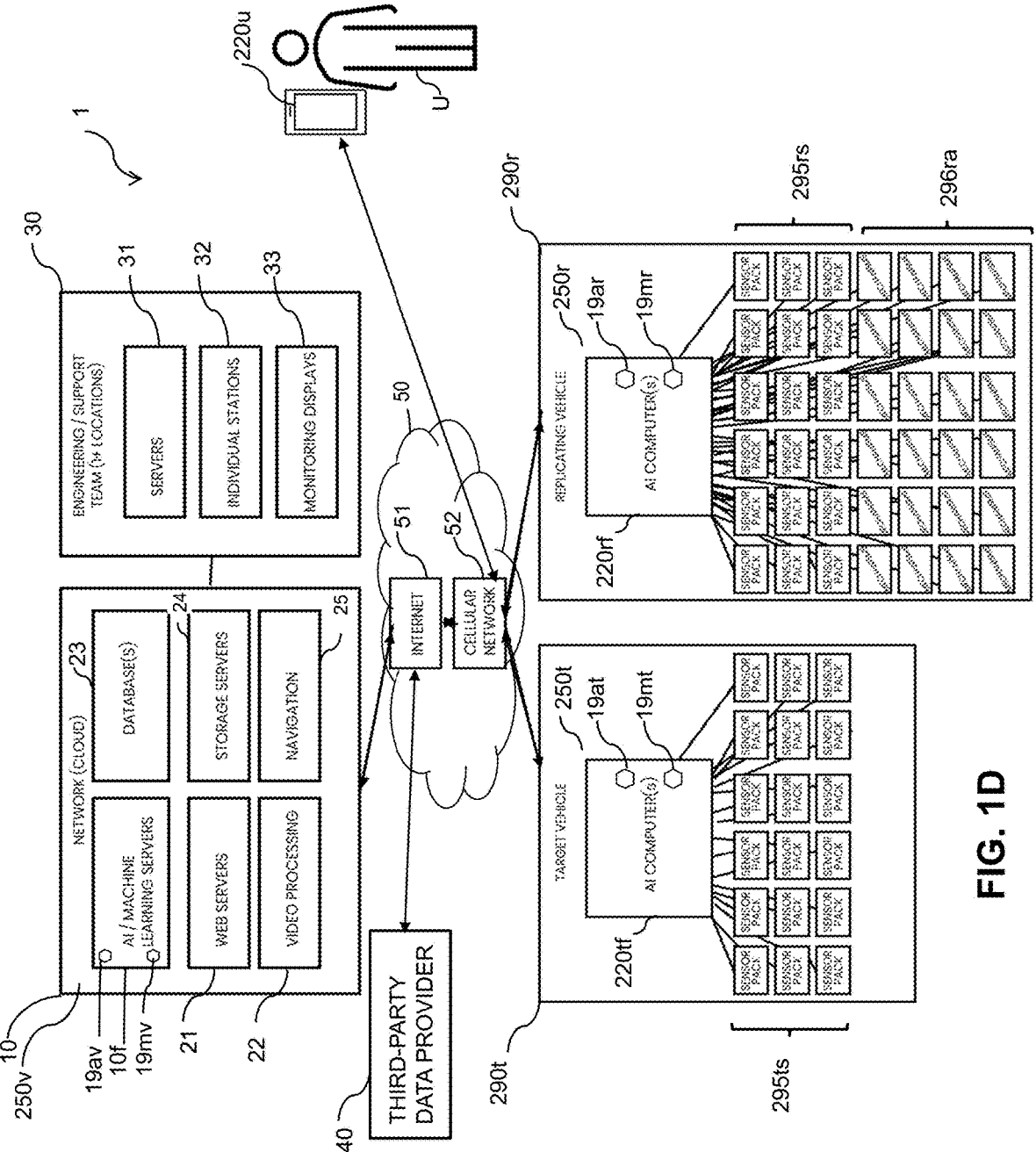
FIG. 1D is a schematic view of an illustrative system that may provide a sensory feedback management service in accordance with some embodiments of the disclosure.

Any suitable sensory feedback management system 250 may use any suitable subsystem 220 that may load any suitable application 19 as a background application program or a user-detectable application program in conjunction with any suitable sensory feedback model to determine how any suitable input assembly data received via any suitable input assembly or input component 16$i$ and/or any suitable sensor assembly data received via any suitable sensor assembly or sensor 15 or vehicle sensor subsystems 295 and/or any other suitable data received via any other suitable assembly of a system (e.g., from another subsystem of another vehicle) may be used to determine any suitable sensory feedback state data (e.g., sensory feedback state data 322 of FIG. 3) that may be used to control or manipulate at least one functionality of a vehicle 290 (e.g., a performance or mode of any suitable output component(s) 16$o$ or object adjusting actuator mechanism(s) or sensory replication mechanism(s) 296 of the vehicle that may be altered in a particular one of various ways (e.g., particular sensory feedback alerts or recommendations may be provided to a user via a user interface assembly (e.g., a display of any suitable subsystem 220) and/or particular sensory feedback adjustments may be made by an output assembly and/or the like)). Any suitable sensory feedback model or any suitable combination of two or more sensory feedback models may be used by any suitable sensory feedback management system 250 in order to make any suitable sensory feedback state determination(s) for any particular vehicle during any particular vehicle scenario (e.g., any sensory feedback model(s) may be used in conjunction with any suitable vehicle scenario data (e.g., any suitable vehicle scenario data that may be sensed or otherwise determined or obtained by any suitable component(s) of a vehicle or third party service(s) (e.g., weather services, traffic services, street repair services, etc. of a third party data provider 40) during a particular vehicle scenario of the vehicle) and/or in conjunction with any suitable vehicle sensory feedback data (e.g., any suitable vehicle sensory feedback data that may be sensed or otherwise determined or obtained by any suitable component(s) of the vehicle during the particular vehicle scenario of the vehicle) to further train the model(s) and/or to provide any suitable sensory feedback state data that may be indicative of any sensory feedback determination or prediction for the particular vehicle during the particular vehicle scenario). For example, as shown in FIG. 1D, any suitable target vehicle sensory feedback model 19$mt$ may be maintained, trained, updated, utilized, or otherwise managed for and/or any suitable target vehicle 290$t$ (e.g., target vehicle sensory feedback model 19$mt$ may be managed by any suitable target vehicle application 19$at$ in any suitable memory assembly using any suitable processing assembly of any suitable target vehicle subsystem(s) 220$tf$ (e.g., any suitable AI computer(s)) that may enable any suitable sensory feedback management system 250$t$ of target vehicle 290$t$ using any suitable sensor assemblies or sensor packs or any other suitable sensors 295$ts$ of target vehicle 290$t$ (e.g., any suitable assemblies that may be configured to sense or otherwise determine or obtain any suitable target vehicle sensory feedback data and/or any suitable target vehicle scenario data during one or more vehicle scenarios of target vehicle 290$t$ (e.g., for training target vehicle sensory feedback model 19$mt$ and/or for enabling target vehicle sensory feedback model 19$mt$ to predict any suitable target vehicle sensory feedback data for a sensory feedback state of target vehicle 290$t$ during a particular vehicle scenario))). Additionally or alternatively, as shown in FIG. 1D, any suitable replicating vehicle sensory feedback model 19$mr$ may be maintained, trained, updated, utilized, or otherwise managed for and/or on any suitable replicating vehicle 290$r$ (e.g., replicating vehicle sensory feedback model 19$mr$ may be managed by any suitable replicating vehicle application 19$ar$ in any suitable memory assembly using any suitable processing assembly of any suitable replicating vehicle subsystem(s) 220$rf$ (e.g., any suitable AI computer(s)) that may enable any suitable sensory feedback management system 250$r$ of replicating vehicle 290$r$ using any suitable sensor assemblies or sensor packs or any other suitable sensors 295$rs$ of replicating vehicle 290$r$ (e.g., any suitable assemblies that may be configured to sense or otherwise determine or obtain any suitable replicating vehicle sensory feedback data and/or any suitable replicating vehicle scenario data during one or more vehicle scenarios of replicating vehicle 290$r$ (e.g., for training replicating vehicle sensory feedback model 19$mr$ and/or for enabling replicating vehicle sensory feedback model 19$mr$ to predict any suitable replicating vehicle sensory feedback data for a sensory feedback state of replicating vehicle 290$r$ during a particular vehicle scenario)) and/or using any suitable object adjusting actuator mechanism(s) or sensory replication mechanism(s) or actuator assemblies or actuator packs or any other suitable actuators 296$ra$ of replicating vehicle 290$r$ (e.g., any suitable assemblies that may be configured to adjust any suitable object(s) or any suitable functionality(ies) of any suitable object(s) or output component(s) of replicating vehicle 290$r$ based on any suitable sensory feedback control data (e.g., sensory feedback mode data (e.g., sensory feedback mode data 324 of system 301 of FIG. 3)) that may be associated with controlling any suitable functionality of any suitable output assembly of replicating vehicle 290$r$ (e.g., managed element 390 of FIG. 3) for adjusting or replicating certain sensory feedback at replicating vehicle 290$r$ or otherwise (e.g., for adjusting a user interface presentation to a user of replicating vehicle 290$r$ (e.g., to provide a sensory feedback suggestion))))). Additionally or alternatively, as shown in FIG. 1D, any suitable VMS sensory feedback model(s) 19$mv$, which may include any suitable replicating vehicle sensory feedback model(s) (e.g., model 19$mr$ associated with replicating vehicle 290$r$) and/or any suitable target vehicle sensory feedback model(s) (e.g., 19$mt$ associated with target vehicle 290$t$), may be maintained, trained, updated, utilized, or otherwise managed on VMS subsystem 10 (e.g., any model 19$mv$ may be managed by any suitable VMS application 19$av$ in any suitable memory assembly using any suitable processing assembly of any suitable VMS subsystem(s) 10$f$ (e.g., any suitable AI/machine learning server(s)) that may enable any suitable sensory feedback management system 250$v$ of VMS subsystem 10 using any suitable sensor data (e.g., vehicle sensory feedback data and/or vehicle scenario data) from any suitable sensor assemblies of any suitable vehicles (e.g., sensors 295ts and/or sensors 295rs) that may be obtained in any suitable manner (e.g., via communication via communications network 50 (e.g., via any suitable cellular network 52 and/or any suitable internet 51)) and/or for providing any suitable sensory feedback control data or otherwise to any suitable replicating vehicle in any suitable manner (e.g., via communication via communications network 50). Therefore, in some embodiments, a sensory feedback management system of a replicating vehicle may utilize one or more sensory feedback models that may not be local to the replicating vehicle. Additionally or alternatively, one or more target vehicle sensory feedback models (e.g., model 19mt) may be loaded onto a replicating vehicle (e.g., into subsystem 220rf of replicating vehicle 290r) in any suitable manner (e.g., directly from a target vehicle or via VMS subsystem 10) such that both a replicating vehicle sensory feedback model and a target vehicle sensory feedback model may be accessible locally at a replicating vehicle in order for the replicating vehicle to automatically provide appropriate sensory feedback for replicating a target vehicle associated with the target vehicle sensory feedback model based on a vehicle scenario being experienced by the replicating vehicle. Therefore, while model 19mt may be at least partially maintained, trained, updated, utilized, or otherwise managed for vehicle 290t at or on vehicle 290t, model 19mt may be periodically loaded onto VMS subsystem 10 and/or any suitable replicating vehicles, and/or, while model 19rt may be at least partially maintained, trained, updated, utilized, or otherwise managed for vehicle 290r at or on vehicle 290r, model 19mr may be periodically loaded onto VMS subsystem 10 and/or any suitable target vehicles or other replicating vehicles. A sensory feedback model and/or any suitable vehicle sensory feedback data and/or any suitable vehicle scenario data and/or any suitable sensory feedback control data and/or any suitable auxiliary factor data may be communicated between subsystems or vehicles (e.g., between VMS subsystem 10 and/or a replicating vehicle and/or a target vehicle) automatically (e.g., upon the data being sensed, upon the data being predicted, upon the data being entered by a user, etc.) and/or in response to a data request for that data from the entity to be receiving the data (e.g., as a data push or as a data pull). It is to be understood that any suitable target vehicle may be used as a replicating vehicle for replicating another target vehicle (e.g., if provided with any suitable object adjusting actuator mechanism(s) or sensory replication mechanism(s) or actuator assemblies or actuator packs or any other suitable actuators (e.g., similarly to mechanism(s) 296ra)). Additionally, it is to be understood that any suitable replicating vehicle may be used as a target vehicle by some other replicating vehicle. As shown in FIG. 1D, VMS subsystem 10 may be a cloud network of the VMSP, and/or VMS subsystem 10 may include any suitable web server(s) 21, video processing component(s) 22, database(s) 23, storage server(s) 24, navigation component(s) 25, and/or the like. Additionally or alternatively, as shown in FIG. 1D, system 1 may include any suitable network subsystem(s) 30, such as a local company network for any suitable service(s) of the VMSP, such as for engineers to review and tweak models and/or provide support, which may include any suitable server(s) 31, any suitable individual station(s) 32, any suitable monitoring display(s) 33, and/or the like, that may be operative to support the VMSP in any suitable ways. Additionally or alternatively, as shown in FIG. 1D, system 1 may include any suitable third party data provider(s) 40 that may be configured to determine and/or share any suitable third party data, such as weather data, traffic data, street repair data, gas sensing data, and/or any other suitable data that may be useful to the system (e.g. for providing any suitable scenario data or otherwise).

A sensory feedback model may be developed and/or generated and/or trained and/or otherwise managed for use in evaluating and/or predicting any suitable sensory feedback state(s) for any suitable sensory feedback characteristic(s) of any suitable location(s) of an experiencing entity (e.g., carrier (e.g., vehicle)) during any suitable experiencing entity scenario based on any suitable experiencing entity scenario data and/or any suitable experiencing entity sensory feedback data that may be sensed from an experiencing entity during the experiencing entity scenario (e.g., any suitable vehicle during any suitable vehicle scenario). For example, a sensory feedback model may be a learning engine for a vehicle experiencing entity (e.g., a particular vehicle (e.g., John Doe's 1979 Ford Pinto) or a particular subset or type of vehicle (e.g., all 1979 Ford Pintos) or all vehicles generally), where the learning engine may be operative to use any suitable machine learning for using certain vehicle scenario data sensed by the vehicle experiencing entity during a particular vehicle scenario (e.g., vehicle scenario data for one or more various types or categories of vehicle scenario data for any suitable vehicle scenario characteristics of the particular vehicle scenario) (and/or certain vehicle sensory feedback data sensed by the vehicle during the particular vehicle scenario (e.g., vehicle sensory feedback data for one or more various types or categories of vehicle sensory feedback data for any suitable vehicle sensory feedback characteristics)) in order to predict, estimate, and/or otherwise generate a sensory feedback state and/or any suitable sensory feedback state determination that may be indicative of the sensory feedback that may be experienced by or provided by the vehicle during the particular vehicle scenario (e.g., any suitable haptic sensory feedback, olfactory sensory feedback, auditory sensory feedback, and/or visual sensory feedback) that may be provided at or by the vehicle at any suitable location(s) during the particular vehicle scenario), and where such a sensory feedback state determination may be used to generate any suitable sensory feedback control data for use in operating any suitable output component(s) of any suitable replicating vehicle. For example, the learning engine may include any suitable neural network (e.g., an artificial neural network) that may be initially configured, trained on one or more sets of vehicle scenario data and respective vehicle sensory feedback data as sensed by a vehicle associated with the learning engine during one or more vehicle scenarios, and then used to predict certain other vehicle sensory feedback data or other sensory feedback state determination(s) based on certain other vehicle sensory feedback data (and/or yet other vehicle sensory feedback data) as sensed by a vehicle during another vehicle scenario.

A neural network or neuronal network or artificial neural network may be hardware-based, software-based, or any combination thereof, such as any suitable model (e.g., an analytical model, a computational model, etc.), which, in some embodiments, may include one or more sets or matrices of weights (e.g., adaptive weights, which may be numerical parameters that may be tuned by one or more learning algorithms or training methods or other suitable processes) and/or may be capable of approximating one or more functions (e.g., non-linear functions or transfer functions) of its inputs. The weights may be connection strengths between neurons of the network, which may be activated during training and/or prediction. A neural network may generally be a system of interconnected neurons that can compute values from inputs and/or that may be capable of machine learning and/or pattern recognition (e.g., due to an adaptive nature). A neural network may use any suitable machine learning techniques to optimize a training process. The neural network may be used to estimate or approximate functions that can depend on a large number of inputs and that may be generally unknown. The neural network may generally be a system of interconnected "neurons" that may exchange messages between each other, where the connections may have numeric weights (e.g., initially configured with initial weight values) that can be tuned based on experience, making the neural network adaptive to inputs and capable of learning (e.g., learning pattern recognition). A suitable optimization or training process may be operative to modify a set of initially configured weights assigned to the output of one, some, or all neurons from the input(s) and/or hidden layer(s). A non-linear transfer function may be used to couple any two portions of any two layers of neurons, including an input layer, one or more hidden layers, and an output (e.g., an input to a hidden layer, a hidden layer to an output, etc.).

Different input neurons of the neural network may be associated with respective different types of vehicle scenario categories and may be activated by vehicle scenario category data of the respective vehicle scenario categories (e.g., each possible category of vehicle scenario characteristic information (e.g., type of vehicle, type of tires of vehicle, type of fuel used by vehicle, status of each seat of vehicle, status of occupant of each seat of vehicle, status of each window and/or sunroof and/or convertible roof of vehicle, status of HVAC system of vehicle, status of media system of vehicle, status of weather of environment of vehicle, status of smell of environment of vehicle, status of sound of environment of vehicle, status of light of environment of vehicle, status of driving surface of vehicle, status of driving operation of vehicle, and/or the like) may be associated with one or more particular respective input neurons of the neural network and vehicle scenario category data for the particular vehicle scenario category may be operative to activate the associated input neuron(s)). The weight assigned to the output of each neuron may be initially configured (e.g., at operation 402 of process 400 of FIG. 4) using any suitable determinations that may be made by a custodian or processor of the model based on the data available to that custodian. The output(s) of the neural network(s) may be a predicted sensory feedback state(s) that may be indicative of any suitable vehicle sensory feedback characteristic(s) of the vehicle associated with the neural network (e.g., an output neuron of the neural network may be associated with a type of vehicle sensory feedback category and may provide vehicle sensory feedback category data of the respective vehicle sensory feedback category (e.g., any one of the possible categories of vehicle sensory feedback characteristic information (e.g., haptic sensory feedback of or at any suitable component(s) of the vehicle, olfactory sensory feedback at any suitable location(s) with respect to the vehicle, auditory sensory feedback at any suitable location(s) with respect to the vehicle, visual sensory feedback at any suitable location(s) with respect to the vehicle, and/or the like))). Therefore, one or more models or one or more neural networks associated with an experiencing entity may be trained on any suitable scenario data (e.g., as inputs) and any suitable sensory feedback data (e.g., as outputs) for one or more scenarios (e.g., training scenarios) and later used to predict any suitable type(s) of sensory feedback data based on any suitable scenario data for a particular scenario (e.g., a live scenario).

In some embodiments, in addition to some input neurons being associated with different types of vehicle scenario categories, other input neurons of the neural network may be associated with respective different types of vehicle sensory feedback categories and may be activated by vehicle sensory feedback category data of the respective vehicle sensory feedback categories (e.g., each possible category of vehicle sensory feedback characteristic information (e.g., haptic sensory feedback of or at any suitable component(s) of the vehicle, olfactory sensory feedback at any suitable location(s) with respect to the vehicle, auditory sensory feedback at any suitable location(s) with respect to the vehicle, visual sensory feedback at any suitable location(s) with respect to the vehicle, and/or the like) may be associated with one or more particular respective input neurons of the neural network and vehicle sensory feedback category data for the particular vehicle sensory feedback category may be operative to activate the associated input neuron(s)). Therefore, the predicted sensory feedback state(s) may be different than any vehicle sensory feedback category data used as an input to the neural network (e.g., a first neural network may be configured to generate an output that predicts a vehicle sensory feedback state of a vibration of a headrest of a front passenger seat while input neurons of the first neural network may be associated with various other types of vehicle sensory feedback category data (e.g., vibration of each other headrest, vibration of motor, smell at the front passenger seat, smell at each other seat, etc.)). Therefore, a first model of a vehicle or a first neural network of a model of a vehicle may be configured to receive as inputs (1a) any/all suitable vehicle scenario category data for any/all particular vehicle scenario categories and (1b) any/all suitable vehicle sensory feedback category data for any/all vehicle sensory feedback categories except for a first particular vehicle sensory feedback category (e.g., vibration of a front passenger seat headrest of the vehicle) and to provide as output (1c) a prediction of vehicle sensory feedback category data for that first particular vehicle sensory feedback category, while a second model for the vehicle or a second neural network of the model for the vehicle may be configured to receive as inputs (2a) any/all suitable vehicle scenario category data for any/all particular vehicle scenario categories and (2b) any/all suitable vehicle sensory feedback category data for any/all vehicle sensory feedback categories except for a second particular vehicle sensory feedback category that is different than the first particular vehicle sensory feedback category (e.g., vibration of a brake pedal of the vehicle) and to provide as output (2c) a prediction of vehicle sensory feedback category data for that second particular vehicle sensory feedback category. Therefore, each possible vehicle sensory feedback category may be associated with its own model or its own neural network of a model configured to provide a prediction for that vehicle sensory feedback category (e.g., a vehicle sensory feedback output state) based on any suitable sensed vehicle scenario category data and any suitable sensed vehicle sensory feedback category data except for the vehicle sensory feedback category associated with the prediction. However, for sake of simplicity, a sensory feedback model may be described as predicting any suitable vehicle sensory feedback data (e.g., any suitable vehicle sensory feedback output state) based on any other suitable vehicle sensory feedback data (e.g., any suitable vehicle sensory feedback input states) and based on any suitable vehicle scenario data (e.g., any suitable vehicle scenario input states). Moreover, for sake of even more simplicity, a sensory feedback model may be described as predicting any suitable vehicle sensory feedback data (e.g., any suitable vehicle sensory feedback state) based on any suitable vehicle scenario data (e.g., any suitable vehicle scenario states).

The initial configuring of the learning engine or sensory feedback model for an experiencing entity (e.g., the initial weighting and arranging of neurons of a neural network of the learning engine) may be done using any suitable data accessible to a custodian of the model (e.g., a manufacturer of VMS subsystem 10, a manufacturer or caretaker or user of a particular vehicle, and/or the like), such as data associated with the configuration of other learning engines of system 1 (e.g., learning engines or sensory feedback models for similar experiencing entities), data associated with the experiencing entity (e.g., initial background data accessible by the model custodian about the experiencing entity's composition, background, use, past experienced scenarios, fuel type, alterations, age, and/or the like), data assumed or inferred by the model custodian using any suitable guidance, and/or the like. For example, a model custodian may be operative to capture any suitable initial background data about the experiencing entity in any suitable manner, such as automatically or through any suitable data entry, which may be enabled by any suitable user interface provided to an appropriate subsystem or device accessible to a manager or user or otherwise of the experiencing entity (e.g., a model app or website). For example, the model custodian may provide a data collection portal for enabling any suitable entity to provide initial background data for the experiencing entity. The data may be uploaded in bulk or manually entered in any suitable manner. In a particular embodiment where the experiencing entity is a particular vehicle or a group of vehicles, the following is a list of just some of the one or more potential types of data that may be collected by a model custodian (e.g., for use in initially configuring the model): sample questions for which answers may be collected may include, but are not limited to, questions related to a vehicle's tire type, age of tires, alterations made to the vehicle by an owner, current fuel type being used by the vehicle, chassis type, motor type, stick shift type, height, weight, and/or the like. Similarly, the system may be configured to determine any suitable auxiliary factors about a user of an experiencing entity, including, but not limited to, replicating vehicle user profile data (e.g., age of a user of the replicating vehicle, weight of the user, haptic sensory sensitivity of the user, olfactory sensory sensitivity of the user, auditory sensor sensitivity of the user, visual sensor sensitivity of the user, etc.), replicating vehicle user active data (e.g., heart rate of the user, breathing rate of the user, blood pressure of the user, facial expression(s) of the user, audible output of the user, etc.), replicating vehicle preference data (e.g., maximum speed preference of the user, maximum rate of acceleration preference of the user, etc.), and/or the like.

A sensory feedback model custodian may receive from the experiencing entity (e.g., at operation 404 of process 400 of FIG. 4) not only (1) any suitable scenario input states as scenario data for at least one, some, or each scenario data category that may be sensed or determined by the experiencing entity for or during a particular scenario (e.g., a scenario that the experiencing entity is currently experiencing or has previously experienced) (e.g., type of experiencing entity, type of tires of experiencing entity, type of fuel used by experiencing entity, status of each seat of experiencing entity, status of occupant of each seat of experiencing entity, status of each window and/or sunroof and/or convertible roof of experiencing entity, status of HVAC system of experiencing entity, status of media system of experiencing entity, status of weather of environment of experiencing entity, status of smell of environment of experiencing entity, status of sound of environment of experiencing entity, status of light of environment of experiencing entity, status of driving surface of experiencing entity, status of driving operation of experiencing entity, and/or the like of the experiencing entity during the particular experiencing entity scenario) but also (2) a sensory feedback output state as sensory feedback data for at least one sensory feedback data category that may be sensed by the experiencing entity during the particular scenario (e.g., a haptic profile (e.g., vibration shape, magnitude, duration, etc.) of a headrest of the experiencing entity during the particular experiencing entity scenario) if not also (3) any suitable sensory feedback input states as sensory feedback data for at least one other sensory feedback data category that may be sensed by the experiencing entity during the particular scenario (e.g., haptic profiles of all other sensed locations of the experiencing entity during the particular experiencing entity scenario and/or olfactory profiles (e.g., smell type, magnitude, duration, etc.) of all sensed locations of the experiencing entity during the particular experiencing entity scenario and/or auditory profiles (e.g., sound type, magnitude, duration, etc.) of all sensed locations of the experiencing entity during the particular experiencing entity scenario and/or visual profiles (e.g., light type, magnitude, duration, etc.) of all sensed locations of the experiencing entity during the particular experiencing entity scenario, etc.). The receipt of such category data may be enabled by any suitable user interface provided to any suitable user of any suitable experiencing entity by any suitable model custodian (e.g., a user interface app or website that may be accessed by the user) and/or by any suitable sensor(s) of the experiencing entity and/or by any suitable third parties (e.g., weather services, traffic services, etc.).

A learning engine or model for an experiencing entity may be trained (e.g., at operation 406 of process 400 of FIG. 4) using the received scenario category data for the experiencing entity scenario (e.g., as inputs of a neural network of the learning engine) and using the received sensory feedback output state for the experiencing entity scenario (e.g., as an output of the neural network of the learning engine). Any suitable training methods or algorithms (e.g., learning algorithms) may be used to train the neural network of the learning engine, including, but not limited to, Back Propagation, Resilient Propagation, Genetic Algorithms, Simulated Annealing, Levenberg, Nelder-Meade, and/or the like. Such training methods may be used individually and/or in different combinations to get the best performance from a neural network. A loop (e.g., a receipt and train loop) of receiving scenario category data and a sensory feedback output state for an experiencing entity scenario and then training the model using the received scenario category data and sensory feedback output state (e.g., a loop of operation 404 and operation 406 of process 400 of FIG. 4) may be repeated any suitable number of times for the same experiencing entity and the same learning engine for more effectively training the learning engine for the experiencing entity, where the received scenario category data and the received sensory feedback output state received of different receipt and train loops may be for different experiencing entity scenarios or for substantially the same experiencing entity scenario (e.g., at different times and/or with respect to different planned scenarios (e.g., turns, etc.)) and/or may be received from the same source or from different sources of the experiencing entity (e.g., from different users of the experiencing entity), while the training of different receipt and train loops may be done for the same learning engine using whatever scenario category data and sensory feedback output state were received for the particular receipt and train loop. As just one example, different receipt and train loops may be carried out in any suitable controlled setting where a majority of the scenario category data may remain consistent between receipt and train loops (e.g., type of experiencing entity, type of tires of experiencing entity, type of fuel used by experiencing entity, status of each seat of experiencing entity, status of occupant of each seat of experiencing entity, status of each window and/or sunroof and/or convertible roof of experiencing entity, status of HVAC system of experiencing entity, status of media system of experiencing entity, status of weather of environment of experiencing entity, status of smell of environment of experiencing entity, status of sound of environment of experiencing entity, status of light of environment of experiencing entity, status of driving surface of experiencing entity, and/or the like may remain consistent between different receipt and train loops (e.g., between different experiencing entity scenarios)), while certain other scenario category data may be varied between receipt and train loops (e.g., the status of driving operation of experiencing entity (e.g., forward or reverse speed, acceleration, deceleration, steering wheel orientation and/or movement, brake pedal position and/or movement, acceleration pedal position and/or movement, gear of gear shift (if applicable), and/or the like may be selectively varied between different receipt and train loops (e.g., between different experiencing entity scenarios)). The number and/or type(s) of the one or more scenario categories for which scenario category data may be received for one receipt and train loop may be the same or different in any way(s) than the number and/or type(s) of the one or more scenario categories for which scenario category data may be received for a second receipt and train loop.

A sensory feedback model custodian may access (e.g., at operation 408 of process 400 of FIG. 4) scenario data for at least one scenario data category for another experiencing entity scenario (e.g., a scenario that may be different than any scenario considered at any scenario data receipt of a receipt and train loop for training the learning engine for the experiencing entity). In some embodiments, this other scenario may be a scenario that has not been specifically experienced by any experiencing entity prior to use of the sensory feedback model in an end user use case. Although, it is to be understood that this other scenario may be any suitable scenario. The scenario data for this other scenario may be accessed from or otherwise provided by any suitable source(s) using any suitable methods (e.g., from one or more sensor assemblies and/or input assemblies of any suitable experiencing entity and/or third party data provider that may be associated with the particular scenario at the particular time) for use by the sensory feedback model custodian.

Any suitable scenario data for any suitable scenario data categories for the other experiencing entity scenario (e.g., scenario of interest) that may be accessed (e.g., at operation 408 of process 400 of FIG. 4) may then be used (e.g., at operation 410 of process 400 of FIG. 4) by the learning engine or sensory feedback model for any suitable experiencing entity (e.g., model or neural network for or associated with a target experiencing entity, a replicating experiencing entity, etc.) to predict or otherwise determine any suitable sensory feedback output state for that experiencing entity during the other experiencing entity scenario. For example, the scenario category data accessed for the scenario of interest may be utilized as input(s) to the neural network of the learning engine (e.g., at operation 410 of process 400 of FIG. 4) similarly to how the scenario category data accessed at a receipt portion of a receipt and train loop may be utilized as input(s) to the neural network of the learning engine at a training portion of the receipt and train loop, and such utilization of the learning engine with respect to the scenario category data accessed for the scenario of interest may result in the neural network providing an output indicative of any suitable sensory feedback output state(s) that may represent the learning engine's predicted or estimated sensory feedback output state(s) to be provided by the experiencing entity associated with the neural network during the scenario of interest.

After any suitable estimated sensory feedback output state(s) (e.g., any suitable sensory feedback output state data (e.g., data 322 of FIG. 3)) is realized for a scenario of interest (e.g., for a current scenario being experienced by an experiencing entity (e.g., by a replicating experiencing entity) using the output(s) of a sensory feedback model or model(s) of any suitable experiencing entity(ies) (e.g., using output data 310 of model(s) 19*mr* of the replicating experiencing entity 290*r* and/or output data 312 of model(s) 19*mt* of any suitable target experiencing entity 290*t* and/or the like) and/or using any suitable auxiliary factor data 99 from any suitable source(s)), it may be determined (e.g., at operation 412 of process 400 of FIG. 4) whether the realized sensory feedback output state satisfies a particular condition of any suitable number of potential conditions and, if so, the model custodian or any other suitable processor assembly or otherwise (e.g., of the replicating vehicle or of the VMS subsystem or otherwise) may generate any suitable sensory feedback control data (e.g., sensory feedback control or mode data (e.g., sensory feedback control data 324 of system 301 of FIG. 3)) that may be associated with that satisfied condition for controlling any suitable functionality of any suitable output assembly of any suitable entity (e.g., of a replicating experiencing entity) or any other suitable managed element (e.g., for adjusting a user interface presentation to a user (e.g., to provide a sensory feedback suggestion to a user) of the experiencing entity and/or for controlling any suitable functionality of any suitable output assembly and/or actuator assembly(ies) of the experiencing entity (e.g., for instructing that experiencing entity to replicate the sensory feedback identified by the sensory feedback control data)). For example, a particular condition may be a minimum threshold value of a sensory feedback output state (e.g., magnitude of a sensory feedback characteristic) above which the predicted sensory feedback output state ought to result in sensory feedback being applied to the experiencing entity using any suitable sensory feedback control data (e.g., as may be generated at operation 412 (e.g., control instruction(s) for one or more actuators of the experiencing entity to replicate the sensory feedback predicted or otherwise determined (e.g., at operation 410))). A threshold value may be determined in any suitable manner and may vary between different experiencing entities and/or between different scenarios of interest and/or between different combinations of such experiencing entities and scenarios and/or in any other suitable manner.

It is to be understood that an experiencing entity (e.g., vehicle) does not have to be physically present at or physically experience a particular scenario of interest in order for the sensory feedback model associated with that experiencing entity to predict or estimate or otherwise provide any suitable sensory feedback output state(s) applicable to that scenario for that experiencing entity. Instead, for example, a user or custodian or otherwise may select or define or otherwise indicate a particular scenario of interest (e.g., from a list of possible scenarios of interest (e.g., scenarios previously experienced by any suitable experiencing entity or otherwise accessible by the model custodian)), and the model custodian for a model associated with a particular experiencing entity may be configured to access any suitable scenario data for that scenario of interest and use such data as inputs for the model associated with the particular experiencing entity in order to predict or estimate or otherwise provide appropriate sensory feedback output state(s) for that scenario of interest and that experiencing entity.

If a scenario of interest is experienced by an experiencing entity, then any suitable sensory feedback output state(s) (e.g., any suitable sensory feedback data of any suitable sensory feedback data categories) may be detected during that scenario being experienced by the experiencing entity and may be stored (e.g., along with any suitable scenario data of that scenario) as scenario behavior data and/or may be used in an additional receipt and train loop for further training the learning engine. Moreover, in some embodiments, a sensory feedback model custodian may be operative to compare a predicted sensory feedback output state for a particular scenario of interest with an actual experiencing entity provided sensory feedback output state for the particular scenario of interest that may be received after or while the experiencing entity may be actually experiencing the scenario of interest and enabled to actually sense the sensory feedback output state of the experiencing entity during the scenario of interest (e.g., a target vehicle). Such a comparison may be used in any suitable manner to further train the learning engine and/or to specifically update certain features (e.g., weights) of the learning engine. For example, any algorithm or portion thereof that may be utilized to determine a sensory feedback output state may be adjusted based on the comparison. A user (e.g., a user of an experiencing entity (e.g., a driver or passenger of a replicating vehicle 290r)) may be enabled by the sensory feedback model custodian to adjust one or more filters, such as a profile of scenarios they prefer and/or any other suitable preferences or user profile characteristics (e.g., replicating vehicle user profile data (e.g., age of a user of the replicating vehicle, weight of the user, haptic sensory sensitivity of the user, olfactory sensory sensitivity of the user, auditory sensor sensitivity of the user, visual sensor sensitivity of the user, etc.), replicating vehicle user active data (e.g., heart rate of the user, breathing rate of the user, blood pressure of the user, facial expression(s) of the user, audible output of the user, etc.), replicating vehicle preference data (e.g., maximum speed preference of the user, maximum rate of acceleration preference of the user, etc.), and/or the like (e.g., as any suitable auxiliary factor data 99)) in order to achieve such results. This capability may be useful based on changes in an experiencing entity's user's capabilities and/or objectives and/or preferences. For example, if a user loses its hearing or ability to smell certain smells, this information may be provided to the model custodian, whereby one or more weights of the model may be adjusted such that the model may provide appropriate outputs in the future. Alternatively, this information may be used after determining a model sensory feedback output state but while determining if that output state satisfies a condition (e.g., includes generating a smell that can be smelled by the user of the replicating experiencing entity).

Therefore, any suitable model custodian may be operative to generate and/or manage any suitable sensory feedback model or sensory feedback learning engine that may utilize any suitable machine learning, such as one or more artificial neural networks, to analyze certain scenario data of a scenario to predict/estimate the sensory feedback output state(s) of that scenario for a particular experiencing entity, which may enable intelligent suggestions to be provided to a user and/or intelligent system functionality adjustments be made for improving a user's sensory experiences (e.g., for adjusting the sensory feedback provided by a replicating vehicle to a user wishing for a similar experience to that of a target vehicle). For example, a sensory feedback engine may be initially configured or otherwise developed for an experiencing entity based on information provided to a model custodian by the experiencing entity or a user thereof that may be indicative of the experiencing entity's specific preferences or capabilities for different scenarios and/or scenario types (e.g., generally and/or for particular road surfaces and/or for particular speeds, etc.) and/or of the experiencing entity's specific experience with one or more specific scenarios. An initial version of the sensory feedback engine for the experiencing entity may be generated by the model custodian based on certain assumptions made by the model custodian, perhaps in combination with some limited experiencing entity-specific information that may be acquired by the model custodian from the experiencing entity or a user thereof prior to using the sensory feedback engine, such as the experiencing entity's preference for or improved capabilities in warm temperatures and/or on straight roads. The initial configuration of the sensory feedback engine may be based on data for several scenario categories, each of which may include one or more specific scenario category data values, each of which may have any suitable initial weight associated therewith, based on the information available to the model custodian at the time of initial configuration of the engine (e.g., at operation 402 of process 400 of FIG. 4). As an example, a scenario category may be temperature of environment of experiencing entity, and the various specific scenario category data values for that scenario category may include <0° Celsius, 0-19° Celsius, 20-39° Celsius, 40-59° Celsius, 60-79° Celsius, 80-99° Celsius, and ≥100° Celsius. As another example, a scenario category may be status of front left window (e.g., window 294wfm), and the various specific scenario category data values for that scenario category may include fully closed, 1-40% open, 41-90% open, 91-99% open, and 100% open, each of which may have a particular initial weight associated with it. As yet another example, a scenario category may be white point chromaticity detected by a sensor at a front passenger seat headrest, and the various specific scenario category data values for that scenario category may include [0, 0], [¼, ¼], and [½, ½], each of which may have a particular initial weight associated with it.

To accurately predict the sensory feedback that ought to be provided by a replicating vehicle to a user thereof during a scenario of interest when the user has selected a particular target vehicle to be replicated during that scenario of interest, any suitable portion of system 1, such as the replication vehicle (e.g., replicating vehicle 290r), may be configured to use various information sources in combination with any available sensory feedback model(s) in order to characterize or classify or predict any suitable sensory feedback output state(s) when appropriate or when possible. For example, any suitable processing circuitry or assembly (e.g., a sensory feedback module) of replicating vehicle 290r or otherwise may be configured to gather and to process various types of scenario data for a particular scenario of interest, in conjunction with any suitable sensory feedback model(s), to determine what type of sensory feedback is to be expected by the target vehicle for the particular scenario of interest and/or to determine what type of sensory feedback is to be expected by the replicating vehicle for the particular scenario of interest. For example, any suitable scenario data from one or more of replicating vehicle sensor assembly 295*rs* and/or third party data provider 40 and/or the like may be utilized in conjunction with any suitable sensory feedback model(s), such as with target vehicle sensory feedback model 19*mt* and/or replicating vehicle sensory feedback model 19*mr*, to determine what type of sensory feedback is to be expected during a particular scenario of interest from the target vehicle and/or from the replicating vehicle efficiently and/or effectively.

Figure 3:
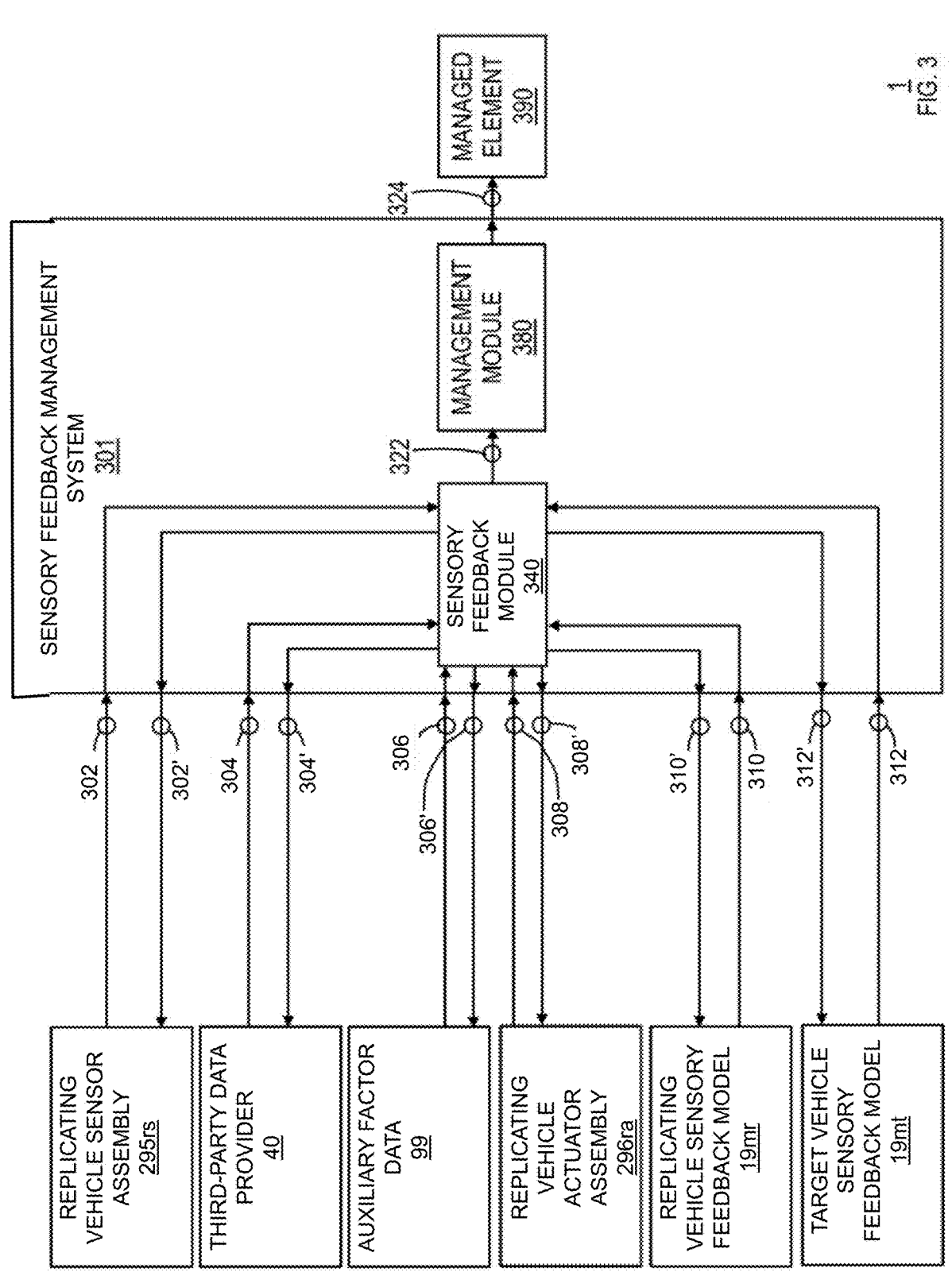
FIG. 3 is a schematic view of an illustrative portion of a sensory feedback management system of the system of FIG. 1D, in accordance with some embodiments of the disclosure.

FIG. 3 shows a schematic view of a sensory feedback management system 301 of any suitable entity of system 1 (e.g., any suitable processing circuitry of replicating vehicle 290*r* and/or VMS subsystem 10 and/or the like) that may be provided (e.g., as a sensory feedback management system 250) to manage any suitable sensory feedback state(s) of any suitable entity (e.g., to manage any suitable sensory feedback state(s) of replicating vehicle 290*r* during a particular scenario of interest (e.g., to determine one or more sensory feedback state(s) of a particular target vehicle 290*t* during a particular scenario of interest and/or to determine one or more sensory feedback state(s) of replicating vehicle 290*r* during the particular scenario of interest and/or to manage a mode of operation of any suitable actuator assembly(ies) and/or otherwise of replicating vehicle 290*r* and/or of any other suitable subsystem of system 1 based on the determined sensory feedback state(s))). In addition to or as an alternative to using any suitable replicating vehicle sensor assembly data 302 that may be generated by replicating vehicle sensor assembly 295*rs* (e.g., any suitable sensor(s) and/or input component(s) and/or otherwise of replicating vehicle 290*r*) as any suitable scenario data for a particular scenario of interest of replicating vehicle 290*r* (e.g., as may be automatically pushed as data 302 or pulled as data 302 in response to any suitable data request 302'), sensory feedback management system 301 use various other types of accessible data in order to determine any suitable scenario data for a particular scenario of interest of replicating vehicle 290*r* that may be used as input(s) to one or more sensory feedback models (e.g., in conjunction with model 19*mr* and/or model 19*mt*), such as any suitable third-party provider data 304 that may be provided by any suitable third-party data provider(s) 40 (e.g., as may be automatically pushed as data 304 or pulled as data 304 in response to any suitable data request 304') and/or any suitable auxiliary factor data 306 that may be provided by at least a portion of any suitable auxiliary factor data 99 (e.g., as may be automatically pushed as data 306 or pulled as data 306 in response to any suitable data request 306') and/or any suitable replicating vehicle actuator assembly data 308 that may be provided by any replicating vehicle actuator assembly 296*ra* (e.g., any suitable actuator(s) and/or output component(s) and/or otherwise of replicating vehicle 290*r*) (e.g., as may be automatically pushed as data 308 or pulled as data 308 in response to any suitable data request 308'). Such scenario data for a particular scenario of interest of replicating vehicle 290*r* (e.g., as may be defined by any suitable data 302, 304, 306, and/or 308) may be provided (e.g., by sensory feedback management system 301 (e.g., by sensory feedback module 340 or otherwise)) to any suitable replicating vehicle sensory feedback model(s) 19*mr* for replicating vehicle 290*r* as any suitable replicating vehicle sensory feedback model scenario input data 310' for at least one scenario data category (e.g., at one or more iterations of operation 408 for any previously configured and trained replicating vehicle sensory feedback model(s) 19*mr* for replicating vehicle 290*r*), whereby such scenario data may be utilized as any suitable input(s) by one, some, or each appropriate replicating vehicle sensory feedback model 19*mr* for replicating vehicle 290*r* to predict or estimate or otherwise determine (e.g., at one or more iterations of operation 410 for any previously configured and trained replicating vehicle sensory feedback model(s) 19*mr* for replicating vehicle 290*r*) any suitable sensory feedback output state(s) for the particular scenario of interest by replicating vehicle 290*r* (e.g., to predict the sensory feedback that would be provided by the replicating vehicle during the scenario of interest), where such predicted sensory feedback output state(s) may be provided as any suitable replicating vehicle sensory feedback model sensory feedback output data 310 (e.g., to sensory feedback management system 301 (e.g., to sensory feedback module 340 or otherwise)). Additionally or alternatively, such scenario data for a particular scenario of interest of replicating vehicle 290*r* (e.g., as may be defined by any suitable data 302, 304, 306, and/or 308) may be provided (e.g., by sensory feedback management system 301 (e.g., by sensory feedback module 340 or otherwise)) to any suitable target vehicle sensory feedback model(s) 19*mt* for any suitable target vehicle (e.g., target vehicle 290*t* of any number of available target vehicles, as may be selected by a user of the replicating vehicle as a vehicle to be replicated by the replicating vehicle during the scenario of interest) as any suitable target vehicle sensory feedback model scenario input data 312' for at least one scenario data category (e.g., at one or more iterations of operation 408 for any previously configured and/or trained target vehicle sensory feedback model(s) 19*mt* for target vehicle 290*t*), whereby such scenario data may be utilized as any suitable input(s) by one, some, or each appropriate target vehicle sensory feedback model 19*mt* for target vehicle 290*t* to predict or estimate or otherwise determine (e.g., at one or more iterations of operation 410 for any previously configured and/or trained target vehicle sensory feedback model(s) 19*mt* for target vehicle 290*t*) any suitable sensory feedback output state(s) for the particular scenario of interest by target vehicle 290*t* (e.g., to predict the sensory feedback that would be provided by the target vehicle during the scenario of interest), where such predicted sensory feedback output state(s) may be provided as any suitable target vehicle sensory feedback model sensory feedback output data 312 (e.g., to sensory feedback management system 301 (e.g., to sensory feedback module 340 or otherwise)). In response to determining any suitable sensory feedback output state(s) for the particular scenario of interest by target vehicle 290*t* as may be indicated by any suitable target vehicle sensory feedback model sensory feedback output data 312 (e.g., to predict the sensory feedback that would be provided by the target vehicle during the scenario of interest) and/or determining any suitable sensory feedback output state(s) for the particular scenario of interest by replicating vehicle 290*r* as may be indicated by any suitable replicating vehicle sensory feedback model sensory feedback output data 310 (e.g., to predict the sensory feedback that would be provided by the replicating vehicle during the scenario of interest), sensory feedback management system 301 may be configured to apply at least one sensory feedback-based mode of operation to at least one managed element 390 (e.g., any suitable assembly of replicating vehicle 290*r* (e.g., any suitable replicating vehicle actuator assembly 296*ra* and/or any other output component(s) of replicating vehicle 290*r*) or otherwise of system 1 (e.g., of user device 220*u*)) based on such determined sensory feedback output state(s), such as through the generation (e.g., at one or more iterations of operation 412) and use of any suitable sensory feedback control data (e.g., to suggest certain user behavior and/or to control the functionality of one or more system assemblies) for improving a user's experience (e.g., for improving a user's sensory feedback experience with replicating vehicle 290$r$ during the particular scenario of interest (e.g., by adjusting the sensory feedback provided by replicating vehicle 290$r$ during the particular scenario of interest to match the sensory feedback that would be provided by target vehicle 290$t$ during the particular scenario of interest)). For example, as shown in FIG. 3, sensory feedback management system 301 may include a sensory feedback module 340 and a management module 380.

Sensory feedback module 340 of sensory feedback management system 301 may be configured to use various types of data (e.g., data 302, 304, 306, 308, 310, and/or 312) accessible to the host of system 301 (e.g., replicating vehicle 290$r$, VMS subsystem 10, user device 220$u$, etc.) in order to determine (e.g., characterize) any suitable sensory feedback state(s) for the particular scenario of interest (e.g., any suitable sensory feedback state(s) by the replicating vehicle of data 310 and/or any suitable sensory feedback state(s) by the target vehicle of data 312). Once sensory feedback module 340 has predicted or otherwise determined any suitable sensory feedback state(s) for the particular scenario of interest by the target vehicle and/or by the replicating vehicle (e.g., based on any suitable combination of one or more of any suitable received data 302, 304, 306, 308, 310, and/or 312), sensory feedback module 340 may be configured to generate and transmit sensory feedback state data 322 to management module 380, where sensory feedback state data 322 may be indicative of any appropriate sensory feedback output state(s) to be applied by replicating vehicle 290$r$ and may be generated based on any suitable analysis and/or processing of such sensory feedback state(s) of data 310 and/or data 312 and, in some embodiments, any suitable additional data, such as auxiliary factor data 99 (e.g., auxiliary factor data 306).

As just one example, only sensory feedback state(s) by the target vehicle for the particular scenario of interest may be determined or otherwise received by or used by sensory feedback module 340 (e.g., only sensory feedback state(s) by the target vehicle of data 312 and not any sensory feedback state(s) by the replicating vehicle of data 310), which may be operative to predict the sensory feedback that would be provided by the target vehicle during the scenario of interest but that may not be operative to predict the sensory feedback that would be provided by the replicating vehicle during the scenario of interest. In such an example, sensory feedback state data 322 may be indicative of any appropriate sensory feedback output state(s) to be applied by replicating vehicle 290$r$ and may be generated based on any suitable analysis and/or processing of such data 312 and, optionally, any suitable auxiliary factor data 99 (e.g., auxiliary factor data 306), but not on any data 310, whereby auxiliary factor data may filter or boost or reduce or adjust or otherwise affect the sensory feedback output state(s) identified by data 312 but whereby no understanding of an expected sensory feedback by the replicating vehicle may be taken into account while generating sensory feedback state data 322.

As just one other example, only sensory feedback state(s) by the replicating vehicle for the particular scenario of interest may be determined or otherwise received by or used by sensory feedback module 340 (e.g., only sensory feedback state(s) by the replicating vehicle of data 310 and not any sensory feedback state(s) by the target vehicle of data 312), which may be operative to predict the sensory feedback that would be provided by the replicating vehicle during the scenario of interest but that may not be operative to predict the sensory feedback that would be provided by the target vehicle during the scenario of interest. In such an example, sensory feedback state data 322 may be indicative of any appropriate sensory feedback output state(s) to be applied by replicating vehicle 290$r$ and may be generated based on any suitable analysis and/or processing of such data 310 and any suitable auxiliary factor data 99 (e.g., auxiliary factor data 306), but not on any data 312, whereby auxiliary factor data may filter or boost or reduce or adjust or otherwise affect the sensory feedback output state(s) identified by data 310 (e.g., boost olfactory, reduce auditory, etc.) but whereby no understanding of an expected sensory feedback by the target vehicle may be taken into account while generating sensory feedback state data 322.

As just one other example, not only sensory feedback state(s) by the target vehicle for the particular scenario of interest may be determined or otherwise received by or used by sensory feedback module 340 (e.g., sensory feedback state(s) by the target vehicle of data 312) but also sensory feedback state(s) by the replicating vehicle for the particular scenario of interest may be determined or otherwise received by or used by sensory feedback module 340 (e.g., sensory feedback state(s) by the replicating vehicle of data 310), which may be operative to predict not only the sensory feedback that would be provided by the target vehicle during the scenario of interest but also the sensory feedback that would be provided by the replicating vehicle during the scenario of interest. In such an example, sensory feedback state data 322 may be indicative of any appropriate sensory feedback output state(s) to be applied by replicating vehicle 290$r$ and may be generated based on any suitable analysis and/or processing of not only data 310 but also data 312 and, optionally, any suitable auxiliary factor data 99 (e.g., auxiliary factor data 306, whereby auxiliary factor data may filter or boost or reduce or adjust or otherwise affect the sensory feedback output state(s) identified by data 310 and/or data 312), such that knowledge of an expected sensory feedback by the replicating vehicle for the scenario of interest may be taken into account in conjunction with knowledge of an expected sensory feedback by the target vehicle for the scenario of interest while generating sensory feedback state data 322. For example, in such situations, a difference between the expected sensory feedback by the replicating vehicle for the scenario of interest and the expected sensory feedback by the target vehicle for the scenario of interest (or any other suitable function of the two expected sensory feedbacks) may be determined while generating sensory feedback state data 322 (e.g., an expected haptic sensory feedback of a driver's seat's headrest by the replicating vehicle may be subtracted from the expected haptic sensory feedback of a driver's seat's headrest by the target vehicle such that the resulting difference may be applied as additional haptic sensory feedback (e.g., as defined by data 322) to the driver's seat's headrest of the replicating vehicle during the scenario of interest (e.g., such that such an application combined with the actual haptic sensory feedback of the driver's seat's headrest by the target vehicle during the scenario of interest may be equal to the expected haptic sensory feedback of the driver's seat's headrest by the target vehicle during the scenario of interest).

In response to determining the appropriate sensory feedback output state(s) to be applied by replicating vehicle 290$r$ through receiving sensory feedback state data 322 from sensory feedback module 340, management module 380 may be configured to apply at least one sensory feedback-based mode of operation to at least one managed element 390 of replicating vehicle 290*r* based on the determined sensory feedback output state(s). For example, as shown in FIG. 3, sensory feedback management system 301 may include management module 380, which may be configured to receive sensory feedback state data 322 from sensory feedback module 340, as well as to generate and share sensory feedback mode data 324 with at least one managed element 390 (e.g., of replicating vehicle 290*r* and/or of any other suitable portion of system 1 (e.g., user subsystem 220*u*, VMS subsystem 10, target vehicle 290*t*, etc.)) at least partially based on the received sensory feedback state data 322, where such sensory feedback mode data 324 may be received by managed element 390 for controlling at least one characteristic of managed element 390. Managed element 390 may be any suitable assembly of its host (e.g., any processor assembly 12, any memory assembly 13 and/or any data stored thereon, any communications assembly 14, any power supply assembly 17, any input assembly 16*i*, any output assembly 16*o* or actuator subassembly 296, any sensor assembly 15 or sensor subassembly 295, and/or the like of replicating vehicle 290*r* and/or of VMS subsystem 10 and/or of user subsystem 220*u* and/or of target vehicle 290*t*, etc.), and sensory feedback mode data 324 may control managed element 390 in any suitable way, such as by enhancing, enabling, disabling, restricting, defining, adjusting, increasing, and/or limiting one or more certain functionalities associated with such a managed element.

Sensory feedback mode data 324 may be any suitable sensory feedback control data for controlling any suitable functionality of any suitable assembly of system 1 (e.g., of replicating vehicle 290*r*) as a managed element 390 (e.g., any suitable sensory feedback control data for controlling any suitable functionality of any suitable output assembly 16*o* of user device 220*u* (e.g., for adjusting a user interface presentation to user U (e.g., to provide a sensory feedback suggestion (e.g., open a window 65%, turn the HVAC to max and 55 degrees Fahrenheit, and/or the like) to have the replicating vehicle of the user mimic the target vehicle for the scenario of interest))), and/or any suitable sensory feedback control data (e.g., a control type of any suitable output component(s) or actuator(s) of replicating vehicle 290*r*) for controlling any suitable functionality of any suitable actuator assembly 296 of replicating vehicle 290*r* (e.g., for adjusting or otherwise controlling any suitable haptic feedback of any suitable haptic feedback actuator(s) of the replicating vehicle, for adjusting or otherwise controlling any suitable olfactory feedback of any suitable olfactory feedback actuator(s) of the replicating vehicle, for adjusting or otherwise controlling any suitable auditory feedback of any suitable auditory feedback actuator(s) of the replicating vehicle, for adjusting or otherwise controlling any suitable visual feedback of any suitable visual feedback actuator(s) of the replicating vehicle, and/or the like). Additionally or alternatively, sensory feedback mode data 324 may be any suitable model sensory feedback data for providing any suitable data to any suitable model custodian for updating any suitable model in any suitable manner. Additionally or alternatively, sensory feedback mode data 324 may be any suitable sensor sensory feedback data for providing any suitable data to any suitable sensor of any suitable vehicle (e.g., sensor(s) 295*ts* and/or sensor(s) 295*rs*) for updating any suitable sensor functionality in any suitable manner (e.g., to increase or decrease a sensitivity of any suitable sensor(s) and/or to turn on or off any suitable sensor(s)).

FIG. 4 is a flowchart of an illustrative process 400 for managing sensory feedback. At operation 402 of process 400, a sensory feedback model custodian (e.g., a sensory feedback model custodian system) may initially configure a learning engine for an experiencing entity (e.g., sensory feedback model 192*r* for replicating vehicle 290*r* or sensory feedback model 19*mt* for target vehicle 290*t*). At operation 404 of process 400, the sensory feedback model custodian may receive scenario data (e.g., from the experiencing entity) for at least one scenario data category for a scenario and a sensory feedback output state (e.g., by the experiencing entity) for the scenario. At operation 406 of process 400, the sensory feedback model custodian may train the learning engine using the received scenario data and the received sensory feedback output state. At operation 408 of process 400, the sensory feedback model custodian may access scenario data for the at least one scenario data category for another scenario. At operation 410 of process 400, the sensory feedback model custodian may determine a sensory feedback output state (e.g., by the experiencing entity) for the other scenario, using the learning engine for the experiencing entity, with the accessed scenario data for the other scenario. At operation 412 of process 400, when the determined sensory feedback output state for the other scenario satisfies a condition, sensory feedback control data associated with the satisfied condition may be generated.

It is understood that the operations shown in process 400 of FIG. 4 are only illustrative and that existing operations may be modified or omitted, additional operations may be added, and the order of certain operations may be altered. In some embodiments, multiple iterations of operations 404 and 406 may be carried out for a particular initially configured learning engine for a particular experiencing entity. In some embodiments, two or more iterations of operations 402-406 may be carried out for different learning engines (e.g., for at least one learning engine for each of two or more different experiencing entities (e.g., a target vehicle and a replicating vehicle)). In some embodiments, different iterations of operation 410 may be carried out with the same scenario data but using different learning engines for determining different sensory feedback output states for different experiencing entities (e.g., a target sensory feedback output state by a target vehicle for a scenario of interest and a replicating sensory feedback output state by a replicating vehicle for the same scenario of interest). In some embodiments, the sensory feedback control data generated at operation 412 may be generated based on the condition and each of two or more different sensory feedback output states for different experiencing entities.

Certain regulatory standards or thresholds for certain sensory feedback (e.g., generally or for certain scenarios) may be made available to the system for preventing actuator adjustment that might violate certain standards or thresholds (e.g., for preventing the boosting of acceleration or speed or noise or smells or vibrations or lights of a replicating vehicle using sensory feedback control data beyond a certain acceptable amount).

The use of one or more suitable models or engines or neural networks or the like (e.g., model 19*mr*, model 19*mt*, etc.) may enable prediction or any suitable determination of any appropriate sensory feedback output state(s) of any suitable experiencing entity during any suitable scenario. Such models (e.g., neural networks) running on any suitable processing units (e.g., graphical processing units ("GPUs") that may be available to system 1) provide significant speed improvements in efficiency and accuracy with respect to prediction over other types of algorithms and human-conducted analysis of data, as such models can provide estimates in a few milliseconds or less, thereby improving the functionality of any computing device on which they may be run. Due to such efficiency and accuracy, such models enable a technical solution for enabling the generation of any suitable control data (e.g., for controlling any suitable functionality of any suitable output assembly of a replicating vehicle or of any other suitable subsystem associated with a scenario (e.g., for adjusting a user interface presentation to a user (e.g., to provide a sensory feedback suggestion) and/or for adjusting an output that may affect the sensory feedback provided to a user of the replicating vehicle during the scenario of interest (e.g., for adjusting the light intensity, chromaticity, temperature, sound level, smells, haptics, and/or the like of the replicating vehicle during the scenario of interest))) using any suitable real-time data (e.g., data made available to the models) that may not be possible without the use of such models, as such models may increase performance of their computing device(s) by requiring less memory, providing faster response times, and/or increased accuracy and/or reliability. Due to the condensed time frame and/or the time within which a decision with respect to scenario data ought to be made to provide a desirable user experience, such models offer the unique ability to provide accurate determinations with the speed necessary to enable user sensory feedback that is realistic and effective and efficient in a timely manner (e.g., a substantially real-time manner during a scenario of interest).

Therefore, a system of software and hardware components may be provided that may be configured to learn the "feel", or haptic feedback, mechanical, olfactory, auditory, and/or any other sensory-inducing responses, of vehicles through a series of sensors and artificial-intelligence processing computer(s), and then reproduce that feel through a series of components and sensors in another vehicle. For example, an electric vehicle can be configured to replicate the feeling and response of a combustion engine powered supercar, adjusting for its real feedback and adjusting the suspension, and adding or countering vibrations in different areas and components of the vehicle in real time so the driver and/or passenger can have the feeling of any car they wish, with each passenger choosing their own feel. In one iteration, a system of chambers and pipes and valves may be built-into the vehicle, moving air fed through intakes and optionally pumped at higher speed via fans (e.g., turbines, jets, or the like) so as to create real sound and feedback similar to air and exhaust fumes moving through a combustion engine, but without the need for fuel, and with the ability to adjust the sound and vibrations or turn them off entirely by adjusting valves and other components via the computers and/or chips.

The technology herein may relate to computer graphics and simulation, including, but not limited to, vehicles and simulator vehicles, and more particularly to methods and apparatus for controlling vehicle operation within a real vehicle or virtual gaming vehicle or other suitable carrier or experiencing entity (e.g., any suitable target and/or replicating experiencing entity). In more detail, the technology herein may relate to techniques using multi-axis inertial sensors, such as accelerometers and/or gyro sensors and/or actuators and/or speakers and/or scent-releasing devices and chemicals, and/or motors to provide heightened sensations for drivers and passengers of real and simulation vehicles. In more detail, the technology herein may use sensors combined with artificial intelligence that may learn the patterns of feedback of vehicles to which it is attached and then replicate that feedback and sensations in other vehicles it controls through a computer or computers that control actuators, motors, olfactory devices, speakers, lights, and sensors to adjust and modify the sensations drivers and passengers experience so that each passenger and driver can feel like they are in different types of vehicles with different settings and feedback profiles even while they are in the same vehicle. In one iteration, a system of chambers and pipes and valves may be built-into a vehicle (e.g., a replicating vehicle experiencing entity) and may be operative for moving air fed through intakes and optionally pumped at higher speed via fans (e.g., turbines, jets, or the like) so as to create real sound and feedback similar to air and exhaust fumes moving through a combustion engine, but without the need for fuel, and with the ability to adjust the sound and vibrations or turn them off entirely by adjusting valves.

Electric vehicles are increasingly popular. However, many drivers of electric vehicles lament the lack of "feel", sound, smell, and other sensory feedback they would normally get from a combustion vehicle. For example, an electric vehicle's motors often do not vibrate the vehicle nearly as much as a combustion engine does, and the vibrations do not increase with acceleration, as happens with a combustion engine (e.g., when the pistons fire at increasing speed and force). The electric motors also often do not increase in sound, nor do they exhaust fumes with the scent indicating fuel burn. However, these sensations are, to many consumers, what makes driving exhilarating.

Another issue is that consumers often want different feelings at different times, and passengers in the same vehicle often have different feedback preferences. While, in some embodiments, a vehicle may be configured to allow a driver to adjust the ride mode, such as by adjusting the suspension and power output profile, it may be desirable to allow an SUV to feel and sound like a supercar coupe, or a minivan to feel, sound, and smell like a race car.

A driver of an electric vehicle may wish to accelerate at a ludicrous pace, but the passengers without any control may be suddenly surprised at the high rate of speed. With systems, methods, and computer-readable media for managing vehicle sensory feedback of this disclosure, such passengers may be enabled to adjust their settings (or the driver can adjust it for them), so they have feedback from their individual seat, for example, and speakers near their headrest, for example, to feel and hear that the vehicle is accelerating in such a way that they feel the vibrations they would have felt were they in a combustion-engine powered vehicle accelerating at the same pace.

Alternatively or additionally, a system can rely on cameras and other sensors in a vehicle to gauge the heart rate and breathing rate and other biological conditions of each passenger, and adjust the feedback for their individual seat, and/or adjust the driving, suspension, acceleration profile and/or level of aggressiveness, and other factors to calm a passenger who appears uncomfortable or nervous with the way a vehicle is accelerating, or to wake a driver who appears to be dozing off or distracted.

While some video games may attempt to simulate the driving experience in video games, they may not learn from real vehicles via artificial intelligence and machine learning and therefore may not become increasingly accurate over time. Further, they may not develop accurate simulations based on millions of scenarios and adjust accordingly as machine learning can do. Moreso, this disclosure may bring technology to real vehicles, so as to make one vehicle "feel" like another for a particular scenario, and to provide the real time feedback loop that may be required to adjust for the actual vibrations and other sensations of the actual vehicle currently being ridden-in. Simply applying vibrations, for example, to an existing vehicle's seat may make a messy combination of current vibrations caused by the road and vibrations caused by the simulator, and thus it would not feel real or accurate.

Some systems may be configured to attempt to adjust the "feel" of a vehicle, such as by adjusting the tightness of the suspension, the height of the ride, the tightness of the steering wheel, shifter, pedals, and/or the like, but this disclosure may apply artificial intelligence to adjust these in real time based on sensory input and then use actuators and servos and other mechanical devices to cause the actual vehicle, its pedals, steering wheel, seats, arm rests, door panels, and more to vibrate as if they were in another vehicle. For example, beyond technology to adjust how an SUV rides, low to the ground in sport mode versus high-up and loose for off roading, technology of this disclosure may be configured to make that SUV's right passenger seat vibrate and sound like the passenger is riding in a hyper-car coupe by canceling-out certain vibrations and sounds and adding others. As another example, beyond technology to adjust a Tesla to drive faster or slower, accelerating and braking with more or less aggression (e.g., higher or lower rates), technology of this disclosure may be configured to make the Tesla vibrate and sound like a Ferrari 812, and/or to make one seat of the Tesla vibrate like a Ferrari 812 and simultaneously to make another seat of the Tesla vibrate like a Porsche 911.

The technology herein addresses these issues, simulating for each passenger, which includes the driver, of a vehicle the feeling of any vehicle they choose, and modeling the "feeling" of that vehicle based on models developed through machine learning (e.g., artificial intelligence) reading sensors placed around those vehicles.

In one exemplary illustrative implementation, sensors may be placed on the wheel wells, all over the seats, handle bars, dashboard, door panels, floor wells, pedals, and arm rests of a "target vehicle", for example a Ferrari 812 Superfast, and the vehicle may be driven through multiple scenarios. Sensors on the outside of the vehicle, as well as GPS sensors, altimeters, cameras, microphones, and more may sense the environment the vehicle is currently navigating, and machine learning algorithms may generate a model to predict how each component of the vehicle will vibrate, sound, and react to each environmental variable, testing and improving itself (the machine learning models) as it drives. For example, seeing a bump ahead, the machine learning can "predict" how the components of the vehicle will respond, and how the components will vibrate and sound after the bump, and then after the actual impact with the bump, the machine learning can adjust and improve its models to better predict the response to that incident in the future. In this way, the algorithms may develop models to understand how components of a Ferrari 812 Superfast, for example, will vibrate, for example, and can then replicate this vibration in other vehicles so that they vibrate as if they were the Ferrari. In order that the "replicating vehicle" will be made to feel, sound, smell, and handle like a Ferrari, should replicate these sensations accurately, it may also contain sensors in similar areas, so that the accelerometers, gyros, and other sensory-generating devices adjust to counteract any existing vibrations that do not help generate the feel of a Ferrari, and simultaneously add vibrations (and other sensory feedback) that may aid in generating the accurate feel desired by the consumer. That also may mean the machine learning algorithm may be configured to predict and adjust to the vibrations created by other passengers who may have selected different model sensations (chosen to replicate for example a Porsche 911 and have their seat vibrate in that way), so that the vibrations of one seat may not cause other seats to vibrate in an inaccurate manner relative to the target model.

In one exemplary illustrative implementation, sensors placed by the exhaust of the vehicle and by the headrests of the passengers can detect chemicals or amounts of exhaust being released, and measure the amount of chemicals reaching each passenger at the time of acceleration and after. The machine learning algorithm(s) can learn to predict, as above, the amounts of chemicals it will detect based on different scenarios, such as speed of acceleration, temperature outside and inside the vehicle, how open any windows are, whether the vehicle is going up a hill or around a curve or other physical conditions, for example only. It can then develop and continually improve a model where it has scent releasing devices release scents which replicate the smell of the exhaust of different combustion engines and their different fuels, as well as the scent of burning rubber for different types of tires in different scenarios, as described for the exhaust. In this way, a driver of an electric vehicle can get the olfactory sensations they would get if they were "burning rubber" and burning fuel in a combustion vehicle. For example, a Tesla driver could experience the smell of burning gasoline and burning rubber they would experience if they were driving a 1969 Corvette Stingray. Tesla drivers therefore would get the fun of electric acceleration and the pleasurable scent of a 1969 Corvette Stingray.

In one exemplary illustrative implementation, sensors on the steering wheel may be configured to detect the resistance, vibration, and turning rate relative to the turn of the target vehicle, and then the machine learning may be configured to use the same or similar sensors on the replicating vehicle, as well as accelerometers, servos, magnets, and mechanical mechanisms to adjust the vibration, resistance, and feel of the replicating vehicle's steering wheel. This could also be applied to pedals, shifter, and/or any other suitable mechanical parts.

In one exemplary illustrative implementation, a gear shifter could be added to any vehicle, such as a Tesla, and it would include the motors and other mechanical components to control the feedback of the shifter, and then input the settings of the shifter to direct the vehicle to drive as the model vehicle which had an actual shifter. For example, a Tesla which does not have a gear shifter, could have an accessory shifter placed in the censor console or onto the dashboard or steering wheel stalk as an aftermarket or factory option, and this sensor would be caused to vibrate like a Ferrari 812 Superfast, and which would provide feedback to the other mechanical components and driving system of the Tesla, so as to make it feel and drive like the Ferrari.

It should be clear that these brand names are for example only and can be replaced with any other brand, and there are now many electric vehicles and combustion vehicles on the market, so these are just common names used for example only and the invention does not represent any relationship with these fine brands.

In one exemplary illustrative implementation, speakers in the headrest of one passenger may be configured to replicate the sounds of a Ferrari 812 Superfast, while speakers in the headrest of another passenger may be configured to replicate the sounds of a Mercedes E class. The speakers may be configured to both issue noise-canceling frequencies opposite to actual sounds picked-up by an array of nearby microphones, and generate frequencies that replicate the sound of the target vehicles. Of course, these same speakers could also play music or other audio at the same time. The sounds, like the vibrations generated by motors and actuators, would be continually improved by them, adjusting based on environment and position of the vehicle, and then replicated by the same models and machine learning in the replicating vehicles. It should be clear that the same method could be used to replicate this method in a vehicle which is in motion and one which is not in motion but wishes to generate the sensation of motion, such as a driving simulator.

In one exemplary illustrative implementation, instead of (or in addition-to) speakers, air intakes and/or fans (such as, but not limited to, turbofans, jets, air blades, or other air-moving devices) may be configured to push air through pipes and champers to generate sounds, and the direction of the air and access to chambers may be controlled by valve(s), actuator(s), motor(s), servo(s), and/or electromagnet(s) or other control mechanisms, such as the shape of the overall pipe layout as well as individual chambers may be modified to change the sound and vibration generated by the system. In this example, microphones and sensors may be configured to monitor the sound and vibration and feed it a computer and/or chips that may then control the components, modifying their shape(s) and/or path(s) such that the sound more-closely resembles a target sound or model of another vehicle's sound.

Additional exemplary non-limiting features include: use of accelerometer(s), motor(s), servo(s), speaker(s), light(s), and sensor(s) controlled by machine learning (AI) to simulate the acceleration of and/or vibrations of different types of vehicles, use of accelerometer(s), motor(s), servo(s), speaker(s), light(s), and sensor(s) controlled by machine learning (AI) to simulate the suspension feel and response of different types of vehicles, use of accelerometer(s), motor(s), servo(s), speaker(s), light(s), and Sensor(s) controlled by machine learning (AI) to simulate the vibration of all or part(s) of the vehicle body, use of accelerometer(s), motor(s), servo(s), speaker(s), light(s), and sensor(s) controlled by machine learning (AI) to simulate the seat(s) stiffness and/or vibration of the seat(s), use of accelerometer(s), motor(s), servo(s), speaker(s), light(s), and Sensor(s) controlled by machine learning (AI) to simulate the sound of a vehicle, use of accelerometer(s), motor(s), servo(s), speaker(s), light(s), and sensor(s) controlled by machine learning (AI) to simulate the responsiveness and/or vibration and/or resistance of a steering wheel, use of accelerometer(s), motor(s), Servo(s), speaker(s), light(s), and sensor(s) controlled by machine learning (AI) to simulate the responsiveness and/or vibration and/or resistance of a pedal(s). Use of accelerometer(s), motor(s), servo(s), speaker(s), light(s), and sensor(s) controlled by machine learning (AI) to simulate the vibrations of an arm rest(s), use of accelerometer(s), motor(s), servo(s), speaker(s), light(s), and sensor(s) controlled by machine learning (AI) to simulate the vibrations of a door panel, wheel well, floor, and other vehicle interior surfaces, use of accelerometer(s), motor(s), servo(s), speaker(s), light(s), and sensor(s), and scent releasing device(s), sprayer(s), scented pad(s) or surface(s), controlled by machine learning (AI) to simulate the smell of a vehicle's exhaust system and/or burning tires and/or external environment (such as driving next to other race cars exhausting), use of accelerometer(s), motor(s), servo(s), speaker(s), light(s), and sensor(s) controlled by machine learning (AI) to simulate the vibrations and/or sounds of an engine, such as causing the "frunk" or front cargo area of an electric vehicle to vibrate as-if a combustion engine were inside it, use of accelerometer(s), motor(s), servo(s), speaker(s), light(s), and sensor(s) controlled by machine learning (AI) to simulate the feeling of acceleration of one vehicle for the passenger of another vehicle, such as to give the passenger in an electric vehicle the sensation of accelerating in a combustion powered vehicle, use of cameras inside the vehicle to detect breathing and heart rate of a passenger through video magnification, and their facial expressions through face recognition and detection artificial intelligence/machine learning, and artificial intelligence/machine learning to then adjust the response of the vehicle and/or vehicle components through use of accelerometer(s), motor(s), servo(s), speaker(s), light(s), and sensor(s) controlled by machine learning (AI) to adjust the vehicle's performance and feel based on the perceived physical and emotional state of the passenger(s), for example to slow down the vehicle or reduce the rate of acceleration of the vehicle in response to a passenger appearing nervous in response to acceleration, use of cameras inside the vehicle to detect breathing and heart rate of a passenger through video magnification, and their facial expressions through face recognition and detection artificial intelligence/machine learning, and artificial intelligence/machine learning to then adjust the response of the vehicle and/or vehicle components through use of accelerometer(s), motor(s), servo(s), speaker(s), light(s), and sensor(s) controlled by machine learning (AI) to adjust the vehicle's performance and feel based on the perceived physical and emotional state of the passenger(s), for example to slow down the vehicle's breaking and reduce the rate of braking of the vehicle (have it begin to slow in anticipation of a stop sooner) in response to a passenger appearing nervous in response to rapid braking (obviously in the situations where braking suddenly is required, that would override this scenario which may be limited for example to scenarios such as the car approaching an intersection where there is a required stop), use of camera(s) capable of detecting infrared and ultraviolet light to monitor the exhaust of a vehicle and detect the quantity of exhaust and direction and spread of the exhaust fumes, combined with machine learning to predict the quantity and directional flow(s) of exhaust based on the vehicle's performance and environment (as elaborated in prior examples above), so as to predict the quantity of chemicals exhausted, and then optionally combined with scent releasing mechanism(s) and/or component(s) and/or vaporizer(s) so as to replicate the smell of the exhaust in another vehicle or simulator so as to replicate the smell of exhaust, for example in an electric vehicle so it feels and smells like it's a specific combustion vehicle, use of valve(s) to direct air, which may or may not be accelerated by turbo(s), fan(s), jet(s), or the like, through one or more pipe(s) and/or chamber(s), which can be different shapes and/or made of different materials, and which may include insert(s) which can be moved by actuator(s), servo(s), motor(s), electromagnet(s) or the like to modify the sound as it passes in or through the pipes and/or chambers, use of Sensor(s) such as microphone(s), vibration sensor(s), gyroscope(s), and the like, and motors (actuator(s), servo(s), motor(s), electromagnet(s) or the like) and computer(s) and/or chip(s) to listen-to and adjust the size (length, width, height, diameter) and/or shape(s), position(s), tension(s) of the pipe(s) and chamber(s) so as to modify the sound and vibrations generated as air flows through (the computer(s) and/or chip(s) may be configured to adjust these in real-time to have the system mimic the sounds made by other vehicles or even to play music—these mechanisms and sensors can be used and controlled by the AI to cancel-out the sensations and not to replicate (e.g., a car on a bumpy road might be generating vibrations and noise by the headrest and these sensors and mechanisms can produce opposite sound waves and vibrations to cancel out the disturbing sensations), use of cartridge(s) may be inserted into the system that may contain components, such as, but not limited to, differently-shaped metals, fans, pistons, rubber, and any other materials that may be configured to make different sounds and vibrations when inserted into the system (e.g., a portal or space accessible under the center console armrest or in the frunk of the vehicle or elsewhere (and there could be multiple such options) may be configured to allow the user to insert a cartridge that would then change the sound and vibrations generated, where these cartridges could have electric connections so the system can power motors or other components that may need to be powered, for example a motor driving a miniature multi-cylinder piston system to mimic the vibrations of a combustion engine, and, because these cartridges could be placed at multiple locations, it may be possible that the driver might have an active vibration cartridge under or near his seat, but that passengers either wouldn't have the cartridges or valves would block air from flowing into them so that they remain silent and non-vibrating), use of holes may be plugged by electric valves along the pipes and/or chambers so as to change the note of the pipes and overall system just like in a wind instrument (saxophone, bassoon, etc.), where the valves can be opened and closed by electromagnet(s), motor(s), actuator(s), aperture(s), and the like, use of vibration motors on intake or exhaust pipes to modify the resonant frequency of the system to mimic the desired sound, and/or any other suitable uses.

These and other features and advantages of exemplary illustrative non-limiting implementations may be better and more completely understood by referring to the disclosure in conjunction with the drawings.

FIGS. 11, 2, and 2A-2J may show exemplary illustrative non-limiting examples of sensors placed on a target vehicle and/or sensors and motors and accelerators placed on a replicating vehicle.

For example only. "sensor packs" (example location(s) of sensor(s) 295a and 295a') may contain sensors to detect the vibration of the door panel and/or the sound at that location, and "sensory replication mechanism packs" placed at the same location on the replica vehicle (example location(s) of actuator(s) 296a and 296a') together with the sensor packs may contain one or more actuators, motors, servos, and/or speakers to replicate the vibration and sound in the replicating vehicle as the AI predicts would be occurring were the target vehicle being driven. For example, if the replicating vehicle is a very solid, quiet Sedan but the driver wishes to feel as if they are in a Ferrari F12 Superfast, the actuators and speakers may vibrate the door panel and make sounds the AI predicts would be replicative of the Ferrari, and thus the passengers would feel the vibration throughout the door (such as on the arm rest) and heard the rattling, even if the actual door itself is making no such rattling noises. In this way, the driver of the Lexus gets the physical, auditory, and visual sensation similar to that of a Ferrari driver.

For example only, sensor(s) 295b and 295b' may show the location of pedal sensor packs and/or controllers to monitor the vibration, movement, resistance of pedals, and/or to control them with actuator(s) 296b and 296b' (and if controlling them, to monitor the sensor packs in the replicating vehicle so as to adjust the sensations to match better-and-better the target vehicle's pedal behavior).

For example only, sensor(s) 295c and 295c' may shows the location(s) of scent diffusers or vaporizers, or where the scent may exit the vents from which the diffusers and HVAC system vent, such that the vehicle can replicate scents such as burning rubber, exhaust fumes, pine trees, and any scent it wishes to replicate for-which it has the necessary chemicals and/or vaporizable materials (e.g., at actuator(s) 296c and 296c').

For example only, sensor(s) 295d may show the location of steering wheel sensor pack(s) that can detect the speed and rate of turn, vibrations, resistance, and the like, such that the AI could control actuators, magnets, motors, and the like (e.g., by actuator(s) 296d) inside a steering wheel mechanism so as to control the feel and response and vibration of the replicating vehicle's steering wheel. For example, if the replicating vehicle wishes to replicate a manual-driven vintage car without power steering the sensors would learn the resistance and speed of turns relative to the performance of the vehicle and the replicating vehicle would then add resistance to the steering wheel and the AI would require additional force and turns to cause the replicating vehicle to turn such that it feels like the older, vintage vehicle. This is of course just one illustrative example and there are many other possibilities by which it could replicate many different types of steering wheels in different environments.

For example only, sensor(s) 295e, 295e', 295e", 295e''', and/or the like may show the location of sensors and/or replicating mechanism packs 296e, 296e', 296e", 296e''' in or near the headrests of the vehicles, such that each passenger can replicate their own choice of vehicle and/or scenario. For example, one passenger would hear sounds replicating a V12 supercar and another passenger could choose to hear sounds replicating a go kart. Mechanisms such as actuators and servos could cause each headrest and seat to vibrate in their own way, so as to give a tactile feel (haptic feel) to each passenger in exactly the style they wish to replicate.

It should also be noted that these mechanisms and sensors can be used to cancel-out the sensations and not to replicate. For example, a car on a bumpy road might be generating vibrations and noise by the headrest and these sensors and mechanisms can produce opposite sound waves and vibrations to cancel out the disturbing sensations.

For example only, sensor(s) 295f shows the location of seat sensor and/or replicating mechanism packs 296f in or near the seats of the vehicles, such that each passenger can replicate their own choice of vehicle and/or scenario. For example, one passenger would feel vibrations replicating a V12 supercar and another passenger could choose to feel vibrations replicating a go kart. Mechanisms such as actuators and servos could cause each seat to vibrate in their own way, so as to give a tactile feel (haptic feel) to each passenger in exactly the style they wish to replicate.

For example only, sensor(s) 295g may show the location of chemical and air quality sensors that would monitor such things as exhaust, tire burning, dust, and the like. In this way, the replicating vehicles scent-replicating mechanisms 296g may vent scents (e.g., at the location of vent 294psv, for example only) replicating these scents. It should be noted that such sensors could be placed anywhere and in one or multiple locations around the vehicle so as to detect different scents being generated and then allow the replicating vehicle to replicate those scents, while also monitoring its own scent environment so as to adjust (for example, if it is already burning rubber, it would not add additional rubber scent to the same extent).

It should be clear to those familiar with the art that these sensors can be placed in different locations and different configurations depending on the vehicle type, target behaviors, and many other factors, but the overall technology remains the same, with sensors and AI learning the pattern of the target vehicle(s) and generating replicating vibrations, movements, sound, lights, and scents in the replicating vehicles.

Figure 2E:
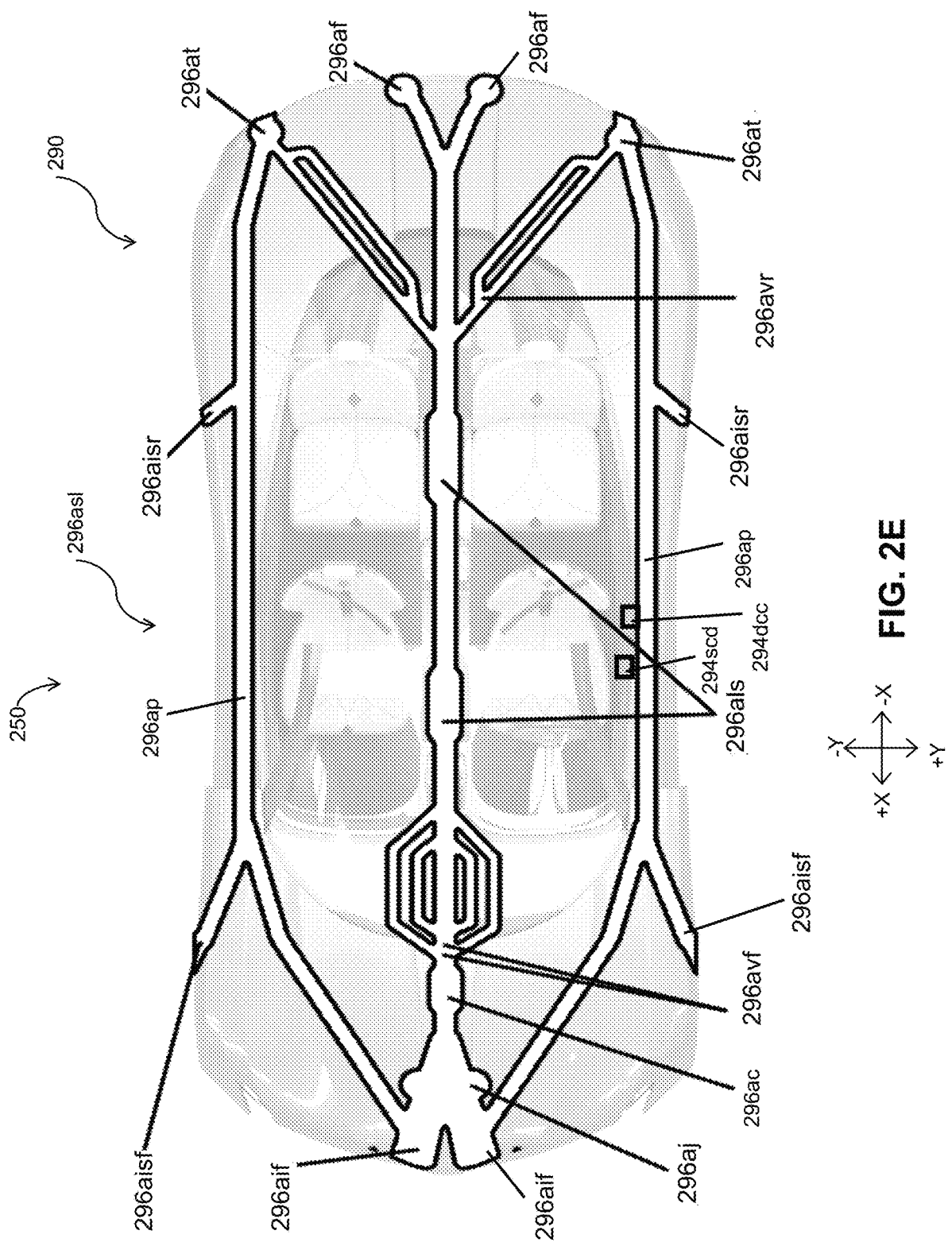
FIG. 2E is a top view of a portion of the vehicle of FIG. 2 in another configuration, in accordance with some embodiments of the disclosure.
Figure 2F:
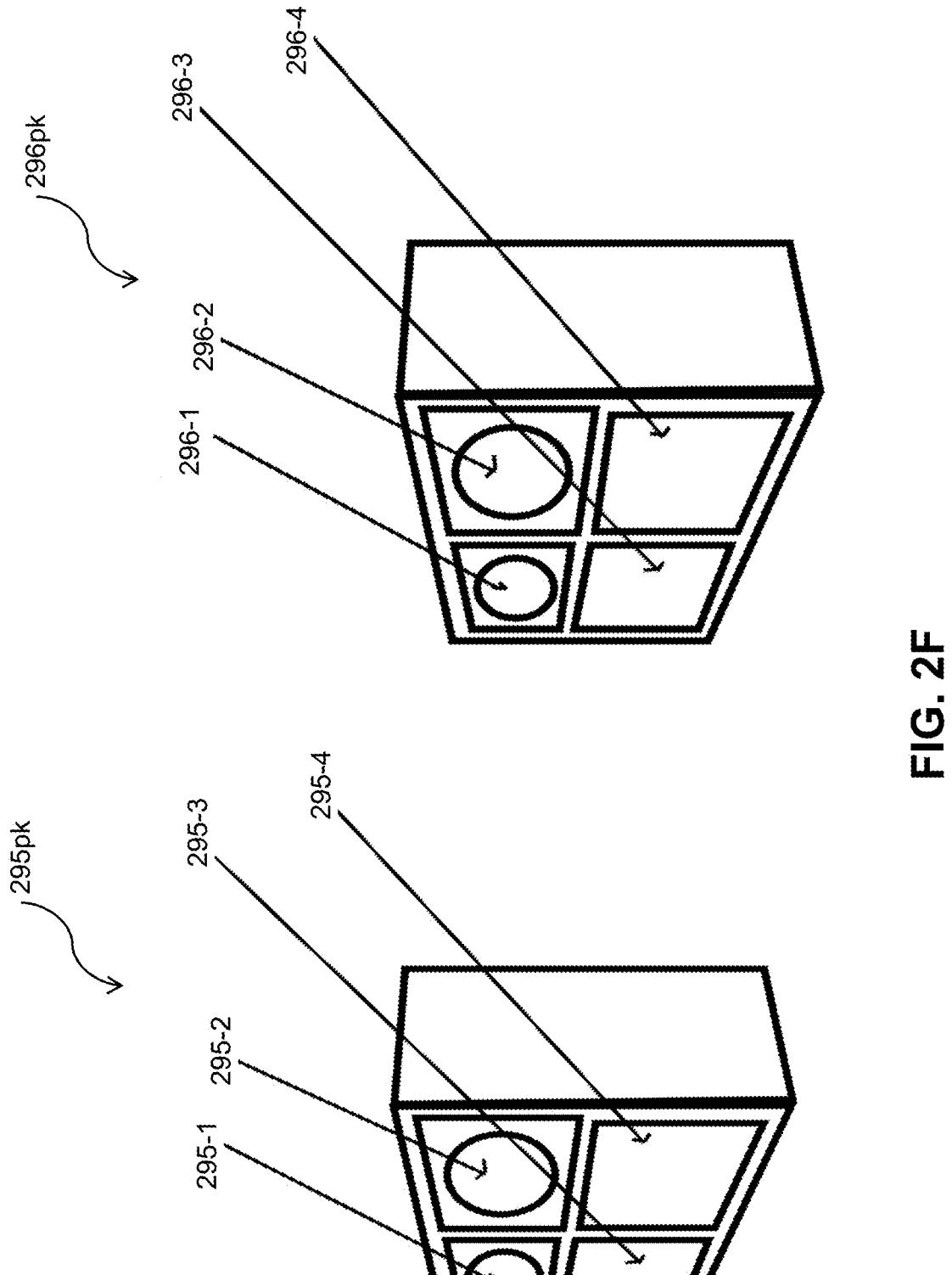
FIG. 2F shows perspective views of sensor/actuator packs, in accordance with some embodiments of the disclosure.

FIG. 2F shows an exemplary illustrative non-limiting example of a "sensors pack", that may contain one or a multitude of sensors and can be attached to a component of the vehicle. In this exemplary illustrative non-limiting example, a laser sensor 295-1, a camera 295-2, an accelerometer 295-3, and a gyroscope 295-4 may be included. However, it should be noted that different packs for placement on different components of the vehicles may contain different selections of components. In this example, such a sensor may be placed on the suspension arm of a vehicle and monitor the change in distance between the arm and wheel well to detect accurate movement by measuring the distance of the laser (time to reflect), as well as measuring vibrations via the camera, accelerometer, and gyroscope. The same or similar sensor would be placed in a similar location on a similar component of the replicating vehicle, and then the AI computer in the replicating vehicle would control various actuators, such as an actuator 296-5 in FIG. 2H that may be attached to the suspension piston so as to control the up and down motion of the suspension so as to better replicate the target vehicles movement behaviors.

FIG. 1D is an exemplary illustrative non-limiting example schematic showing an exemplary illustrative non-limiting example of the network of the combined vehicles and how the machine learning models may be gathered and shared and updated among vehicles to continually improve the models. It shows in-car networks in a target vehicle and a replicating vehicle, as well as the platform's cloud network, and local company networks for the service such as for engineers to review and tweak models and provide support. It should be clear this is just one possible embodiment.

Figure 2G:
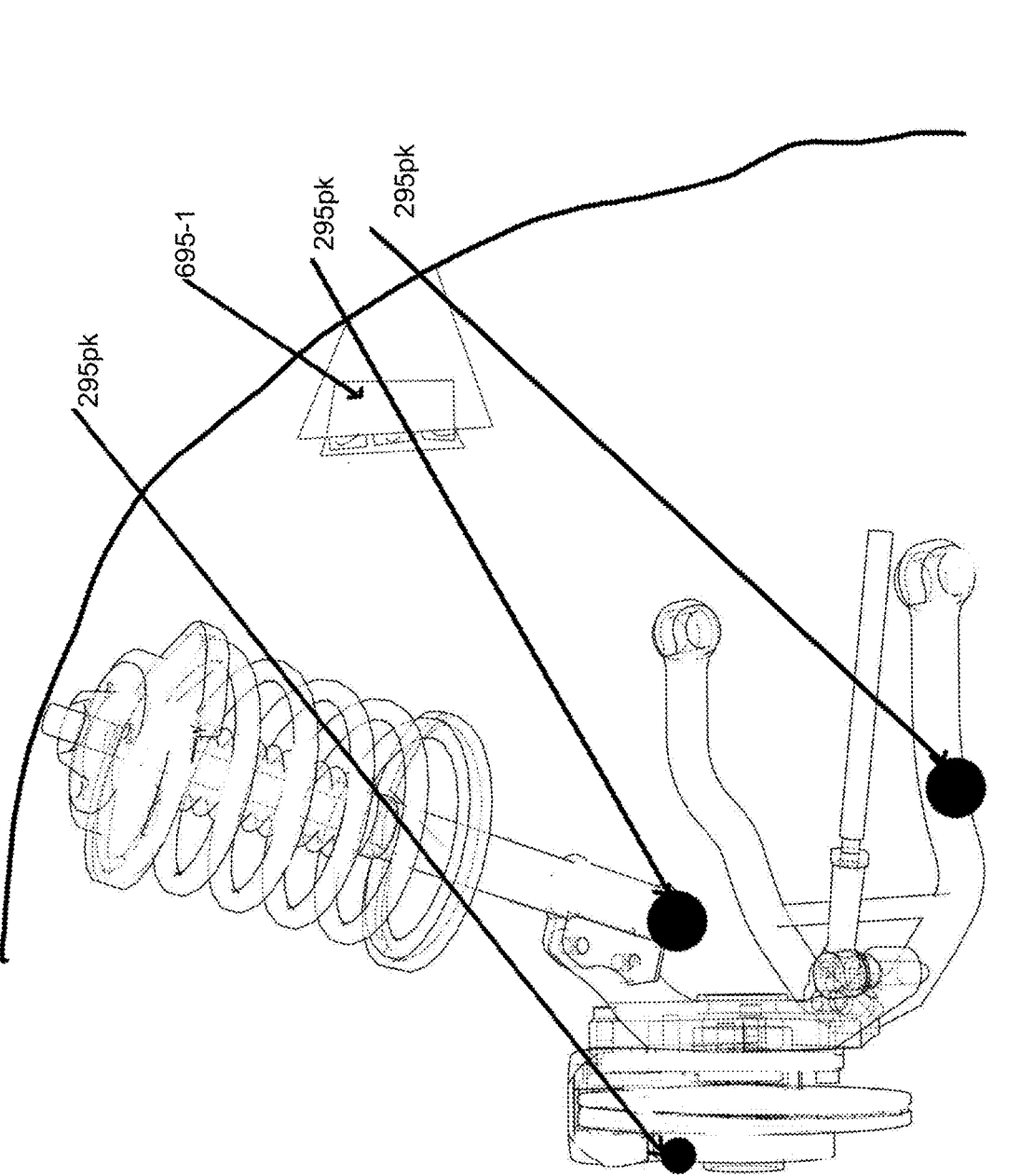
FIGS. 2G and 2H shows perspective views of a wheel well of the vehicle of FIG. 2, in accordance with some embodiments of the disclosure.
Figure 2H:

FIGS. 2G and 2H show exemplary target and/or replicating vehicles with camera(s) 695-1, and sensor(s) packs 295*pk* placed on components inside the wheel well (e.g., 294*hrm*), to monitor the behavior of the vehicle's suspension, brakes, and wheels. The sensors packs 295*pk* may contain one or a multitude of sensors, such as gyroscopes, accelerometers, barometers, microphones, lasers/laser readers, light sensors, vibration sensors, cameras, and the like. The camera(s) 695-1 may be placed in one or multiple locations and may include one or multiple cameras and lenses, and monitor the movement of one or multiple components (such as, but not limited to, the wheels, tires, tire deflection and/or distortion, brakes, brake pads, suspension arms, control arms, actuators, hydraulic pistons and/or actuators, actuators, fasteners, and the like), for example (but not limited to) to monitor and feed information on vibration, spin, rates of acceleration and/or deceleration, wear-and-tear, distortion, lateral movement, vertical movement, foreign objects, dirt, dust, water, debris, and other behavior. The system's machine learning and AI can process the video fed to it by the camera(s) through video magnification and detect even minute changes down to thousands of an inch.

FIG. 2H shows the addition of an AI-controlled actuator 296-5, which may be powered by magnets, electronics, hydraulics or otherwise, which may be configured to be controlled to counter movements and add movements to replicate the movement of the target vehicle. For example, if the target vehicle has a looser suspension than the replicating vehicle, the actuator may exert additional force in the same manner as the target vehicle to cause the replicating vehicle to bounce more than it normally would in a manner that accurately replicates the target vehicle. The replicating vehicle's computers would monitor and factor-in the sensor data and continually correct the movement of the replicating vehicle's suspension so as to more and more accurately replicate the behavior of the target vehicle. It should be clear that this is only one example and it is possible the replicating vehicle will have multiple actuators, motors, servers, and sensors in additional or alternative locations, and that this installation (e.g., of FIGS. 2G and 2H) may be adapted to the particular vehicles based on their suspension installations.

Vehicle 290 may include any suitable system layout of pipes and chambers for moving fluid through a system 296*asl* (e.g., for generating certain sound and/or movement with the vehicle), where system 296*asl* may be provided along any suitable portions of the vehicle (e.g., along (e.g., adjacent, just above, just below, or within) lower structural member 297*lsm*, etc.). For example, as shown in FIG. 2E, vehicle 290 may include any suitable air intakes 296*aif* at the front of the vehicle, any suitable air intakes 296*aisf* towards the front of the sides of the vehicle, and/or any suitable air intakes 296*aisr* towards the rear of the sides of the vehicle that may be fluidly communicatively coupled with each other and that may be configured to allow fluid (e.g., air) from the vehicle's environment to enter system 296*asl*, be passed through any suitable pipes 296*ap* and/or any suitable chambers 296*ac*, and/or being directed by any suitable valves 296*avf* and 296*avr*. At or near or along a center console (e.g., center console 240*f* of vehicle 290), one or more portals 296*als* may be provided (e.g., into which a cartridge of FIG. 2J may be placed) to add specific sound and/or vibration options to the vehicle. Turbo fans and/or any other suitable fluid (e.g., air) propulsion devices (e.g., jets 296*aj*, turbines 296*at*, fans 296*af*, etc.) may be provided and configured to move fluid (e.g., air) through system 296*asl* via blowing and/or suction or otherwise. It should be noted that this is just one example of a layout of the pipes and chambers and they might be laid-out differently depending on the shape and purposes of the vehicle into which such a system is installed.

Figure 2I:
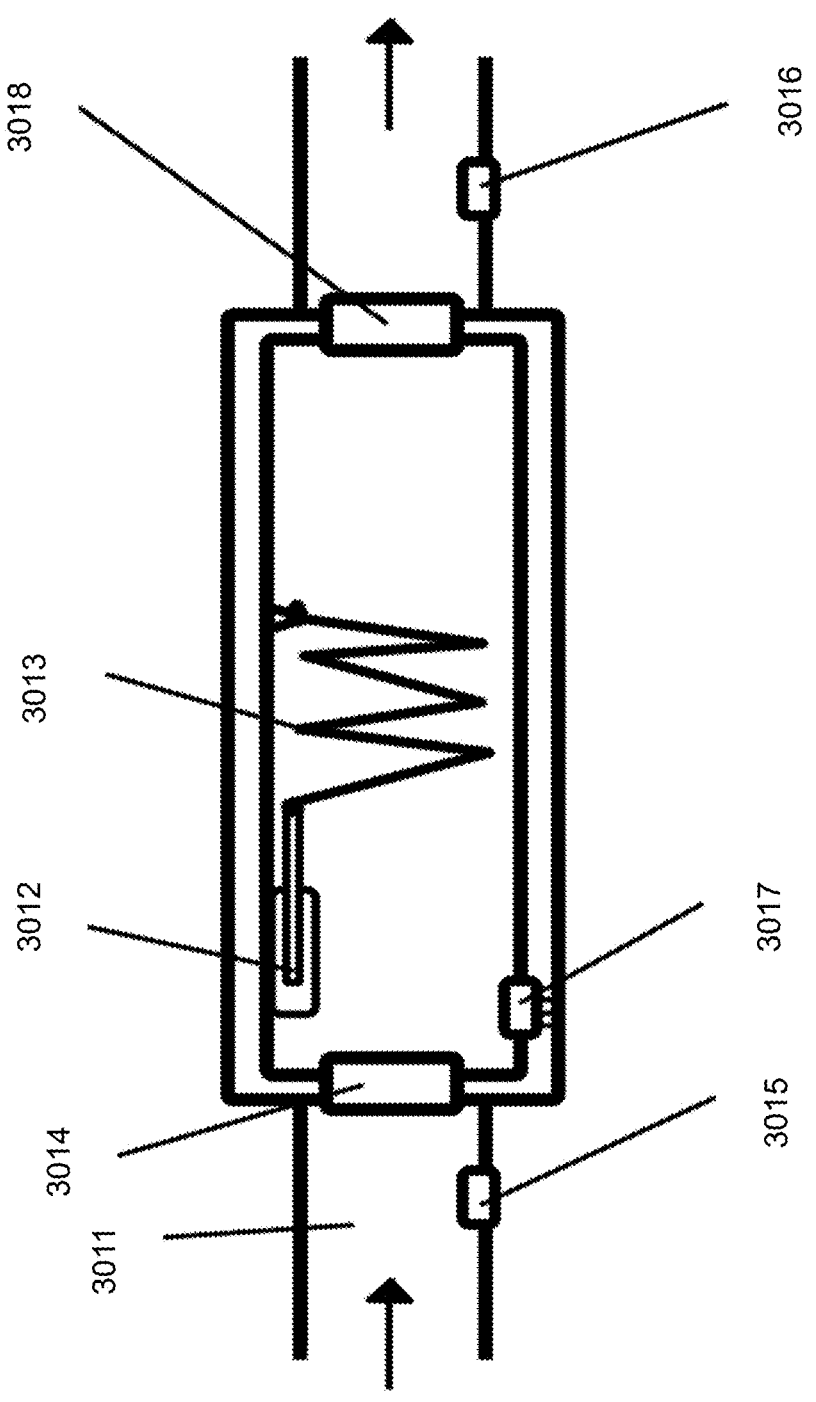
FIGS. 2I and 2J show exemplary cartridges of a sensory feedback management system, in accordance with some embodiments of the disclosure.

FIG. 2I shows an example cartridge. This may contain thin (e.g., aluminum) foil (sheet) 3013 that can be moved and shaped by actuators 3012 so as to modify the resonance of the cartridge and thus change the sounds and vibrations generated. It also may contain microphone(s) 3015 and/or 3016 that may be fed back to the system's computer/chips to adjust the settings in real time to achieve the desired sound. As well, a valve 3014 may be shown before the cartridge which can be closed entirely or partly to block all or some of the air going into the cartridge. Another valve 3018 may be after the cartridge, making it possible to form a chamber or to block air from going further into the car (in some cases a return pipe would direct exhausted air back into the system, meaning the value would direct air elsewhere). The cartridge may have an electronic connection 3017. Arrows may show the direction of the air going through the system.

Figure 2J:
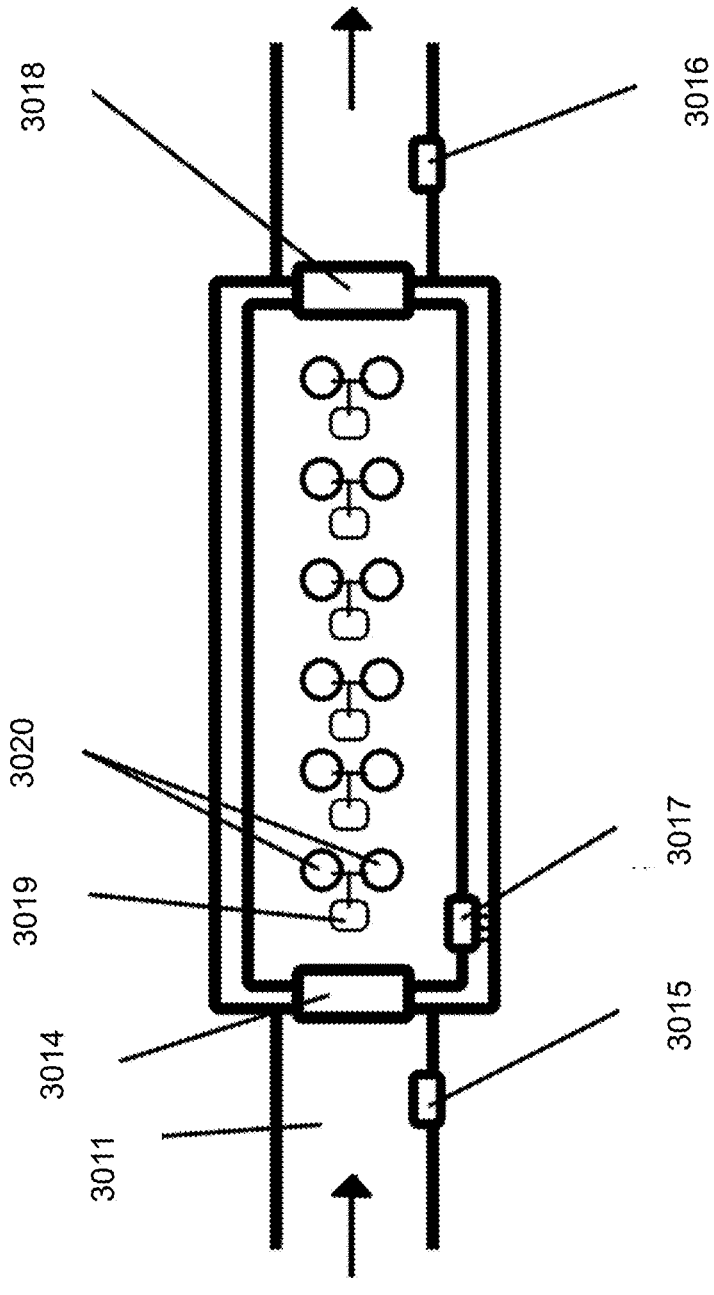

FIG. 2J may show another example cartridge, this with a motorized piston system mimicking the vibrations and sounds of a combustion engine. Here motors 3019 may move sets of pistons 3020 to mimic the vibrations and sounds of an engine. Because each set of pistons may be controlled by either an individual motor 3019 and/or can be locked in place so as to not move or vibrate, the feeling of different-sized and configured engines can be mimicked and adjusted in real time. Because this smaller version can be placed in a cartridge right next to the driver, for example, smaller vibrations can be felt with greater fidelity while using less force and consuming less energy, In some embodiments, a sound-producing component may include a chamber with tymbal mechanisms mimicking a cicada, where a vibration motor or motors may be configured to cause the tymbal to vibrate within and/or against a chamber, producing sympathetic resonance. Adjusting the frequency of the vibration of the tymbal and/or adjusting the size of the chambers and/or opening or closing valves in or on the chambers may be configured to change the volume and tone of the noise produced. Air-filled chambers made of rubber or similar material may be used to dampen nearby components and confine the vibration to the sound-making mechanisms, isolating the sound-and-vibration-making components from the passenger compartment, and the air may then be removed (entirely or partially) from the air-filled chambers so that the vibration mechanism vibrates nearby components. For example, an air-filled chamber under a driver's seat may be deflated, causing a vibration mechanism to be connected to the underside of the driver's seat without an air buffer and causing the driver to feel and hear the vibrations more intensely. The tymbals may be shaped like a tin can cover, and behave the way one does when vibrated (while still partially connected to the can) and may be made of various materials such as metal, composites, plastics, fabrics or a hybrid. The tymbal's convexity may be adjusted by a series of ribs whose curve may be adjusted by motors, pulleys, or the contracting of a shutter or ring. The tymbals may also be constructed like a camera lens shutter with petals in a circle such that they expand and contract through rotation, so as to affect both size and firmness of the tymbals. Multiple resonant chambers may be connected by valves which open and close to adjust the volume and tone of the vibration. Artificial intelligence and/or machine learning can be used to detect and predict the effects of adjusting various vibration speeds, patterns (adjusting the speed over time), amount of air in air-filled chambers, value openings, and overall size and combinations of chambers, as well as suspension and power metrics, so as to direct motors to adjust these items to replicate the sound and feel of other vehicles. Multiple mechanisms may be paired to vibrate in concert so as to "constructively combine" the soundwaves to spike them and produce a much higher volume of noise and vibration. The benefit of this method may be that, like a cicada, louder sound and more intense vibrations may be produced using less energy than would be produced by a traditional speaker, which means that these mechanisms can be smaller and fit into tighter areas of vehicles, reducing weight, and enabling this system to be integrated into even small, weight-conscious hypercars.

Although many aspects of sensory feedback management systems may be described with respect to predicting sensory feedback of certain vehicles during certain vehicle scenarios and/or generating sensory feedback control signals based on any suitable predictions for carrying out certain sensory feedback with any suitable output components (e.g., any suitable haptic, auditory, olfactory, and/or visual sensory feedback with any suitable output components) of an actual replicating vehicle, it is to be understood that these systems may be used with respect to any suitable vehicle, including a virtual gaming vehicle or simulator or the like, or any other suitable experiencing entities or carriers that may be replicated or used to replicate.

One, some, or all of the processes described with respect to FIGS. 1-4 and otherwise may each be partially or entirely implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., memory 13 of FIG. 1A). In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one subsystem to another directly or via any suitable network or bus or the like. Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

Any, each, or at least one module or component or subsystem of the disclosure (e.g., any or each module of management system 301) may be provided as a software construct, firmware construct, one or more hardware components, or a combination thereof. For example, any, each, or at least one module or component or subsystem of any suitable system may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. The number, configuration, functionality, and interconnection of the modules and components and subsystems of system 1 are only illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

Implementations within the scope of the present disclosure can be partially or entirely realized using a tangible computer-readable storage medium, or multiple tangible computer-readable storage media of one or more types, encoding one or more instructions. The tangible computer-readable storage medium also can be non-transitory in nature.

At least a portion of one or more of the modules of system 1 may be stored in or otherwise accessible to a subsystem (e.g., subsystem 120) in any suitable manner (e.g., in memory 13 (e.g., as at least a portion of application 19a and/or model 19m)). Any or each module of system 1 may be implemented using any suitable technologies (e.g., as one or more integrated circuit devices), and different modules may or may not be identical in structure, capabilities, and operation. Any or all of the modules or other components of system 1 may be mounted on an expansion card, mounted directly on a system motherboard, or integrated into a system chipset component (e.g., into a "north bridge" chip). At least a portion of one or more of the modules of management system 301 may be stored in or otherwise accessible to replicating vehicle 290r in any suitable manner (e.g., in subsystem 220*rf* of vehicle 290*r* (e.g., as at least a portion of application 19*ar*)). Any or each module of management system 301 may be implemented using any suitable technologies (e.g., as one or more integrated circuit devices), and different modules may or may not be identical in structure, capabilities, and operation. Any or all of the modules or other components of management system 301 may be mounted on an expansion card, mounted directly on a system motherboard, or integrated into a system chipset component (e.g., into a "north bridge" chip).

Any or each module of system 301 and/or of system 1 may be a dedicated system implemented using one or more expansion cards adapted for various bus standards. For example, all of the modules may be mounted on different interconnected expansion cards or all of the modules may be mounted on one expansion card. With respect to system 1, by way of example only, modules of system 1 may interface with a motherboard or processor assembly 12 (e.g., of subsystem 120) through an expansion slot (e.g., a peripheral component interconnect ("PCI") slot or a PCI express slot). Alternatively, modules of system 1 need not be removable but may include one or more dedicated modules that may include memory (e.g., RAM) dedicated to the utilization of the module. In other embodiments, modules of system 1 may be at least partially integrated into a subsystem (e.g., subsystem 120 (e.g., a server)). For example, a module of system 1 may utilize a portion of memory 13 of a subsystem. Any or each module of system 1 may include its own processing circuitry and/or memory. Alternatively, any or each module of system 1 may share processing circuitry and/or memory with any other module of system 1 and/or processor assembly 12 and/or memory assembly 13 of a subsystem (e.g., subsystem 120).

Any or each module of management system 301 may be a dedicated system implemented using one or more expansion cards adapted for various bus standards. For example, all of the modules may be mounted on different interconnected expansion cards or all of the modules may be mounted on one expansion card. With respect to management system 301, by way of example only, the modules of management system 301 may interface with a motherboard or processor assembly 12 of replicating vehicle 290*r* through an expansion slot (e.g., a PCI slot or a PCI express slot). Alternatively, management system 301 need not be removable but may include one or more dedicated modules that may include memory (e.g., RAM) dedicated to the utilization of the module. In other embodiments, management system 301 may be at least partially integrated into vehicle 290*r*. For example, a module of management system 301 may utilize a portion of device memory 13 of vehicle 290*r*. Any or each module of management system 301 may include its own processing circuitry and/or memory. Alternatively, any or each module of management system 301 may share processing circuitry and/or memory with any other module of management system 301 and/or processor assembly 12 and/or memory assembly 13 of vehicle 290*r*.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device (e.g., via one or more wired connections, one or more wireless connections, or any combination thereof).

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including, but not limited to, routines, subroutines, programs, data structures, objects, modules, applications, applets, functions, and/or the like. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations may be performed by one or more integrated circuits, such as ASICs or FPGAs. In one or more implementations, such integrated circuits may execute instructions that may be stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software may depend upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As may be used in this specification and any claims of this application, the terms "base station," "receiver," "computer," "server," "processor," and "memory" may all refer to electronic or other technological devices. These terms exclude people or groups of people. For the purposes of the specification, the terms "display" or "displaying" means displaying on an electronic device.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. The term "and/or" as used herein refers to and encompasses any and all possible combinations of one or more of the associated listed items. As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A. B, and C" or "at least one of A, B, or C" may each refer to only A, only B. or only C; any combination of A, B. and C; and/or at least one of each of A, B, and C. The terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. When used in the claims, the term "or" is used as an inclusive or and not as an exclusive or. For example, the phrase "at least one of x, y, or z" means any one of x, y, and z, as well as any combination thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As may be used herein, the terms "computer," "personal computer," "device," "computing device," "router device," and "controller device" may refer to any programmable computer system that is known or that will be developed in the future. In certain embodiments, a computer will be coupled to a network, such as described herein. A computer system may be configured with processor-executable software instructions to perform the processes described herein. Such computing devices may be mobile devices, such as a mobile telephone, data assistant, tablet computer, or other such mobile device. Alternatively, such computing devices may not be mobile (e.g., in at least certain use cases), such as in the case of server computers, desktop computing systems, or systems integrated with non-mobile components.

As may be used herein, the terms "component," "module," and "system," are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution and a component may be localized on one computer and/or distributed between two or more computers.

The predicate words "configured to," "operable to," "operative to," and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation or the processor being operative to monitor and control the operation. Likewise, a processor configured to execute code can be construed as a processor programmed to execute code or operable to execute code or operative to execute code.

As used herein, the term "based on" may be used to describe one or more factors that may affect a determination. However, this term does not exclude the possibility that additional factors may affect the determination. For example, a determination may be solely based on specified factors or based on the specified factors as well as other, unspecified factors. The phrase "determine A based on B" specifies that B is a factor that is used to determine A or that affects the determination of A. However, this phrase does not exclude that the determination of A may also be based on some other factor, such as C. This phrase is also intended to cover an embodiment in which A may be determined based solely on B. As used herein, the phrase "based on" may be synonymous with the phrase "based at least in part on."

As used herein, the phrase "in response to" may be used to describe one or more factors that trigger an effect. This phrase does not exclude the possibility that additional factors may affect or otherwise trigger the effect. For example, an effect may be solely in response to those factors, or may be in response to the specified factors as well as other, unspecified factors. The phrase "perform A in response to B" specifies that B is a factor that triggers the performance of A. However, this phrase does not foreclose that performing A may also be in response to some other factor, such as C. This phrase is also intended to cover an embodiment in which A is performed solely in response to B.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter/neutral gender (e.g., her and its and they) and vice versa. Headings and subheadings, if any, are used for convenience only and do not limit the subject disclosure.

As described above, one aspect of the present technology is the gathering and use of data available from various sources to improve the determination of sensory feedback states of a vehicle for a user (e.g., a user of a vehicle using any suitable auxiliary factors). The present disclosure contemplates that in some instances, this gathered data may include personal information data that uniquely identifies or can be used to contact or locate a specific person. Such personal information data can include demographic data, location-based data, telephone numbers, email addresses, social network identifiers, home addresses, office addresses, data or records relating to a user's health or level of fitness (e.g., vital signs measurements, facial expression measurements, medication information, exercise information, etc.) and/or mindfulness, date of birth, or any other identifying or personal information.

The present disclosure recognizes that the use of such personal information data, in the present technology, can be used to the benefit of users. For example, the personal information data can be used to improve the determination of sensory feedback states for a vehicle of the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act ("HIPAA"); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of location detection services, the present technology can be configured to allow users to select to "opt in" or "opt out" of participation in the collection of personal information data during registration for services or anytime thereafter. In addition to providing "opt in" or "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, the determination of sensory feedback states for a vehicle of the user can be made based on non-personal information data or a bare minimum amount of personal information, such as the content being requested by the device associated with a user, other non-personal information available to the device, or publicly available information.

While there have been described systems, methods, and computer-readable media for managing vehicle sensory feedback, many changes may be made therein without departing from the spirit and scope of the subject matter described herein in any way. It should also be noted that while the technologies described herein may be illustrated primarily with respect to managing sensory feedback of a vehicle, the described technologies can also be implemented in any number of additional or alternative settings or contexts and towards any number of additional objectives. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. It is also to be understood that various directional and orientational terms, such as "left" and "right," "up" and "down," "front" and "back" and "rear," "top" and "bottom" and "side," "above" and "below," "length" and "width" and "thickness" and "diameter" and "cross-section" and "longitudinal," "X-" and "Y-" and "Z-," "roll" and "pitch" and "yaw," "clockwise" and "counter-clockwise," and/or the like, may be used herein only for convenience, and that no fixed or absolute directional or orientational limitations are intended by the use of these terms. For example, the components of the apparatus can have any desired orientation. If reoriented, different directional or orientational terms may need to be used in their description, but that will not alter their fundamental nature as within the scope and spirit of the disclosure.

As used herein, the term "or" can be construed in either an inclusive or exclusive sense. Moreover, plural instances can be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and can fall within a scope of various implementations of the present disclosure. In general, structures and functionality presented as separate resources in the example configurations can be implemented as a combined structure or resource. Similarly, structures and functionality presented as a single resource can be implemented as separate resources. These and other variations, modifications, additions, and improvements fall within a scope of implementations of the present disclosure as represented by the appended claims. The specification and drawings are, accordingly, to be regarded in an illustrative rather than a restrictive sense.

Therefore, those skilled in the art will appreciate that the concepts of the disclosure can be practiced by other than the described embodiments, which are presented for purposes of illustration rather than of limitation.

What is claimed is:

1. A method for managing sensory feedback using a sensory feedback model custodian system, the method comprising:

initially configuring, at the sensory feedback model custodian system, a learning engine for an experiencing entity;

receiving, at the sensory feedback model custodian system, scenario data for at least one scenario data category sensed from the experiencing entity during an experiencing entity scenario and a sensory feedback output state sensed from the experiencing entity during the experiencing entity scenario;

training, at the sensory feedback model custodian system, the learning engine using the received scenario data and the received sensory feedback output state;

accessing, at the sensory feedback model custodian system, scenario data for the at least one scenario data category sensed from another experiencing entity during another experiencing entity scenario;

determining a sensory feedback output state for the other experiencing entity scenario, using the trained learning engine for the experiencing entity at the sensory feedback model custodian system, with the accessed scenario data for the other experiencing entity scenario;

generating sensory feedback control data based on the determined sensory feedback output state for the other experiencing entity scenario; and using the sensory feedback control data to affect a user experience of a user of the other experiencing entity during the other experiencing entity scenario.

2. The method of claim 1, wherein the using comprises using the sensory feedback control data to provide a recommendation to adjust a control variable of the other experiencing entity.

3. The method of claim 1, wherein the using comprises using the sensory feedback control data to automatically adjust a control variable of the other experiencing entity.

4. The method of claim 1, wherein the using comprises using the sensory feedback control data to automatically adjust a haptic sensory feedback actuator of the other experiencing entity.

5. The method of claim 1, wherein the using comprises using the sensory feedback control data to automatically adjust an olfactory sensory feedback actuator of the other experiencing entity.

6. The method of claim 1, wherein the using comprises using the sensory feedback control data to automatically adjust an auditory sensory feedback actuator of the other experiencing entity.

7. The method of claim 1, wherein the using comprises using the sensory feedback control data to automatically adjust a visual sensory feedback actuator of the other experiencing entity.

8. The method of claim 1, wherein the at least one scenario data category comprises one of the following:

type of tires of the experiencing entity;

type of fuel used by the experiencing entity;

status of each seat of the experiencing entity;

status of occupancy of each seat of the experiencing entity;

status of each window and/or sunroof and/or convertible roof of the experiencing entity;

status of a heating, ventilation, and air conditioning ("HVAC") system of the experiencing entity;

status of a media system of the experiencing entity;

status of weather of the environment of the experiencing entity;

status of smell of the environment of the experiencing entity;

status of sound of the environment of the experiencing entity;

status of light of the environment of the experiencing entity;

status of the driving surface of the experiencing entity; or status of the driving operation of the experiencing entity.

9. The method of claim 1, further comprising:

initially configuring, at the sensory feedback model custodian system, a learning engine for the other experiencing entity;

obtaining, at the sensory feedback model custodian system, scenario data for the at least one scenario data category sensed from the other experiencing entity during a third experiencing entity scenario and a sensory feedback output state sensed from the other experiencing entity during the third experiencing entity scenario;

training, at the sensory feedback model custodian system, the learning engine for the other experiencing entity using the obtained scenario data and the obtained sensory feedback output state; and determining another sensory feedback output state for the other experiencing entity scenario, using the trained learning engine for the other experiencing entity at the sensory feedback model custodian system, with the accessed scenario data for the other experiencing entity scenario, wherein the generating comprises generating the sensory feedback control data based on:

the determined sensory feedback output state for the other experiencing entity scenario; and the determined other sensory feedback output state for the other experiencing entity scenario.

10. The method of claim 9, wherein the generating comprises generating the sensory feedback control data based on a difference between the determined sensory feedback output state for the other experiencing entity scenario and the determined other sensory feedback output state for the other experiencing entity scenario.

11. The method of claim 9, further comprising:

after the using, further accessing, at the sensory feedback model custodian system, further scenario data for the at least one scenario data category sensed from the other experiencing entity during the other experiencing entity scenario and a sensory feedback output state sensed from the other experiencing entity during the other experiencing entity scenario; and further training, at the sensory feedback model custodian system, the learning engine for the other experiencing entity using the further accessed further scenario data and the further accessed sensory feedback output state.

12. A sensory feedback model custodian system comprising:

a communications component; and a processor operative to:

initially configure a learning engine for an experiencing entity;

receive scenario data for at least one scenario data category sensed from the experiencing entity during an experiencing entity scenario and a sensory feedback output state sensed from the experiencing entity during the experiencing entity scenario;

train the learning engine using the received scenario data and the received sensory feedback output state;

access scenario data for the at least one scenario data category sensed from another experiencing entity during another experiencing entity scenario;

determine a sensory feedback output state for the other experiencing entity scenario, using the trained learning engine for the experiencing entity, with the accessed scenario data for the other experiencing entity scenario;

generate sensory feedback control data based on the determined sensory feedback output state for the other experiencing entity scenario; and use the sensory feedback control data to affect a user experience of a user of the other experiencing entity during the other experiencing entity scenario.

13. The sensory feedback model custodian system of claim 12, wherein the processor is operative to use the sensory feedback control data to provide a recommendation to adjust a control variable of the other experiencing entity.

14. The sensory feedback model custodian system of claim 12, wherein the processor is operative to use the sensory feedback control data to automatically adjust a control variable of the other experiencing entity.

15. The sensory feedback model custodian system of claim 12, wherein the processor is operative to use the sensory feedback control data to automatically adjust a haptic sensory feedback actuator of the other experiencing entity.

16. The sensory feedback model custodian system of claim 12, wherein the processor is operative to use the sensory feedback control data to automatically adjust an olfactory sensory feedback actuator of the other experiencing entity.

17. The sensory feedback model custodian system of claim 12, wherein the processor is operative to use the sensory feedback control data to automatically adjust an auditory sensory feedback actuator of the other experiencing entity.

18. The sensory feedback model custodian system of claim 12, wherein the processor is operative to use the sensory feedback control data to automatically adjust a visual sensory feedback actuator of the other experiencing entity.

19. The sensory feedback model custodian system of claim 12, wherein the at least one scenario data category comprises one of the following:

type of tires of the experiencing entity;

type of fuel used by the experiencing entity;

status of each seat of the experiencing entity;

status of occupancy of each seat of the experiencing entity;

status of each window and/or sunroof and/or convertible roof of the experiencing entity;

status of a heating, ventilation, and air conditioning ("HVAC") system of the experiencing entity;

status of a media system of the experiencing entity;

status of weather of the environment of the experiencing entity;

status of smell of the environment of the experiencing entity;

status of sound of the environment of the experiencing entity;

status of light of the environment of the experiencing entity;

status of the driving surface of the experiencing entity; or status of the driving operation of the experiencing entity.

20. A non-transitory computer-readable storage medium storing at least one program comprising instructions, which, when executed:

initially configure a learning engine for an experiencing entity;

receive scenario data for at least one scenario data category sensed from the experiencing entity during an experiencing entity scenario and a sensory feedback output state sensed from the experiencing entity during the experiencing entity scenario;

71 train the learning engine using the received scenario data and the received sensory feedback output state;

access scenario data for the at least one scenario data category sensed from another experiencing entity during another experiencing entity scenario;

determine a sensory feedback output state for the other experiencing entity scenario, using the trained learning engine for the experiencing entity, with the accessed scenario data for the other experiencing entity scenario;

generate sensory feedback control data based on the determined sensory feedback output state for the other experiencing entity scenario; and use the sensory feedback control data to affect a user experience of a user of the other experiencing entity during the other experiencing entity scenario.

21. A method comprising:

training a target vehicle sensory feedback model using training target vehicle scenario data and training target vehicle Sensory feedback data sensed by any target vehicle of a first target vehicle type during each of at least one target vehicle training scenario;

training a replicating vehicle sensory feedback model using training replicating vehicle scenario data and training replicating vehicle sensory feedback data sensed by any replicating vehicle of a first replicating vehicle type during each of at least one replicating vehicle training scenario, wherein the first replicating vehicle type is different than the first target vehicle type;

obtaining live replicating vehicle scenario data from a live replicating vehicle of the first replicating vehicle type during a replicating vehicle live scenario;

using the trained target vehicle sensory feedback model to predict live target vehicle sensory feedback data for a sensory feedback state of the first target vehicle type during the replicating vehicle live scenario based on the obtained live replicating vehicle scenario data;

using the trained replicating vehicle sensory feedback model to predict live replicating vehicle sensory feedback data for a sensory feedback state of the first replicating vehicle type during the replicating vehicle live scenario based on the obtained live replicating vehicle scenario data;

combining the predicted live target vehicle sensory feedback data and the predicted live replicating vehicle sensory feedback data to generate sensory feedback control data; and using the sensory feedback control data to adjust a functionality of an output component of the live replicating vehicle during the replicating vehicle live scenario.

* * * * *